United States Patent
Masaki et al.

[11] Patent Number: 5,333,263
[45] Date of Patent: Jul. 26, 1994

[54] DIGITAL IMAGE PROCESSING APPARATUS

[75] Inventors: Yasuo Masaki; Kimitoshi Hori, both of Osaka, Japan

[73] Assignee: Minolta Camera Kabushiki Kaisha, Osaka, Japan

[21] Appl. No.: 985,760

[22] Filed: Dec. 4, 1992

Related U.S. Application Data

[63] Continuation of Ser. No. 715,888, Jun. 18, 1991, abandoned, which is a continuation of Ser. No. 249,102, Sep. 26, 1988, abandoned.

[30] Foreign Application Priority Data

Sep. 25, 1987 [JP] Japan .................................. 62-240256
Sep. 25, 1987 [JP] Japan .................................. 62-240257

[51] Int. Cl.$^5$ ............................................. G06F 3/147
[52] U.S. Cl. .................................... 395/164; 395/162; 364/754
[58] Field of Search ............ 340/724, 747, 736, 736.5; 364/716, 718, 754; 395/162, 163, 164; 345/133, 134, 135

[56] References Cited

U.S. PATENT DOCUMENTS

| | | | |
|---|---|---|---|
| 4,375,922 | 3/1983 | Maegawa et al. | 400/70 |
| 4,392,205 | 7/1983 | Makizuka et al. | 364/518 |
| 4,592,005 | 5/1986 | Kregness | 364/736 |
| 4,718,029 | 1/1988 | Morino et al. | 364/710 |
| 4,769,779 | 9/1988 | Chang et al. | 364/754 |
| 4,825,359 | 4/1989 | Ohkami et al. | 364/200 |
| 4,849,907 | 7/1989 | Aotsu et al. | 364/518 |

Primary Examiner—Phu K. Nguyen
Attorney, Agent, or Firm—Burns, Doane, Swecker & Mathis

[57] ABSTRACT

A processing circuit comprising a multiplying circuit, an ALU, a bit shift circuit, LUT, selectors, and constant registers can be adapted to various data processing as a whole processing circuit by appropriately changing the operation states of respective circuits and changing the setting of constant values. By combining a plurality of processing circuits, a data processing circuit capable of larger number of functions can be realized.

15 Claims, 48 Drawing Sheets

FIG.2  PRIOR ART
(a)
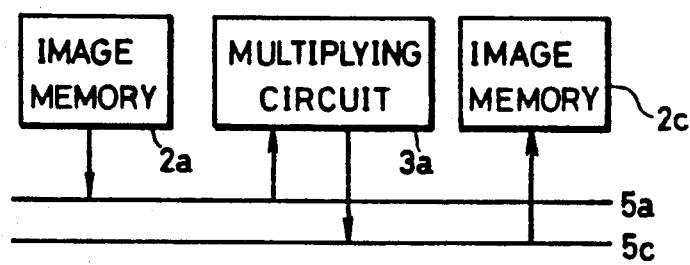
(b)
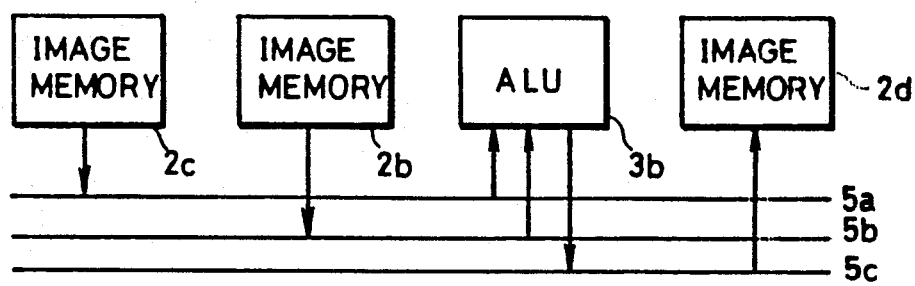
(c)
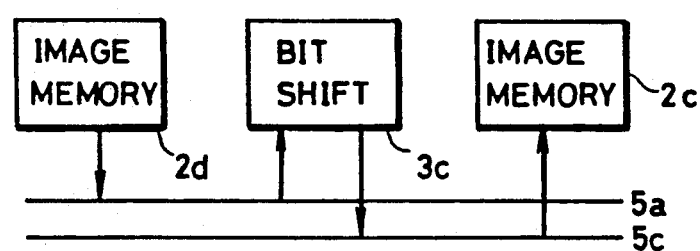

DIGITAL IMAGE PROCESSING APPARATUS

This application is a continuation of application Ser. No. 07/715,888, filed Jun. 18, 1991 now abandoned, which in turn is a continuation of application Ser. No. 07/249,102, filed Sep. 26, 1988, now abandoned.

BACKGROUND OF THE INVENTION

1. Field of the Invention

The present invention relates to a digital image processing apparatus and, more specifically, to a digital image processing apparatus arithmetically processing original image data to realized image data converting process such as gradation correction, sharpening of image quality, and image analyzing processes such as feature extraction from the image data.

2. Description of the Prior Art

A digital image processing apparatus is constituted by hardware such as an image input circuit for inputting image data, an image output circuit for outputting image data, an image memory for storing image data, a processing circuit for arithmetically processing the image data, a host CPU controlling each of these hardwares and arithmetically processing image data utilizing software, and so on. In general, the host CPU is used for the arithmetic processing only when it is difficult to carry out the arithmetic processing by processing circuits. Most of the basic processes are executed by hard logics the processing circuits. The image data are transferred between each of the hardware treating the image data at high speed. In consideration of the flexibility and expendability of the system, an image data bus is often prepared which is exclusively used for transferring image data between each of the hardware. Discrete image data are transferred on the image data bus in synchronization with a transfer clock having a constant timing.

As described above, basic arithmetic processes, which should be processed at high speed, are carried out in the processing circuits in general. The arithmetic processing of the image data is mainly divided into two cases, i.e. a case in which the output data are image data, and a case in which the output data are not image data. The former case includes an image converting process such as improving the contrast of input image data having low contrast. The latter case comprises processes such as calculating a density histogram of the input image data, calculating an area of an object of interest in the image. In the former type processing, the result of the process may be further arithmetically processed by the processing circuit. In the latter type processing, the result of the process is no longer an image data, and therefore the host CPU is in charge of the further processing of the result. The present invention relates to a structure of a processing circuit for the former type processing, namely, both input data and output data of the process are image data.

Meanwhile, image data converting process comprise a large number of processes from a relatively simple process such as evaluating a mean value of two images to a complicated process such as clearing of a dim image. It is understood that a complicated process is a combination of basic processes when we analyzed the complicated process. The most basic operations for the image data are as follows:

(1) Addition/Subtraction and Multiplication between image data and between image data and a constant (2) Logical operation such as AND, OR and the like between image data and between image data and a constant (3) Bit shift operation for the image data (4) Non-linear conversion such as logarithmic conversion The function of addition/subtraction and the logical operation are assigned to a group of circuits which is generally called an ALU (Arithmetic Logic Unit). The multiplication can be executed by combining an adding function and a bit shift function. However, recently, ICs for multiplication having the operation speed of several 10 nsec are available, and these ICs are often utilized. The non-linear conversion is executed by means of a table memory called a Look Up Table (simply referred to as LUT). More specifically, values of input data are in correspondence with address data of the table memory, and a conversion output corresponding to the input data is stored in advance in each address of the table memory. The bit shift operation can be executed by a simple gate logic, since the operation only requires shifting of bit correspondence between input and output data.

As described above, the processing circuits of a digital image processing apparatus should comprise at least an ALU, a multiplying circuit, a bit shift circuit and a LUT as most basic arithmetic operation circuits. FIG. 1 shows an example of a structure of a conventional digital image processing apparatus having these basic arithmetic circuits. Referring to the figure, an image input circuit 1 takes in image signals out of the apparatus by converting the same to a data format which can be handled in the apparatus. An image memory 2 stores image data and the stored image data are read therefrom. A plurality of image memories (2a, 2b, 2c) may be provided, if necessarily. A processing circuit 3 comprises various basic arithmetic operation circuits. In this example, it comprises a multiplying circuit 3a, an ALU 3b, a bit shift circuit 3c and a LUT 3d. An image output circuit 4 outputs data read from the image memory 2 to the outside of the apparatus. An image data bus 5 realizes image data transfer between each of the above described circuits in various combinations of the circuits, wherein buses 5a and 5b apply output data from the image input circuit 1 and from the image memory 2 to the processing circuit 3 and the image output circuit 4, and a bus 5c applies output data from the processing circuit 3 and from the image input circuit 1 to the image memory 2 and the image output circuit 4. A control operation such as switching between operation/non-operation of each circuit, designation of an output bus in the image input circuit 1 or in the image memory 2, setting of a constant in the multiplying circuit 3a, designation of a function and setting of a constant in the ALU 3b, designation of a number of stages to be shifted and of a shift direction in the bit shift circuit 3c, setting of data in a converting table of the LUT 3d, designation of an input bus to the image output circuit 4, and so on must be executed by the host CPU or by a control circuit exclusively used for this purpose. In FIG. 1, however, the circuits for these controls are omitted for the purpose of simplification.

As shown in FIG. 1, in a conventional digital image processing apparatus, arithmetic operation circuits in charge of basic operations are arranged in parallel and the input/output buses are commonly used, so that a plurality of arithmetic operation circuits can not be operated simultaneously. Let us consider a case in which a weighted mean value is evaluated between two image data X and Y with the coefficient of ⅞ and ⅛, for example. This process is realized in three frames in the image processing apparatus of FIG. 1, as shown in FIGS. 2(a)~(c). In this example, image data X and Y to be processed are stored in the image memories 2a and 2b, with the final result being written in an image memory 2c. In the first frame, the image data X in the image memory 2a is inputted to the multiplying circuit 3a through the image data bus 5a to be multiplied by 7 with the results written in the image memory 2c through the image data bus 5c. On this occasion, a constant number is set in the multiplying circuit 3a in advance and a state is designated in which multiplication is carried out between the image data on the image data bus 5a and the constant. In the second frame, image data are read from image memories 2c and 2b to be inputted to the ALU 3b through the image data buses 5a and 5b, as shown in FIG. 2(b). Then ALU 3b is designated to execute addition between image data on the image data buses 5a and 5b, and image data corresponding to $(7X+Y)$ is outputted onto the image data bus 5c. The result of the process is written in the image memory 2d. In the third frame, the read data from the image memory 2d is inputted to the bit shift circuit 3c through the image data bus 5a. The bit shift circuit 3c is set such that it shifts the input data to the right direction by 3 bits. Consequently, it provides an output data which is the input data divided by 8. Namely, the output data will be $(7X/8+Y/8)$. The output data is written in the image memory 2c through the image data bus 5c. As described above, in a conventional image processing apparatus, when three arithmetic operation circuit are necessary to execute a series of processes, three frames of processes are needed even if the three operation circuits are separate circuits, and only one arithmetic operation circuit can operate in each frame. Therefore, the operation circuits can not be effectively used, and therefore the operation speed was slow. In order to reserve the original image data, a separate image memory is needed as a working memory. If a separate memory is not used, one of the two image memories for original image data must be used as the working memory. Therefore, neither operation circuits nor image memory are utilized effectively.

FIG. 3 shows an example of a structure of another digital image processing apparatus which is an improvement of the prior art shown in FIG. 1. It is different from the prior art shown in FIG. 1 in that an image data bus 50 is added to enable coupling of input/output data between each of the operation circuits. Referring to the figure, a bus 50a supplies output data from the multiplying circuit 3a to other arithmetic operation circuits(3b,3c, 3d), a bus 50b supplies output data from the ALU3b to other arithmetic operation circuits (3a, 3c, 3d), a bus 50c supplies output data from the bit shift circuit 3c to other arithmetic operation circuits (3a, 3b, 3d), and a bus 50d supplies output data from the LUT3d to other arithmetic operation circuits (3a, 3b, 3c).

Let us consider a case in which the same process as shown in FIGS. 2(a)~(c) is effected by the image processing apparatus of FIG. 3. FIG. 4 shows the connections between these circuits in that case. The image data from the image memory 2a is inputted to the multiplying circuits 3a through the data bus 5a, multiplied by the constant 7 to be inputted to the ALU 3b through the data bus 50a. Meanwhile, the image data on the image memory 2b is directly inputted to the ALU 3b through the data bus 5b. The ALU 3b adds the two inputs and applies the result to the bit shift circuit 3c through the data bus 50b. The bit shift circuit 3c shifts the input data in the right direction by 3 bits and the obtained output data is outputted onto the data bus 5c. The image data on the data bus 5c is written in the image memory 2c as the result of the process. Thus, the process which required 3 frames in FIG. 2 (a)~(c) can be done in 1 frame by virtue of the newly added image data bus 50. Although the structure of FIG. 3 solves the problems of the structures shown in FIG. 1, it newly provide the following problems. Namely, the number of image data buses is increased twice or more at one time; the number of input/output ports of each operation circuit is increased; the input/output control becomes troublesome due to the increase of the number of ports; and the delay time between input/output data of the whole processing circuits is not constant, since a plurality of operation circuits are arbitrarily coupled. If a new arithmetic operation circuit should be added, the number of image data buses and the number of input and output ports of each operation circuits must be increased. Therefore, it is difficult to extend the structure of FIG. 3.

In the foregoing, two structures of conventional digital image processing apparatuses having basic operation functions have been discussed. The former structure is simple but the operation circuit and image memories can not be effectively used, so that the operation speed is slow. In the latter structure, the operation circuits and image memories can be effectively used, but the image data bus becomes large, the number of input/output ports of each operation circuit is increased, and therefore the input/output control becomes troublesome. In addition, it is difficult to extend the structure, and the delay time between input/output data is not constant.

SUMMARY OF THE INVENTION

The present invention was made to solve the above described problems, and its object is to provide a digital image processing circuit in which the arithmetic operation circuits can be effectively used, which can execute processes effectively, and to which new circuits can be easily added, without making the hardware complicated compared with the prior art.

Another object of the present invention is to provide a digital image processing apparatus capable of realizing various processing functions at high speed without adding exclusive processing circuits corresponding to separate processing functions.

A digital image processing circuit in accordance with the present invention comprises a multiplying circuit which outputs a result of multiplication between a first input to be multiplied and a second input to be multiplied; an ALU effecting addition/subtraction or a logical operation between a first input to be processed and a second input to be processed with the first input to be processed being the output from the multiplying circuit; a bit shift circuit effecting bit shift operation on a data outputted from the ALU; a data converting table with an address input of a memory being the output from the bit shift circuit and an output data therefrom being the read data from the memory; a first selector for switching the second input to be multiplied to the multiplying circuit; a first constant register applying one input data to the first selector; a second selector for switching the second input to be processed to the ALU; and a second constant register applying one input data to the second selector. A first image data to be processed is used as the first input to be multiplied in the multiplying circuit; a second image data to be processed is used as the other input data of each of the first and second selectors; and the output from the data converting table is the image data resulting from the process. The contents in the first and second constant registers, selecting functions of the first and the second selectors, operation functions of the ALU, the shift direction and the number of stages to be shifted by the bit shift circuit, and the content of the data converting table can be set prior to the processing operation of the processing circuits.

As described above, in the present invention, each of the basic arithmetic operation circuits is neither independently nor equally arranged in association with the image data bus, but the multiplying circuit, the ALU, the bit shift circuit and the data converting table(LUT) are serially arranged so that the image data flows in this order. The order of the arrangement provides a structure which is suitable for calculating the sum of products, which operation is often employed in the image processing. Therefore, each of the basic arithmetic operation circuits can be effectively used, whereby the processing speed can be improved. In most cases, image memories for storing results provided during the processing can be eliminated, so that the image memory can be effectively used. In addition, since the operation circuits are arranged serially, a simple structure having 2-inputs and 1-output can be maintained as a whole. Therefore, the hardware does not become complicated as did the prior art to increase the speed of processing, the input/output control is easy and the system can be easily extended.

In another aspect of the present invention, multistages of basic processing circuits to which first and second image data can be inputted are cascade connected with each other. Each of the basic processing circuits comprises at least a multiplying circuit using the first image data as one input to be multiplied; an ALU effecting addition/subtraction or a logic operation between one input to be processed which is the output data of the multiplying circuit and the other input to be processed; first and second constant registers; a multiplying circuit input selector which selects a second image data or a set value of the first constant register so as to use the same as the other input to be multiplied in the multiplying circuit; and an ALU input selector selecting a second image data, a set value of the second constant register or an output data of the ALU included in the basic processing circuits in the preceding stage to use the same as the other input to be processed in the ALU.

In accordance with another aspect of the present invention, a new image processing function can be added by adding the same processing circuits or by changing the state of coupling, and therefore, it is not always necessarily to newly design and manufacture a new processing circuit. Therefore, compared with the prior art structure in which a plurality of processing circuits having different functions are provided in case of need, the processing circuits in accordance with another aspect of the present invention have smaller circuit scale and higher efficiency in utilizing circuits, since the present invention utilizes a number of the same processing circuits. Consequently, the necessity of designing and manufacturing circuits can be decreased and therefore the present invention is economical. The use of the number of processing circuits having the same structure is effective in implementing the processing circuit in an IC and therefore it is advantages in making the image processing system compact.

The foregoing and other objects, features, aspects and advantages of the present invention will become more apparent from the following detailed description of the present invention when taken in conjunction with the accompanying drawings.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates an example of operation of a digital image processing apparatus shown in FIG. 1;

DESCRIPTION OF THE PREFERRED EMBODIMENT

Embodiment 1

Figure 5:
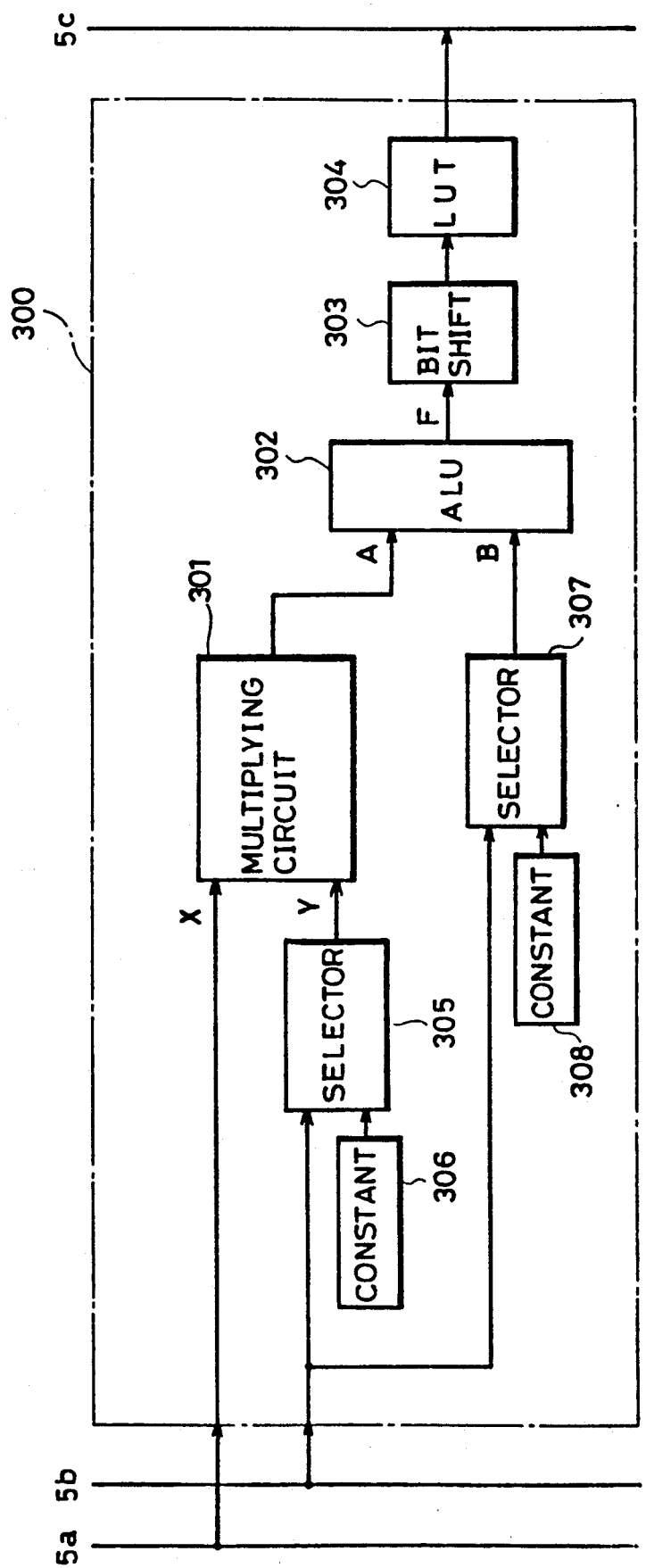
FIG. 5 is a block diagram showing a structure of a processing circuit in accordance with one embodiment of the present invention.

FIG. 5 is a block diagram showing the structure of the processing circuit in accordance with one embodiment of the present invention. As shown in the figure, the processing circuit 300 of the present embodiment comprises a multiplying circuit 301, an ALU 302, a bit shift circuit 303, an LUT 304, selectors 305 and 307, and constant registers 306 and 308. The selector 305 is a Y-input selector which selects an image data on the image data bus 5b or a set value of the constant register 306 for Y input to input the same (Y input in the figure) to the multiplying circuit 301. In the multiplying circuit 301, a multiplication is effected between the selected output from Y input selector 305 and the image data (X input in the figure) on the image data bus 5a. The selector 307 is a B input selector which selects the image data on the image data bus 5b or a set value of the constant register 308 to input the same (B input in the figure) to the ALU 302 in the same manner as Y input selector 305. The ALU 302 effects an operation on the selected output from the B input selector 307 and the output data (A input in the figure) of the multiplying circuit 301. The operation output (F output in the figure) from the ALU 302 is inputted to the bit shift circuit 303. The output from the bit shift circuit 303 is inputted to the LUT 304. The conversion output from the LUT 304 is outputted on the image data bus 5c. Various control operations such as change of setting in the two constant registers 306 and 308, designation of selecting operation of the two selectors 305 and 307, designation of function of the ALU 302, designation of the shift direction and of the number of stages to be shifted in the bit shift circuit 303, setting of a conversion table to the LUT 304, designation of output/non-output of the conversion output from the LUT 304 onto the image data bus 5c can be carried out by instructions from a control circuit such as a host CPU, not shown.

As described above, in the example shown in FIG. 5, a plurality of arithmetic operation circuits which have been separately arranged in the prior art are collected and arranged in series in one processing circuit.

In order to more clearly explain the embodiment of FIG. 5, the function thereof will be briefly described in the following.

The multiplying circuit 301 outputs a product of an X input and a Y input. The X input is a first image data to be processed. The Y input can be selected by the selector 305 and it is a constant in the constant register 306 or the second image data to be processed. If the Y input is 1, the X input is directly outputted.

The ALU 302 generates a result of addition/subtraction or a logic operation between the A input and B input as an F output. The A input is the output from the multiplying circuit 301. The B input can be selected by the selector 307, and either the constant in the constant register 308 or the second image data to be processed is inputted. If the function such as $F=A$, $F=B$ or $F=A\pm B(B=0)$ is designated, the input will be directly outputted.

The bit shift circuit 303 generates an output which is a $(\frac{1}{2})^n$ multiple of an input obtained by right shift of n stages (n is a positive integer) and an output which is a $2^n$ multiple of an input obtained by the left shift of n stages. If the number of stages to be shifted is selected to be zero, the input will be directly outputted.

The LUT 304 is a table memory which converts input data to arbitrary output data, and is utilized in non-linear arithmetic processing. If a conversion table which executes the conversion of input data=output data is set, the input will be directly outputted.

Although the multiplying circuit 301, the ALU 302, the bit shift circuit 303 and the LUT 304 are connected in series in the processing circuit 300 of FIG. 5, it can effect any one basic operation out of the four basic operations when the arithmetic operation circuits except one circuit are set at the stage in which input are directly outputted.

The four arithmetic operation circuits may be arranged in arbitrary order to realize these functions. However, in image processing, calculation of the sum of products are often carried out in general, and the multiplying circuit 301 is preferably arranged in the preceding stage of the ALU 302 serving as an addition circuit, for this purpose. Since the digit of the image data becomes large after the calculation of the sum of products, normalizing process is often carried out successively after the calculation of the sum of products. For this purpose, the bit shift circuit 303 should preferably be arranged in the succeeding stage of the ALU 302 serving as the addition circuit. When the normalizing process is carried before the calculation of the sum of product, there will be rounding errors. Therefore, the bit shift circuit 303 should not be arranged in the proceeding stage of the ALU 302 or the multiplying circuit 301. As for the arrangement of the LUT 304, the LUT carries out non-linear operations, and therefore, it is hardly interposed between other three arithmetic operation circuits carrying out linear operations. Therefore, the LUT 304 should be arranged in the last stage or the first stage of the processing circuit 300. Since the non-linear operation are often carried out to compensate for the portion which can not be treated by linear operations, the LUT 304 should be preferably be arranged in the last stage of the processing circuit 300.

Figure 3:
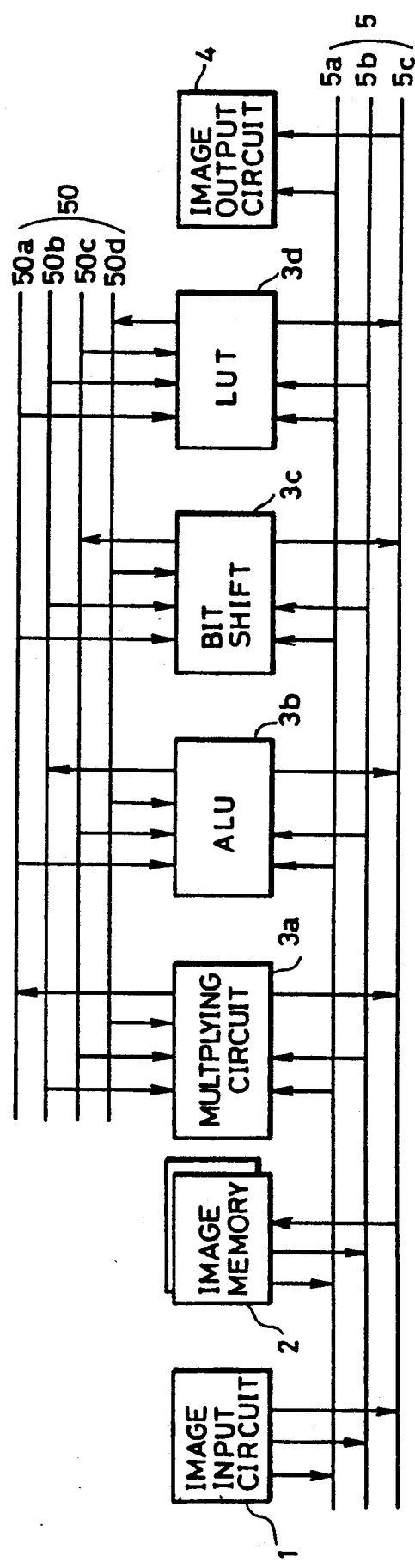
FIG. 3 is a block diagram showing another example a conventional digital image processing apparatus.

In view of the foregoing, in the processing circuit 300 of FIG. 5, the multiplying circuit 301, the ALU 302, the bit shift circuit 303 and the LUT 304 are serially arranged in this order, and the arrangement of respective arithmetic operation circuits are fixed. Therefore, compared with the prior art permitting arbitrarily arrangement (see FIG. 3), the relation of connection do not become complicated, the control of input/output is simple and the present invention has expendability. In addition to the basic arithmetic operation carried out by the single operation of any arithmetic operation circuit, various effective composite arithmetic operation functions which are physically and arithmetically important can be realized when a plurality of arithmetic operation circuits are operated simultaneously. For example, composite arithmetic operations physically and mathematically important, such as calculation of the sum of products by the multiplying circuit 301 and the ALU 302, evaluating mean value by the ALU 302 and the bit shift circuit 303, weighted mean processing by the multiplying circuit 301, the ALU 302 and the bit shift circuit 303, composite processing of linear and non-linear operations by the LUT 304 and any of the linear operation circuits 301 to 303, differential process provided by subtraction between images shifted spatially; and so on can be carried out at the same speed as the basic operation. More specifically, the result obtained from the arithmetic operation circuits in the preceding stage can be directly used in the arithmetic operation circuits in the succeeding stage, whereby processes required a plurality of frames in the prior art (see FIG. 1) can be executed in 1 frame in most cases, increasing the speed of processing. In addition, the extra image memories used as working memories for storing results provided during processing can be dispensed with in most cases from the same reason, whereby the efficiency in using the image memory can be enhanced.

The specific operation of the embodiment shown in FIG. 5 will be described in the following. At first, description will be given of the fact that each of the arithmetic operation circuits included in the processing circuit 300 can operate as a single processing circuit as in the prior art.

(I) Basic Operation

Let us consider a case in which the multiplying circuit 301 functions by itself. In this case, $F=A$ is set as the function of the ALU 302, the number of the stages to be shifted in the bit shift circuit 303 is selected to be zero, and a conversion table is set in the LUT 304 which table provides the relation of (output data=input data), whereby the output data from the multiplying circuit 301 is not subjected to any conversion by the following arithmetic operation circuits, and is directly outputted to the image data bus 5c from the LUT 304. Two types of multiplications, namely, multiplication between two image data on the image data buses 5a and 5b and a multiplication between the image data on the image data bus 5a and a set value in the constant register 306 for Y input can be carried out in accordance with the selection of the Y input selector 305.

Next, let us consider a case in which the ALU 302 functions by itself. In this case, 1 is set as a constant value in the constant register 306 for Y input, Y selector 305 is adapted to apply the set value of the constant register 306 for Y input to the multiplying circuit 301, and the bit shift circuit 303 and the LUT 304 are set at the stage in which no change is generated between the input and output data as in the above example, whereby the data on the image data bus 5a is free from any conversion and directly applied to the A input of the ALU 302, and the operation output in accordance with the function set in the ALU 302 is outputted onto the image data bus 5c through the bit shift circuit 303 and the LUT 304. In this case also, two types of operations, that is, operation between image data and operation between an image data and a constant value can be carried out.

Next, let us consider a case in which the bit shift circuit 303 functions by itself. In this case, the image data (X input) on the image data bus 5a is multiplied by the set value 1 in the constant register 306 for Y input in the multiplying circuit 301 with the output therefrom inputted to the A input of the ALU 302. The function $F=A$ is set in the ALU 302, and therefore, the image data inputted to the bit shift circuit 303 is nothing but the image data on the image data bus 5a itself. Alternatively, the image data on the image data bus 5b may be inputted to the B input of ALU 302 and the function of $F=B$ maybe set to input the image data free from any conversion to the bit shift circuit 303. By setting a converting table in which the input data is the same as the output data in the LUT 304 as in the above described two examples, the results of the sole function of the bit shift circuits 303 is outputted to the image data bus 5c through the LUT 304.

Finally, let us consider a case in which the LUT 304 functions by itself. In this case, the image data on the image data bus 5a is multiplied by a constant value 1 in the multiplying circuit 301, the output of the multiplying circuit 301 is directly outputted from the ALU 302 in accordance with the function $F=A$, and the image data which is not shifted in the bit shift circuit 303 is inputted to the LUT 304. The image data on the image data bus 5a, which is not converted, is directly inputted to the LUT 304, thus the LUT 304 functions by itself.

The above description shows that the processing circuit 300 of the present embodiment can effect basic operations as in the prior art by the single operation of each of the arithmetic operation circuits. In the following, composite arithmetic operations carried out by a plurality of simultaneously operating arithmetic operation circuit making use of the arrangement of respective arithmetic operation circuits will be described.

(II) Composite Arithmetic Operation (i) Weighted Mean Processing

Figure 4:
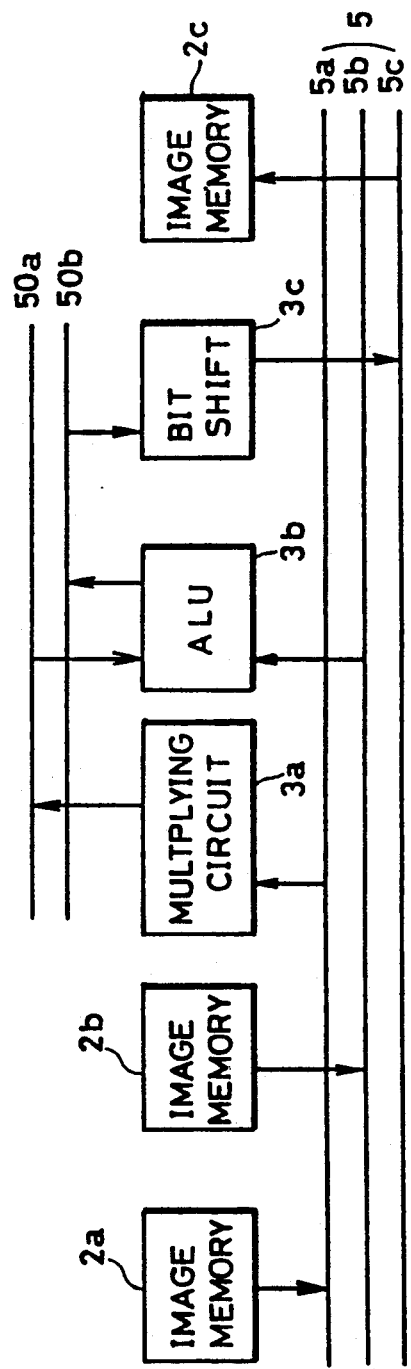
FIG. 4 illustrates an example of the use of the digital image processing apparatus shown in FIG. 3.
Figure 6:
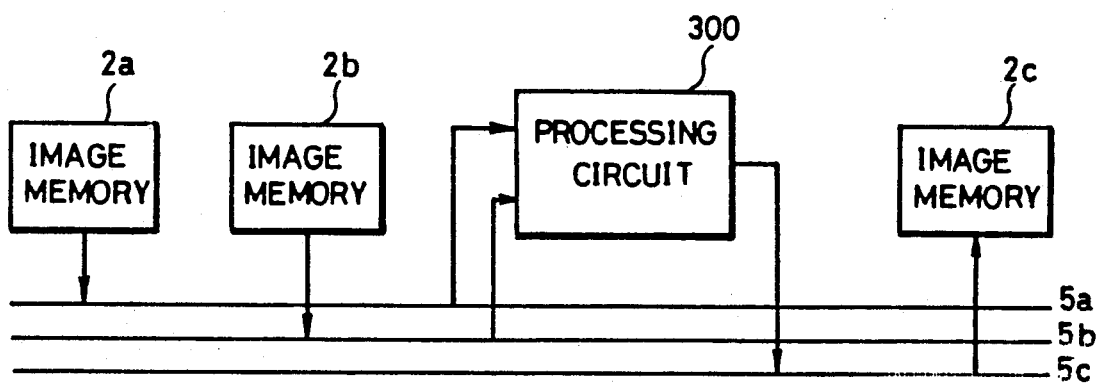
FIG. 6 illustrates an example of the use of the processing circuit shown in FIG. 5.

At first, the weighted mean processing shown in FIGS. 2 and 4 of the conventional processing circuit is carried out by the processing circuit 300 of FIG. 5. FIG. 6 shows the state of connection between each of the circuits in this case. Two planes of image data are stored in the image memories 2a and 2b and the read data is outputted to the image data buses 5a and 5b. The output data from the processing circuit 300 is written in the image memory 2c through the image data bus 5c. It is assumed that a constant value 7 is set in the constant register 306 for Y input; the Y input selector 305 is adapted to apply the set value of the constant register 306 for Y input to the Y input of the multiplying circuit 301; the B input selector 307 is designated to apply the image data on the image data bus 5b to the B input of the ALU 302; the function $F=A+B$ is set in the ALU 302; the bit shift circuit 303 is adapted to shift the input data to the right by 3 bits; and a conversion table in which (output data=input data) is set in the LUT 304, in the processing circuit 300. The above described setting enables the same weighted mean process as shown in FIGS. 2 and 4 by the connection state shown in FIG. 6. Since it is realized in 1 frame as in the case shown in FIG. 4, so that the speed of operation is higher than that of FIG. 2 requiring three frames. Only three image data buses 5a, 5b and 5c are necessarily as in the cases of FIGS. 1 and 2. Compared with the structure shown in FIGS. 3 and 4 having 7 data buses, the structure is simple. As for the whole structure of the processing circuit, the processing circuit 300 of FIG. 5 has the most simple structure having two input ports and one output port. In this manner, the processing circuit 300 of FIG. 5 operates very effectively, since the order of arrangement of the multiplying circuit 301 and the ALU 302 serving as the addition circuit is suitable for effecting the calculation of the sum of products which is often employed in image processing. In addition, the bit shift circuit 303 arranged in the succeeding stage of the ALU 302 can be effectively used to normalize the image data with the digit increased by the calculation of the sum of products.

(ii) Contrast Converting Process

Figure 7:
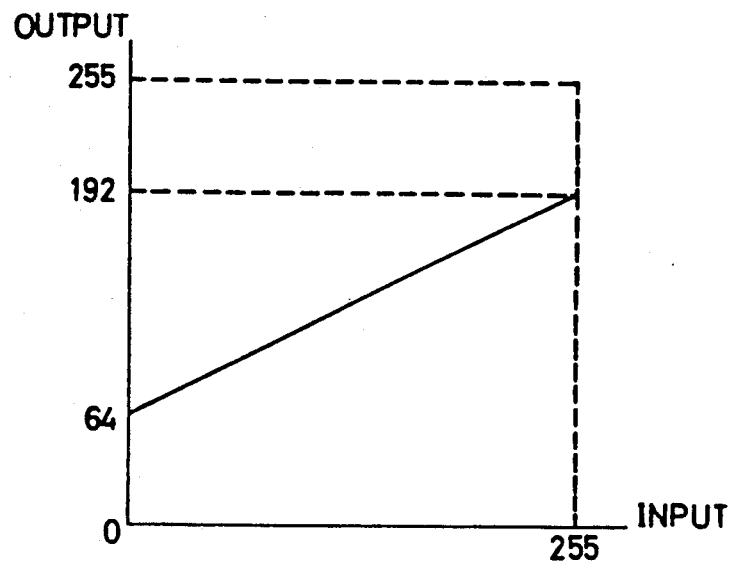
FIGS. 7 and 8 show input/output converting characteristics of the processing circuit of FIG. 5 in another example of use.

A simple contrast converting process will be described as another example in which the coupling order of the multiplying circuit 301 and the ALU of the processing circuit 300 shown in FIG. 5 is effectively used. In this case, the image memory 2b can be omitted from the structure shown in FIG. 6. In the above example, the image data on the image data bus 5b is inputted to the B input of the ALU 302. In this example, a set value in the constant register 308 for B input is inputted to the B input. More specifically, the data read from the image memory 2a is inputted to the X input of the multiplying circuit 301 through the image data bus 5a to be multiplied by the set value in the constant register 306 for Y input, and addition or subtraction is further carried out between the result of multiplication the set value in the constant register 308 for B input in the ALU 302. The bit shift circuit 303 and the LUT 304 do not effect any conversion. When it is assumed that 1 pixel of the image data is represented by 8 bits (having the value from 0 to 255), a constant 0.5 is set in the Y input register 306 for Y input, a constant 64 is set, in the constant register 308 for B input and the function $F = A + B$ is designated in the ALU 302 under the above described setting, the input/output relation will be as shown in FIG. 7, whereby the conversion is effected by which the contrast of a high contrast image is lowered.

Figure 8:
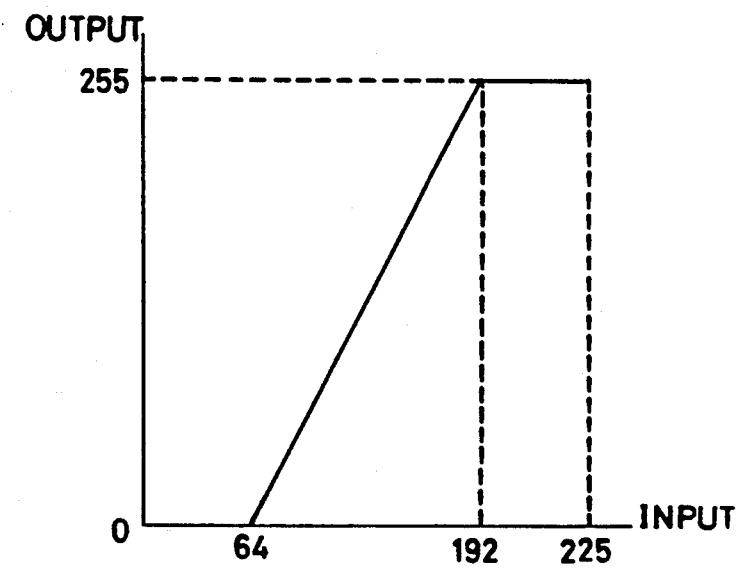

By setting a constant 2 in the constant register 306 for Y input, setting a constant 128 in the constant register 308 for B input, and by designating the junction as $F = A - B$ in the ALU 302, the relation between the input and output will be as shown in FIG. 8, whereby the conversion is effected in which the contrast of a low contrast image is enhanced.

In both conversions, the conversion characteristics can be moved in parallel by changing the set value in the constant register 308 for B input, and the inclination of the conversion characteristics can be adjusted by changing the set value in the constant register 306 for Y input. It goes without saying that such contrast converting process can be implemented by the LUT 304. However, in case of a simple linear conversion, it is more advantageous than employing the LUT 304 since the effect of contrast conversion can be easily changed as described above. In the processing circuit 300 of the present embodiment, the linear portion provided by the linear conversion utilizing the multiplying circuit 301 and the ALU can be further processed to provide nonlinear effect by the LUT 304 in a simple manner.

(iii) Spatial Filtering Process

Figure 9:
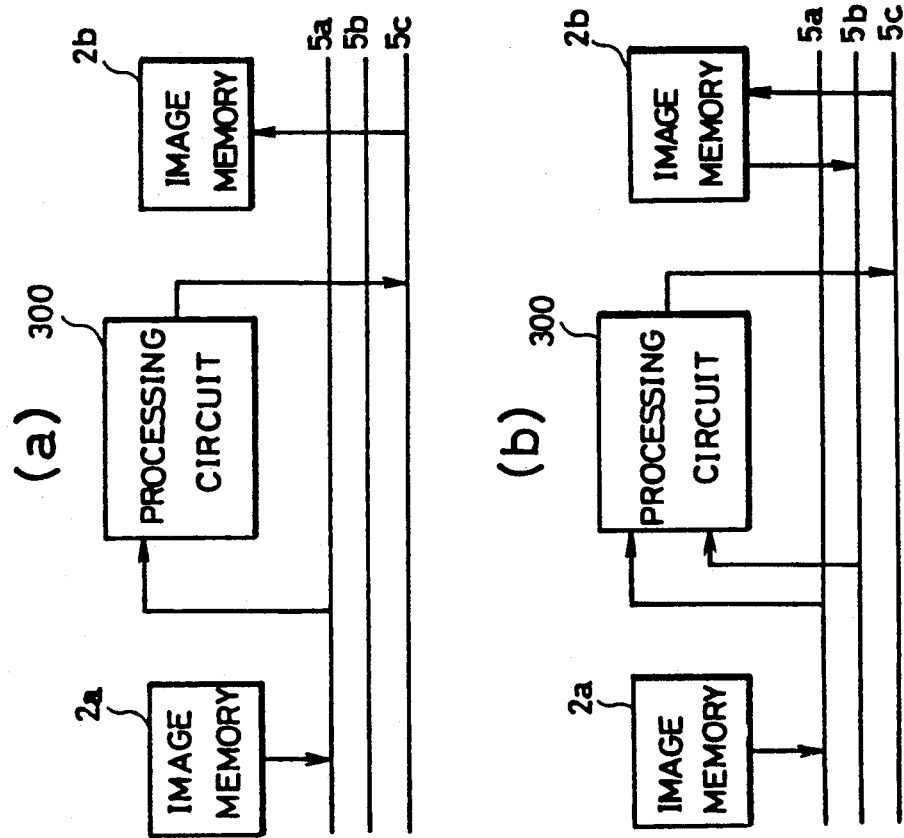
FIG. 9 illustrates a further example of use of the processing circuit of FIG. 5.

In the following, description will be given of a case in which the processing circuit 300 of the present embodiment is applied to a more complicated arithmetic processing. Spatial filtering process will be discussed as an example. In a so-called spatial filtering process, data of a plurality of pixels around the object pixel are used to obtain a result of the process of 1 pixel. More specifically, each of the data of the surrounding pixels is multiplied by a prescribed coefficient, and the result of multiplication are summed to provide the final result. Connections between each of the circuits to realize one dimensional spatial filter in the horizontal direction are shown in FIGS. 9(a) and (b). FIG. 9(a) shows the state in the first frame, and FIG. 9(b) shows the state in the second and third frames. In the figures, image data to be processed are stored in the image memory 2a and the image data during the processing and the image data of the final result are stored in the image memory 2b.

In the first frame, the read data (=image data to be processed) from the image memory 2a is inputted to the X input of the multiplying circuit 301 in the processing circuit 300 through the image data bus 5a. On this occasion, the timing of reading the image data is delayed from the standard timing by 1 pixel. A constant value 2 is set in the constant register 306 for Y input, and the set value is applied by the Y input selector 305 to the multiplying circuit 301. A constant value 0 is set in the constant register 308 for B input, and the constant value 0 is applied to the B input of the ALU 302 by the B input selector 307, the function of the ALU is designated as $F = A + B$, the number of stages to be shifted in the bit shift circuit 303 is selected to be 0, and a conversion table which generates no change between input and output data is set in the LUT 304. Consequently, a result of multiplication between the read data from the image memory 2a and a coefficient 2 is provided on the image data bus 5c. The image data on the image data bus 5c is written in the image memory 2b.

The state of the processing circuit 300 in the second frame is the same as that in the first frame except the following points: namely, a constant value 3 is set in the constant register 306 for Y input, and the image data on the image data bus 5b is applied to the B input of the ALU 302 by the B input selector 307. The read data from the image memory 2a is applied to the X input of the multiplying circuit 301 through the image data bus 5a, the read data from the image memory 2b in which the result of the first frame is stored, is applied to B input of the ALU 302 through the image data bus 5b. The output data from the LUT 304 is written in the image memory 2b through the image data bus 5c. On this occasion, the timing of reading from the image memories 2a and 2b corresponds to the standard timing. The image data provided in the image memory 2b is the result of linear coupling of two pixels in the left and right of the image data in the image memory 2a by coefficients 2 and 3.

The state of the processing circuit 300 in the third frame is the same as that in the second frame except that the constant value set in the constant register 306 for Y input is changed to 4. The relation of connection between the image memories 2a and 2b, and image data buses 5a, 5b and 5c is the same as the second frame. However, the timing of reading from the image memory 2a is prior to the standard timing by 1 pixel. The image data provided to the image memory 2b is the result of linear coupling of pixels adjacent to the image data in the image memory 2a in the horizontal direction by coefficients 2, 3 and 4. Thus, the spatial filtering process, which is the intended operation, is completed.

The foregoing shows an example in which the order coupling of the multiplying circuit 301 and the ALU 302 in the processing circuit 300 is effective as a circuit calculating the sum of products. The spatial filtering was realized by shifting the timing of reading from the image memory 2a by 1 pixel per 1 frame. When the same reading timing is used in each of the frames and three image data corresponding to three components of a color image are read to the image data bus 5a from each of the frames, it can be applied to the coordinate transformation of color for color image data. On this occasion, non-linear converting process can be simultaneously carried out on the data provided by the coordinate transformation of color, by utilizing the LUT 304 in the third frame.

Embodiment 2

Figure 10:
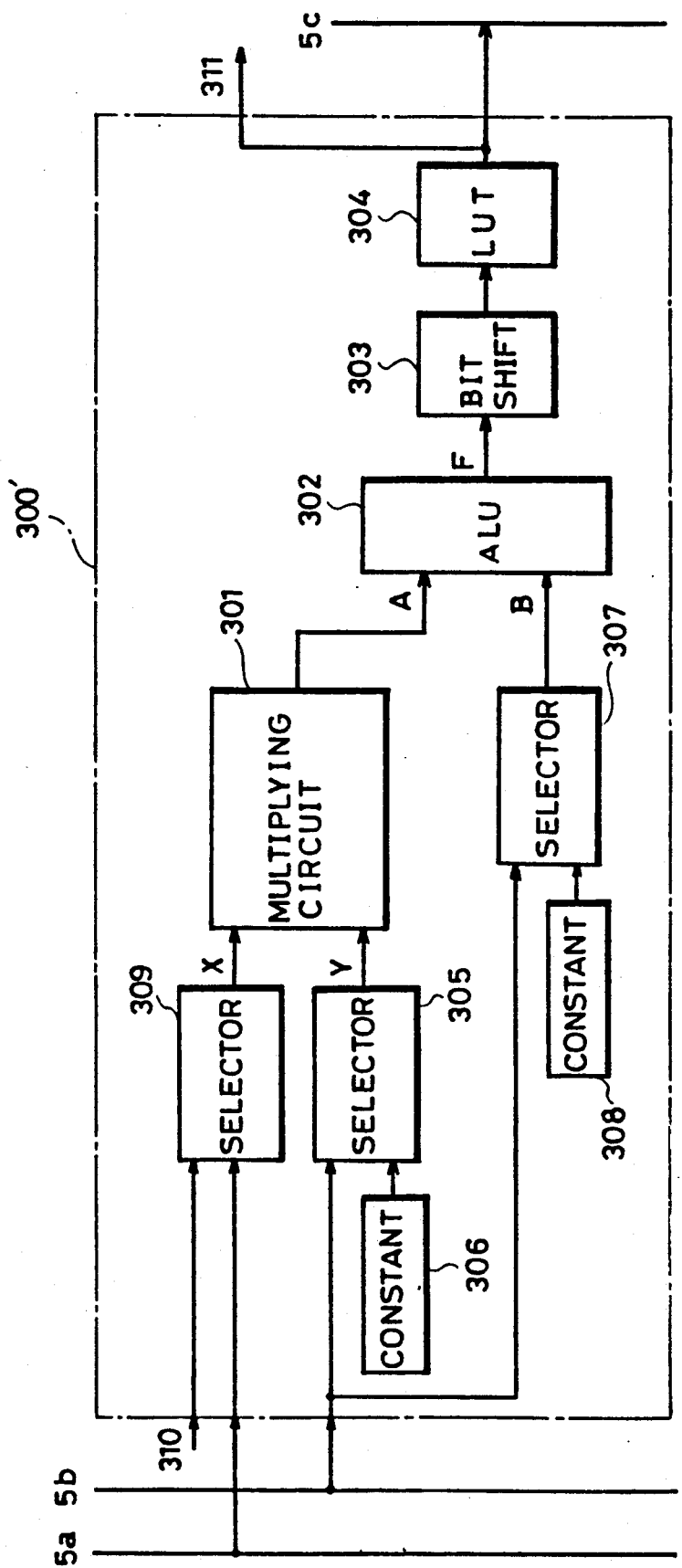
FIG. 10 is a block diagram showing a structure of a processing circuit in accordance with another embodiment of the present invention.
Figure 11:
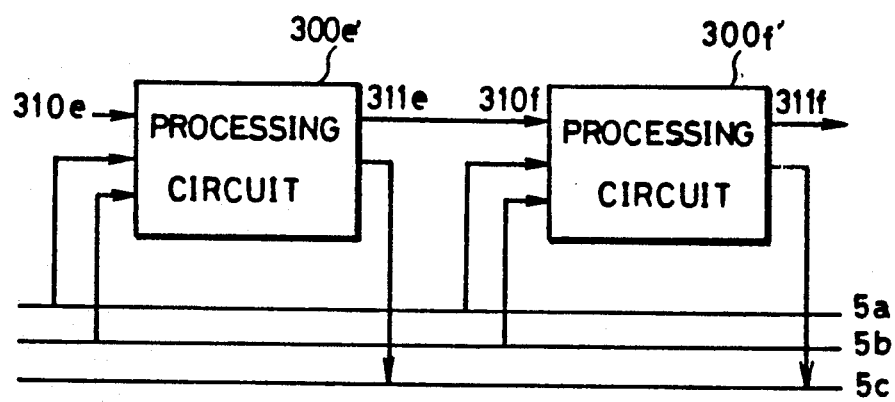
FIG. 11 illustrates an example of use of the processing circuit shown in FIG. 10.
Figure 12:
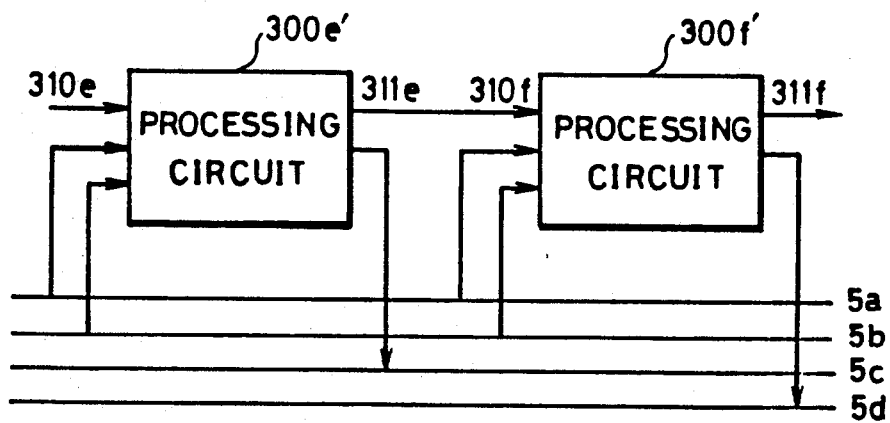
FIG. 12 illustrates another example of use of the processing circuit of FIG. 10.

An image processing circuit in accordance with another embodiment of the present invention is shown in FIG. 10. It is different from the example of FIG. 5 in that an X input selector 309 for selecting the X input to the multiplying circuit 301 is newly provided and accordingly, a new input terminal 310 and an output terminal 311 are newly provided. These differences become advantageous when a plurality of processing circuits of FIG. 10 are utilized. FIGS. 11 and 12 show examples of connection when there are two processing circuits of the same type. In both examples, the output data from the LUT (not shown) in the first processing circuit 301e' is directly inputted to the X input selector (not shown) of the second processing circuit 300f through the input terminal 310f of the second processing circuit 300f and not through the image data bus 5. In the example of FIG. 11, the output data from the two processing circuits 300e' and 300f are both outputted to the image data bus 5c, while in the example of FIG. 12, the output data of the second processing circuit 300f is outputted to a newly provided image data bus 5d. Therefore, in the former example, the simultaneous parallel operation of two processing circuits cannot be carried out independently as in the arithmetic operation circuit 3a~3d in FIG. 1. In the latter example, the simultaneous parallel operation of the two processing circuit 300e' and 300f is possible since different output buses are used.

• As described above, according to this embodiment, complicated coupling between processing circuits in which respective arithmetic operation circuits are fixedly arranged becomes possible, and a process which required 2 frames in the example of FIG. 5 can be effected in 1 frame. For example, when the non-linear conversion by the LUT 304 should be carried out prior to the linear operations by the multiplying circuit 301, the ALU 302 and the bit shift circuit 303, the non-linear conversion must be carried out in the first frame and the linear operations must be carried out in the succeeding second frame in the embodiment of FIG. 5. However, in this embodiment connected as shown in FIGS. 11 and 12, the process can be completed in 1 frame when the non-linear conversion is carried out in the first processing circuit 300e' and the linear operation is effected in the second processing circuit 300f. In addition, in the embodiment of FIG. 5, an image memory is needed as a working memory for storing the result provided during the processing. This embodiment does not need any working memory for storing the result provided during the process.

In the following, an embodiment will be described in which no exclusive processing circuit is required to effect a specified operation function at high speed using the embodiment of FIG. 5.

Figure 1:
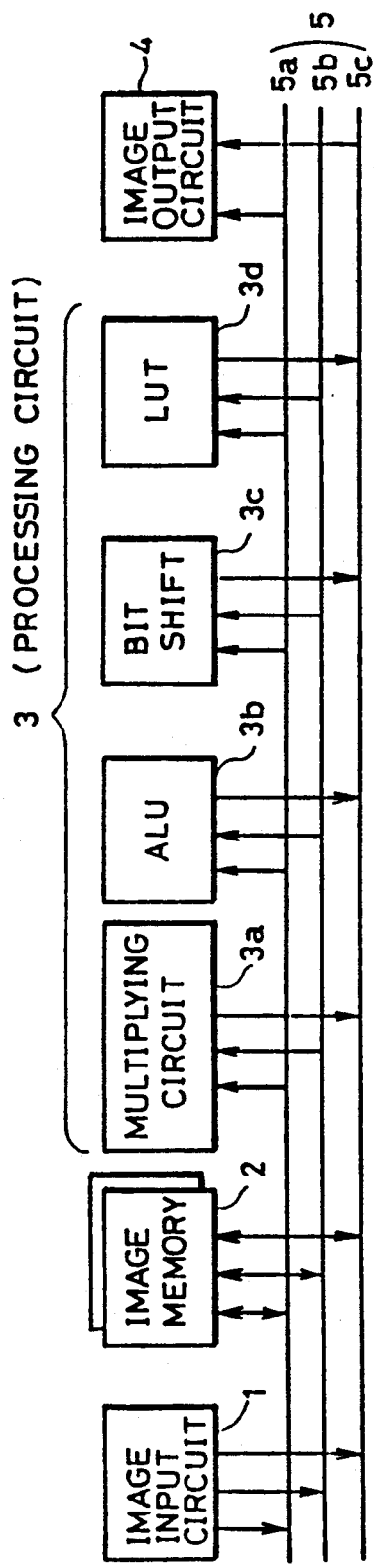
FIG. 1 is a block diagram showing a structure of a conventional digital image processing apparatus.

Meanwhile, in a conventional digital image processing apparatus such as shown in FIG. 1, the basic operation such as described above is effected by a necessary one circuit out of the arithmetic operation circuits 3a to 3d. In a more complicated arithmetic processing, four arithmetic processing circuits 3a~3d are repeatedly used in accordance with a prescribed order. A case will be discussed in which a FIR filtering process is carried out on the image data. The FIR (Finite Impulse Response) filter has finite output to the impulse input. A transversal filter has been known as a typical example of the FIR filter, which is adapted to provide a sum of weight on each tap of delay elements. The transversal filter is a non-recursive filter in which an output signal is defined without using output signals provided in the past. The FIR filter is used in general for the horizontal direction and the vertical direction of the image signals. The reason for this is that a linear phase filter can be provided in which the phase is delayed by a constant time period for each frequency component by appropriately selecting the coefficient, which is visually preferable. The one dimensional FIR filtering process is realized by adding a result of multiplication of a prescribed coefficient with values of pixels arranged adjacent to each other in the horizontal direction. The two dimensional FIR filtering process is realized by adding the result of one dimensional FIR filtering process to the lines adjacent to each other in the vertical direction. For example, in the two dimensional FIR filtering process on the kernel size of '3×3, 9 times multiplication and 9 times of addition are required per 1 pixel. Therefore, the multiplying circuit and the ALU are respectively used for 9 frames, whereby the process is completed in 18 frames in total.

As described above, since the digital image processing apparatus shown in FIG. 1 comprises basic arithmetic functions which are the minimum requirements, it can carry out any process by appropriately combining the basic functions. However, if the process becomes complicated, the time required for one process becomes longer. If that process is frequently used relative to the whole process, the reduction of the time required for that process will reduce the total time required for the processing. In view of the foregoing, sometimes an exclusive processing circuit capable of carrying out a specified arithmetic function at high speed is specially provided.

Figure 13:
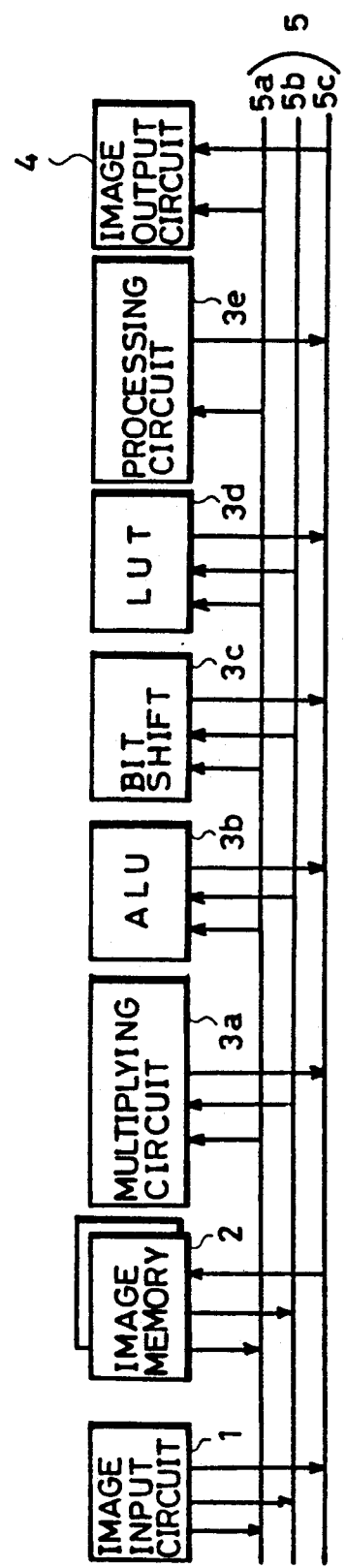
FIG. 13 is a block diagram showing another example a structure of a conventional digital image processing apparatus.
Figure 14:
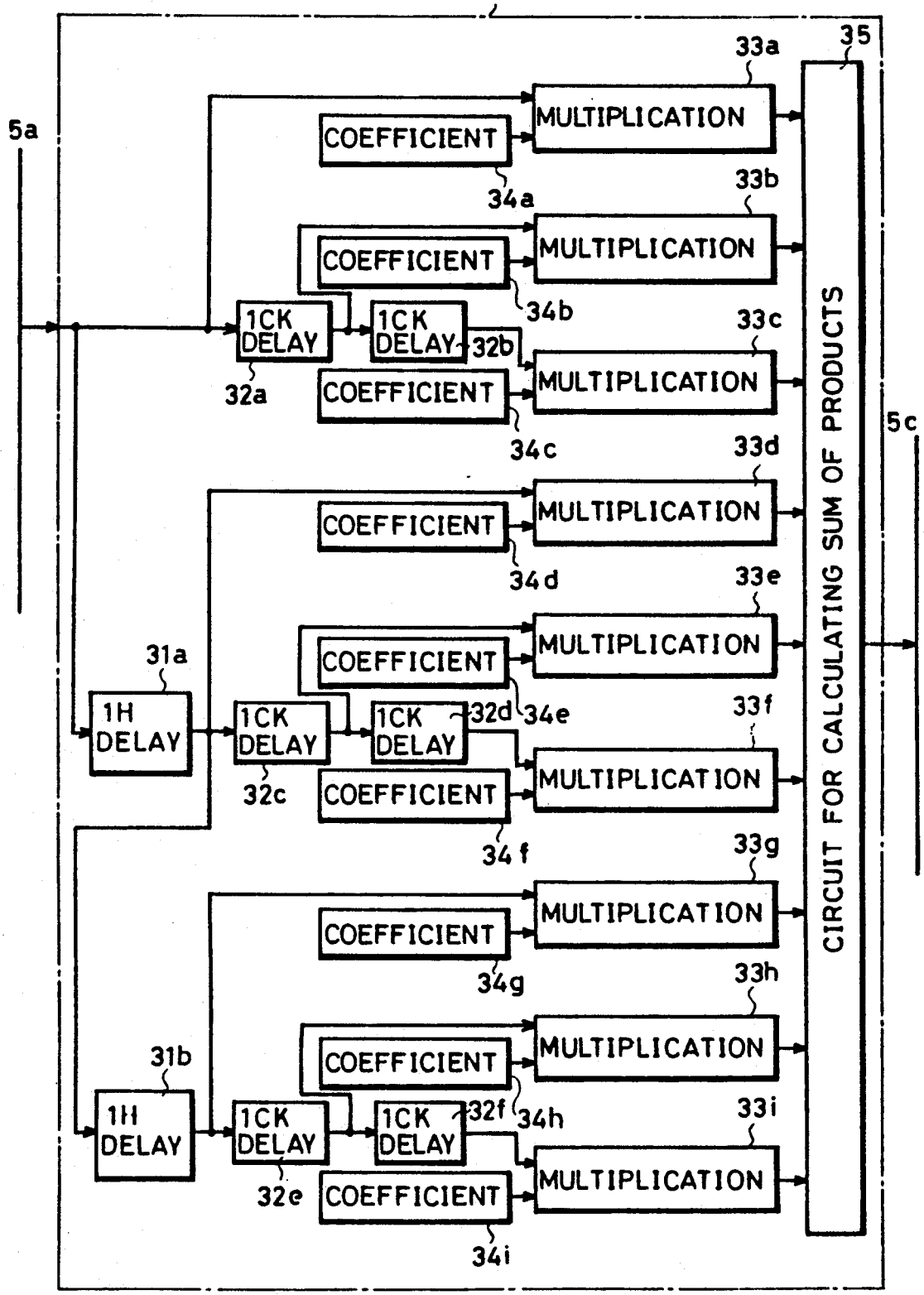
FIG. 14 is a block diagram showing an example of the structure of the conventional processing circuit for realizing two dimensional FIR filtering with the kernel size of 3×3.

FIG. 13 shows an example of another structure of the conventional digital image processing apparatus in which the exclusive processing circuit is added to the digital image processing apparatus of FIG. 1. As shown in the figure, the processing circuit 3e is newly added. The processing circuit 3e has the function of, for example, the two dimensional FIR filter of the kernel size of 3×3 described above. FIG. 14 shows the details of the processing circuit 3e. In the figure, 1 H delay elements 31a and 31b generate delays corresponding to 1 horizontal scanning period (1 H), and they are used to apply adjacent pixel data in the vertical direction to the following circuits. 1 CK delay elements 32a~32f generate delays corresponding to 1 clock (1 CK) for transferring image data, that is, 1 pixel, and they are used to receive the image input data or the output data of two 1 H delay elements 31a and 31b to provide 9 pixels adjacent to each other in the two dimensional region of 3×3 simultaneously. Multiplying circuits 33a~33i are provided in correspondence with the image data of the adjacent 9 pixels obtained in the above described circuit, and each multiplies each of the image data by a coefficient. The coefficient registers 34a~34i are registers for applying the coefficients to the multiplying circuits 33a~33i. The value of the coefficient to realize a desired filtering is previously set by a control circuit such as a host CPU prior to the processing. In the circuit 35 calculating the sum of products, the multiplied outputs from the nine multiplying circuits 33a~33i are summed to obtain a final filter output. By using the processing circuit 3e of FIG. 14, the two dimensional FIR filtering process can be effected on the image data on the image data bus 5a at the same speed as the transfer clock of the image data with the result of the operation outputted to the image data bus 5c. Therefore, the process which required 18 frames in the processing circuits 3a to 3d of FIG. 1 can be completed in 1 frame in the image processing apparatus of FIG. 13 having the processing circuit 3e added thereto.

As described above, in a conventional digital image processing apparatus, at first processing circuits 3a~3d are provided to realize basic arithmetic functions as shown in FIG. 1, and various processes are executed by employing the basic processing circuits. However, a complicated process requires long period of time, and when such processes are frequently employed, it becomes a serious problems. Therefore, a processing circuit 3e exclusively used for the process is added. Namely, the configuration shown in FIG. 1 is developed to that shown in FIG. 13 to improve the speed of processing. However, this structure comprises the following problem.

First, a new processing circuit must be added every time there is a process which should be carried out at high speed. This leads to a problem of costs incidental to the design and manufacture, a problem of the time required for the development, and a problem of increase of size of the apparatus. For example, in FIGS. 13 and 14, the processing circuit 3e is added to realize the two dimensional FIR filter of the kernel size 3×3 to the basic processing circuits 3a~3d. When a coordinate transformation process of color should be carried out at high speed for a color image having three components of R, G and B, the processing circuit 3e cannot be used, even though the coordinate transformation process requires 9 times of multiplication and 9 times of addition as the two dimensional FIR filter of 3×3. And therefore, a new processing circuit must be provided separately. When the processing circuit exclusively used for this purpose is added, 9 multiplying circuits and 9 addition circuits are included in the new processing circuit, so that the scale of the circuit is approximately the same as the processing circuit 3e. However, each of the newly added processing circuits is used only for the intended process and not used for other processes, there will be a new problem, namely, the efficiency in using the whole processing circuit becomes very low. In this example, there are basic processing circuits 3a~3d, a processing circuit 3e for FIR filtering and a processing circuit for coordinate transformation of color. As for the multiplying circuit, there are as many as 19 multiplying circuits. However, the maximum number of the multiplying circuit operating simultaneously is 9. Namely, the maximum efficiency in use is less than 50%. When new processing circuits are added, the efficiency will be further decreased. In addition, since exclusive processing circuits are added, a general purpose circuit cannot be provided, so that it is not suitable for the IC implementation of the processing circuit, which is strongly desired to reduce the size the apparatus. Therefore, an embodiment of a digital image processing apparatus will be described in the following which can carry out various processing functions at high speed without adding exclusive processing circuits each corresponding to separate process function.

Embodiment 3

(a) Structure of Each Hardware (i) Structure of a Basic Processing Circuit

The processing circuit in accordance with the present embodiment comprises a plurality of basic processing circuits. Each of the basic processing circuits has the structure shown in FIG. 15. As shown in the figure, the basic processing circuit 6 comprises a multiplying circuit 61, an ALU 62, a bit shift circuit 63, a LUT 64, selectors 65 and 67, and constant registers 66 and 68. The selector 65 is a Y input selector selecting an image data obtained from an input terminal T0 or a set value of the constant register 66 for Y input to input the same as the data to the Y input of the multiplying circuit 61. The multiplying circuit 61 multiplies the selected output from the Y input selector 65 by the image data (X input in the figure) obtained from an input terminal T1. The selector 67 is a B input selector selecting image data obtained from the input terminal T0 and from an input terminal T3 or a set value of the constant register 68 for the B input, to input the same as data to the B input of the ALU 62. The ALU 62 carries out an operation between the selected output from the B input selector 67 and the output data (A input in the figure) from the multiplying circuit 61. The operation output (F output in the figure) from the ALU 62 is inputted to the bit shift circuit 63 and simultaneously, it is outputted to an output terminal T4. The output of the bit shift circuit 63 is inputted to a LUT input selector 69 and, simultaneously, it is outputted to an output terminal T5. Image data is also inputted to the LUT input selector 69, from an input terminal T6, and either the image data or the above mentioned output data from the bit shift circuit 63 is selected to be inputted to the LUT 64. The conversion output from the LUT 64 is outputted to an output terminal T2. Various control operations such as initial setting and the change of setting of the two constant registers 66 and 68, designation of output data of two selectors 65 and 67, designation of a function of the ALU 62, designation of the shift direction and of the nun%her of stages to be shifted in the bit shift circuit 63, designation of an output data from the LUT input selector 69, and setting of a conversion table in the LUT64 are carried out by the control circuit such as a host CPU, not shown.

As described above, the basic processing circuit 6 included in the processing circuit in this embodiment comprises four basic arithmetic operation circuits, namely, a multiplying circuit 61, an ALU 62, a bit sift circuit 63 and a LUT 64, arranged in series. Since each of the basic arithmetic operation circuits can be set such that there is no change between the input and output data in each of the circuit, one operation circuit can function by itself, and a plurality of operation circuits can be simultaneously operated to realize composite functions at high speed.

(ii) Structure of the Processing Circuit

Figure 16:
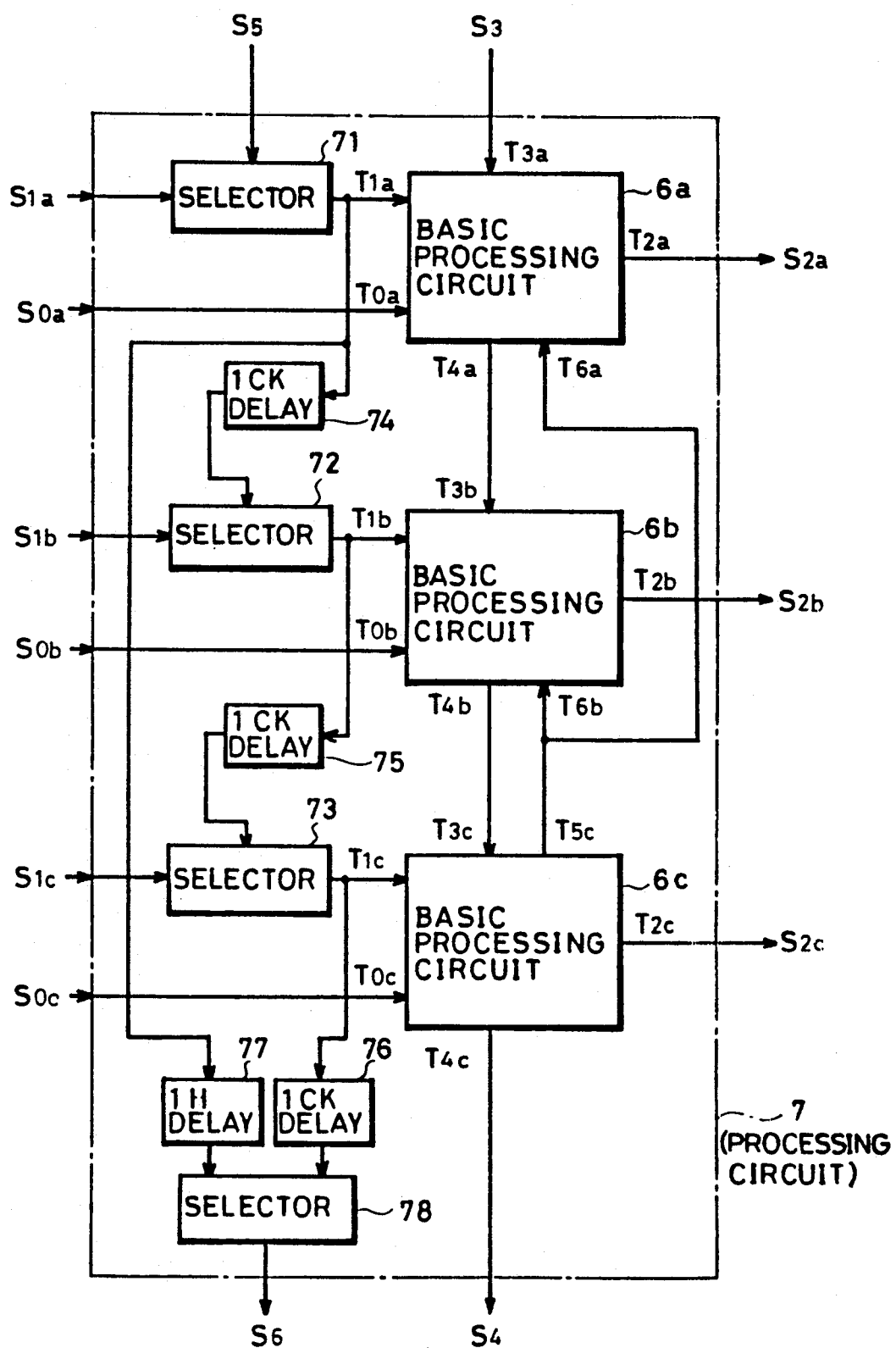
FIG. 16 is a block diagram showing a processing circuit in accordance with a further embodiment of the present invention structured utilizing the basic processing circuit of FIG. 15.

FIG. 16 is a block diagram showing a structure of a processing circuit 7 in accordance with this embodiment. Referring to the figure, the above described basic operation circuits 6a~6c are arranged cascade connected with each other. Selectors 71~73 are provided in correspondence with these basic processing circuits 6a~6c. The selector 71 is a a-channel input selector for selecting one of either the image data provided from input terminals S1a or that from S5 to apply the same to an input terminal T1a of the basic processing circuit 6a. The output data from the a-channel input selector 71 is also inputted to a 1 CK delay element 74 generating a delay corresponding to 1 clock (1 CK) of the data transfer clock and to a 1 H delay element generating a delay corresponding to a horizontal scanning period (1 H) of the image data. The selector 72 is a b-channel input selector which selects the output data from the above mentioned 1 CK delay element 74 or the image data obtained from an input terminal S1b to input the same to an input terminal T1b of the basic processing circuit 6b. The output data from the b channel input selector 72 is also inputted to a 1 CK delay element 75. The selector 73 is a c-channel input selector which selects the output data from the above mentioned 1 CK delay element 75 or the image data obtained from an input terminal S1c to input the same to an input terminal T1c of the basic processing circuit 6c. The output data from the c channel input selector 73 is also inputted to a 1 CK delay element 76. Either the output data from the delay element 76 or 72 is selected by delay output selector 78 to be outputted from the output terminal S6. Input terminals S0a, S0b and S0c are input terminals to the processing circuit 7 and they correspond to the input terminals T0a, T0b and T0c of the basic processing circuits 6a, 6b and 6c. Output terminals S2a, S2b and S2c are output terminals of the processing circuit 7 corresponding to the output terminals T2a, T2b and T2c of the basic processing circuit 6a, 6b and 6c, respectively.

The three basic processing circuits 6a, 6b and 6c are coupled to each other wherein the output terminal T4a to which the ALU output data from the basic processing circuit 6a are outputted is connected to the input terminal T3b inputted to the B input selector 67b of the ALU of the basic processing circuit 6b, the output terminal T4b of the basic processing circuit 6b is connected to the input terminal T3c of the basic processing circuit 6c, and the output terminal T5c to which the output data of the bit shift circuit 63c of the basic processing circuit 6c are outputted is connected to the input terminals T6a and T6b inputted to the LUT input selectors 69a and 69b of the basic processing circuits 6a and 6b.

(iii) Structure of the Whole Apparatus

Figure 17:
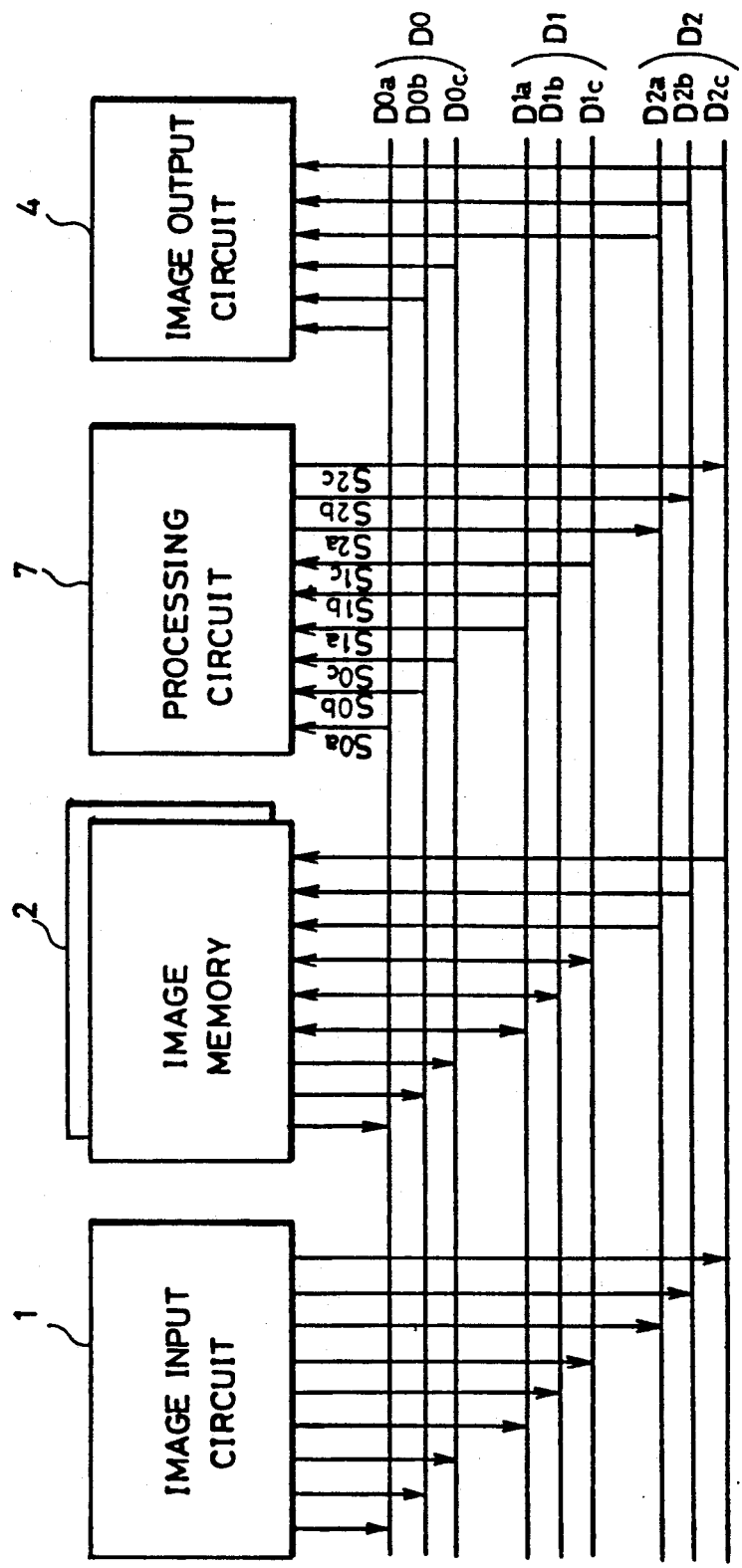
FIG. 17 is a block diagram showing an example of a structure of a digital image processing apparatus including the processing circuit of FIG. 16.

FIG. 17 shows an example of the structure in which the processing circuit 7 in accordance with the present embodiment is used together with other circuits in a digital processing apparatus. As in the prior art of FIG. 1, it comprises an image input circuit 1, an image memory 2 and an image output circuit 4. Compared with the processing circuit 3 of the prior art, the numbers of the input terminals and output terminals for the image data are increased in the processing circuit 7 of the present embodiment, and therefore, the structure of the image data bus is changed in FIG. 17. Referring to the figure, the image data buses D0, D1 and D2 respectively correspond to image data buses 5a, 5b and 5c in FIG. 1 in the functional point of view. However, in FIG. 17, the image data buses D0, D1 and D2 are respectively formed with 3 channels, so that image data buses having 9 channels in total are provided. Therefore, the image data having multiple components such as color images and image data of double precision are easily treated. In accordance with the increase of the number of image data buses, the number of input terminals and output terminals of the image input circuit 1, the image memory 2 and of the image output circuit 4 are also increased.

(iv) Structure of the Image Memory

Figure 18:
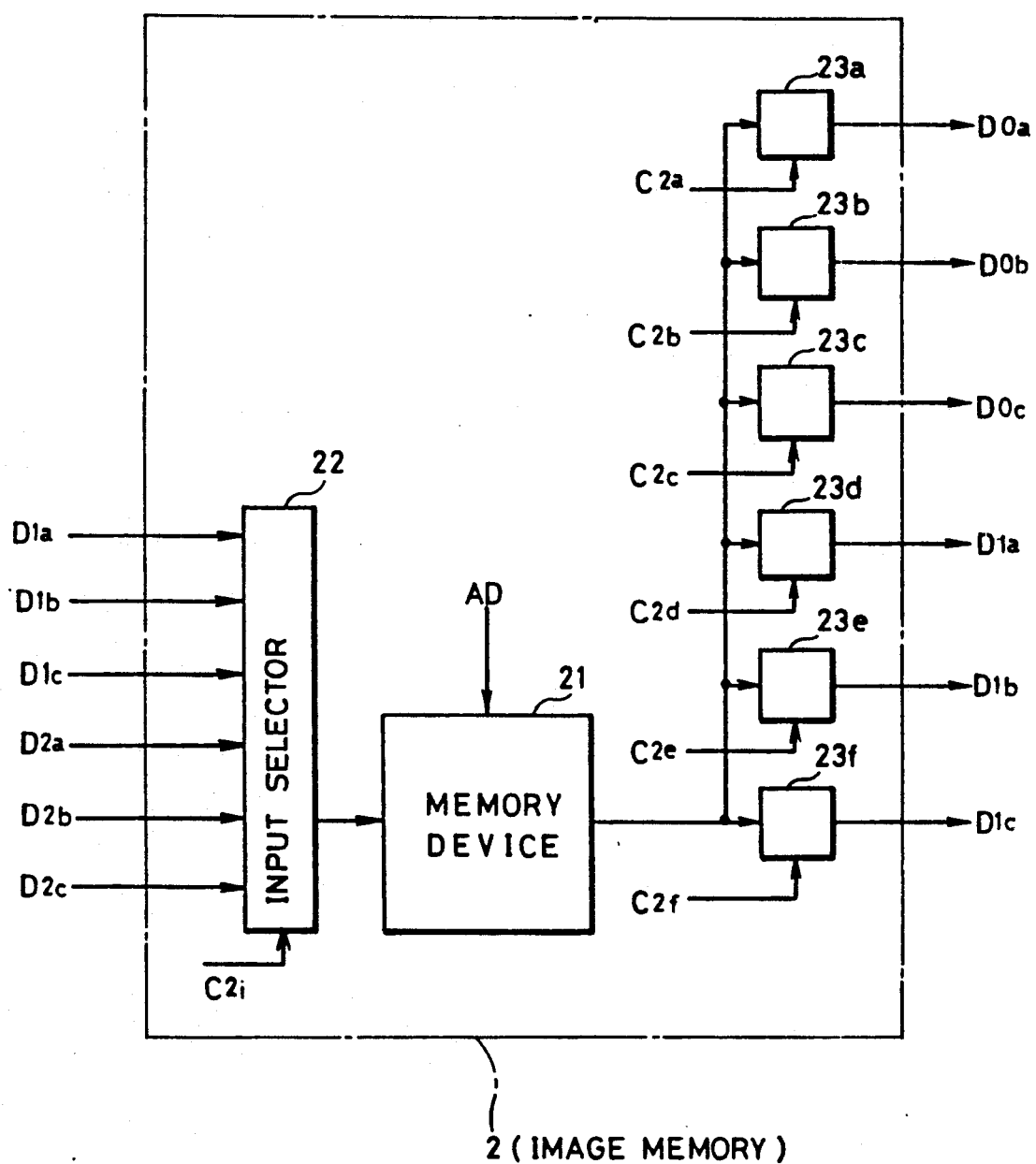
FIG. 18 is a block diagram showing an example of a structure of an image memory included in the digital image processing apparatus of FIG. 17.

FIG. 18 is a block diagram showing an example of a structure of the image memory 2. As shown in the figure, the image memory 2 comprises a memory device 21, an input selector 22 and output buffers 23a~23f. The input selector 22 selects one of the image data obtained from the image data buses D1a, D1b, D1c, D2a, D2b and D2c in accordance with a selection control signal C21 to employ the same as a write data to the memory device 21. The write data from the memory device 21 are commonly inputted to the output buffers 23a~23f and the output/non-output is controlled by the output control signals C2a~C2f corresponding to the output buffers 23a~23f, respectively. The same data may be outputted to a plurality of image data bus from one image memory 2. However, the image data cannot be outputted on the same image data bus from two or more image memories. In order to prevent the contention of the image data, the control circuit such as a host CPU must be in charge of each image memory 2 so that the output control signals C2a~C2f are correctly generated. The input terminal AD is an address input terminal to the memory device 21. An address generating mechanism may be provided in or out of each image memory 2. It is not an important problem in the description of the present embodiment.

(v) Structure of the Image Input Circuit

Figure 19:
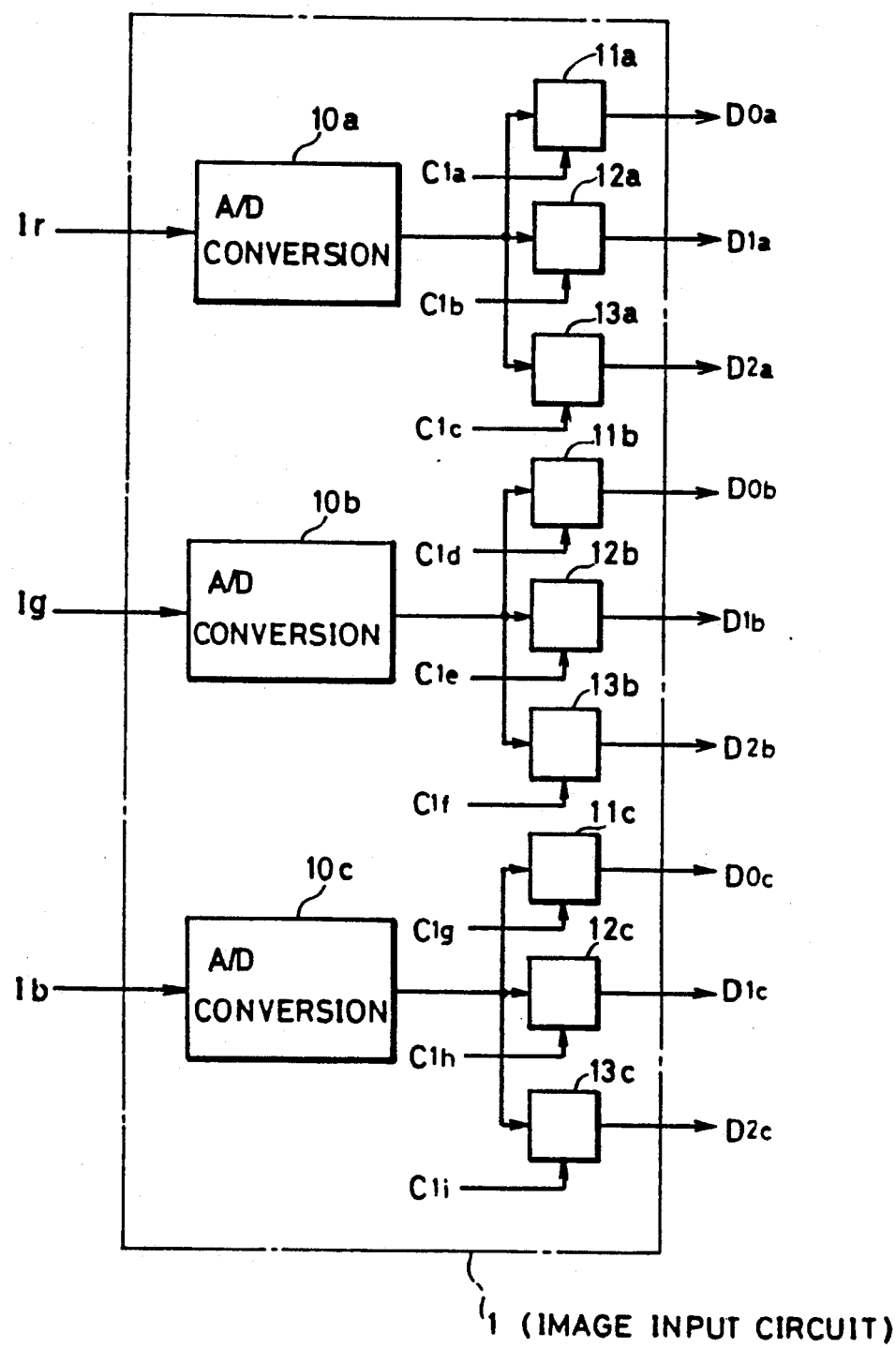
FIGS. 19 and 20 are block diagrams showing examples of structures an image input circuit included in the digital image processing apparatus of FIG. 17.
Figure 20:
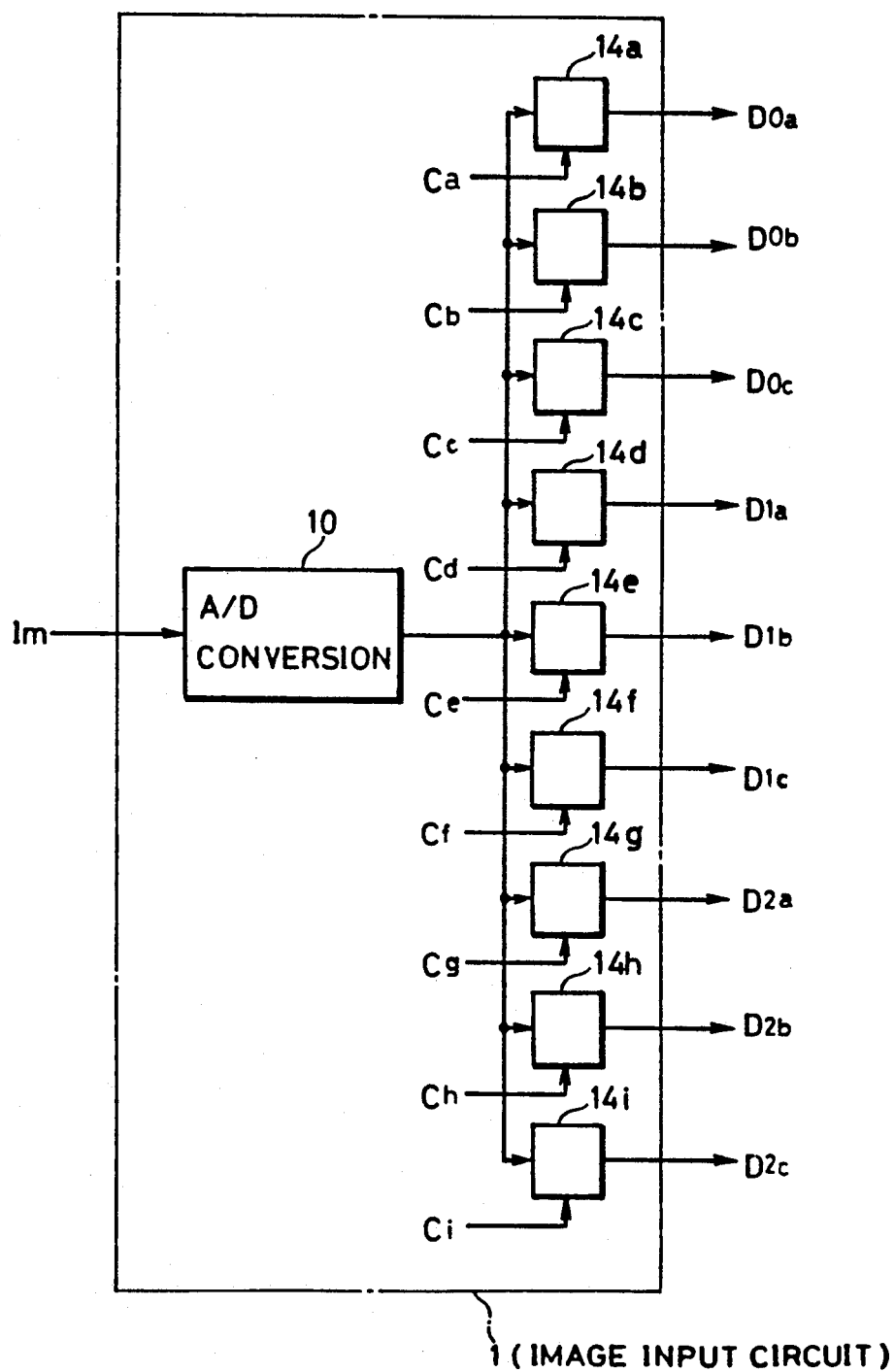

FIGS. 19 and 20 are block diagrams showing examples of the structure of the image input circuit 1. Referring to FIG. 19, A/D converting circuits 10a, 10b, 10c respectively sample analog video signals obtained from input terminals Ir, Ig, Ib in accordance with transfer clocks to convert them to digital image data. The digital image data outputted from the A/D converting circuit 10a, 10b and 10c are respectively applied to output buffers 11a, 12a, 13a, 11b, 12b, 13b, 11c, 12c and 13c, respectively. Respective output buffers have their output/non-output controlled by corresponding output control signals C1a~C1i. The conversion output from the A/D converting circuit 10a can be outputted to respective a-channels of three sets of image data buses D0-D2 through output buffers 11a, 12a and 13a. Similarly, the conversion output from the A/D converting circuits 10b and 10c are outputted to b-channels and c-channels of the image data buses D0-D2. When the input terminal Ir is adapted to correspond to the R component of an image data, the input terminal Ig is adapted to correspond to the G component of the same image data and the input terminal Ib is adapted to correspond to the B component of the same image data, a color image constituted by three components can be inputted by using the a, b and c channels of the image data bus.

Figure 30:
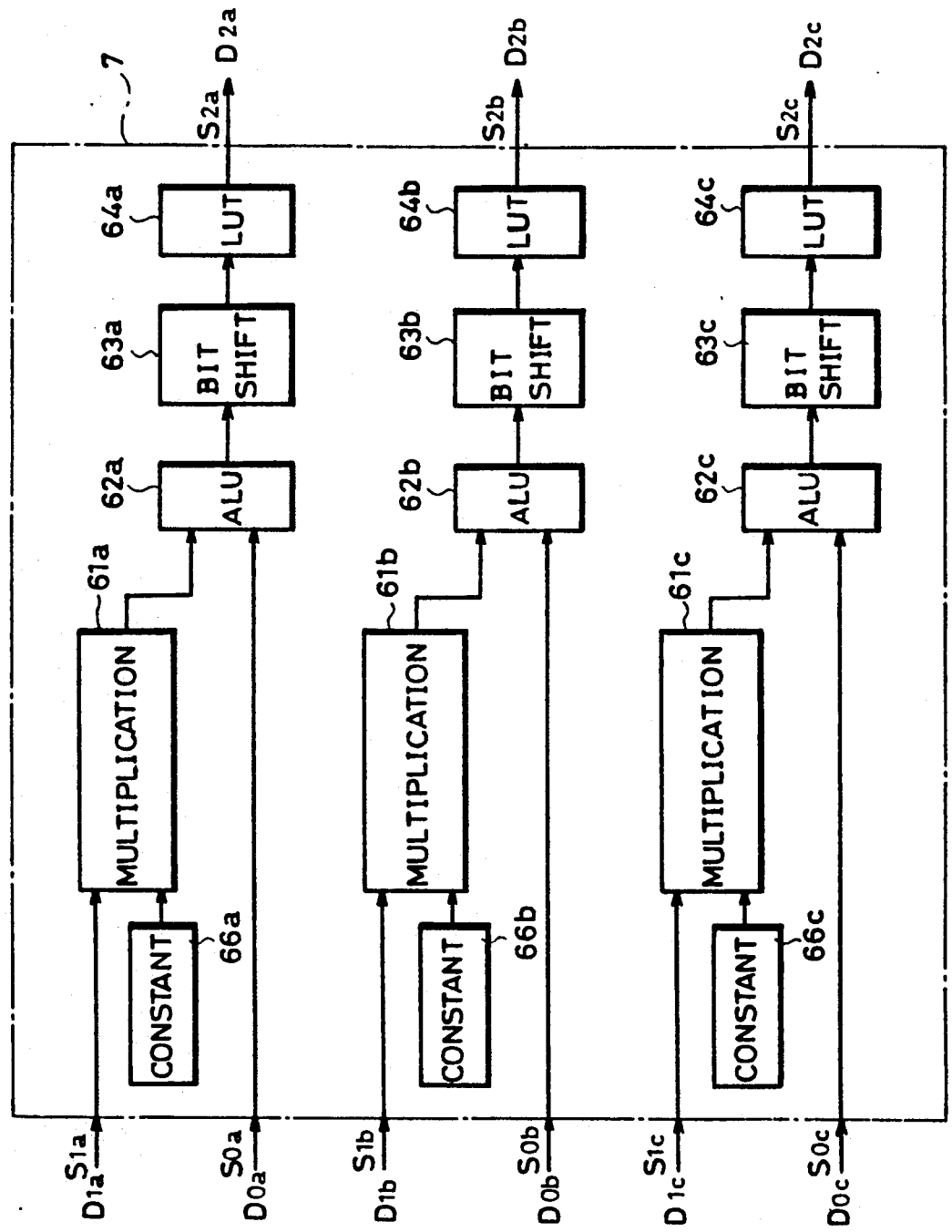

In the structure of FIG. 19, one A/D converting circuit correspond to a specified channel of the image data bus. Meanwhile, in the structure of FIG. 20, one A/D converting circuit corresponds to all image data buses. As shown in the figure, output buffers 14a-14i are provided in parallel in association with one A/D converting circuit 10. Analogue video signals are inputted to the A/D converting circuit 10 through an input terminal Im. Respective output buffers 14a-14i have their output/non-output controlled by the output control signals Ca~Ci, respectively. The functions of the A/D converting circuit, output buffers 14a-14i and of the output control signals Ca~Ci are the same as those of FIG. 19. Compared with the example of FIG. 19, the example shown in FIG. 20 is advantageous when a black-and-white image data are inputted. When three image input circuits 1 shown in FIG. 30 are provided in parallel, a color image input circuit having the flexibility higher than the image input circuit of FIG. 19 can be provided.

(vi) Structure of the Image Output Circuit

Figure 21:
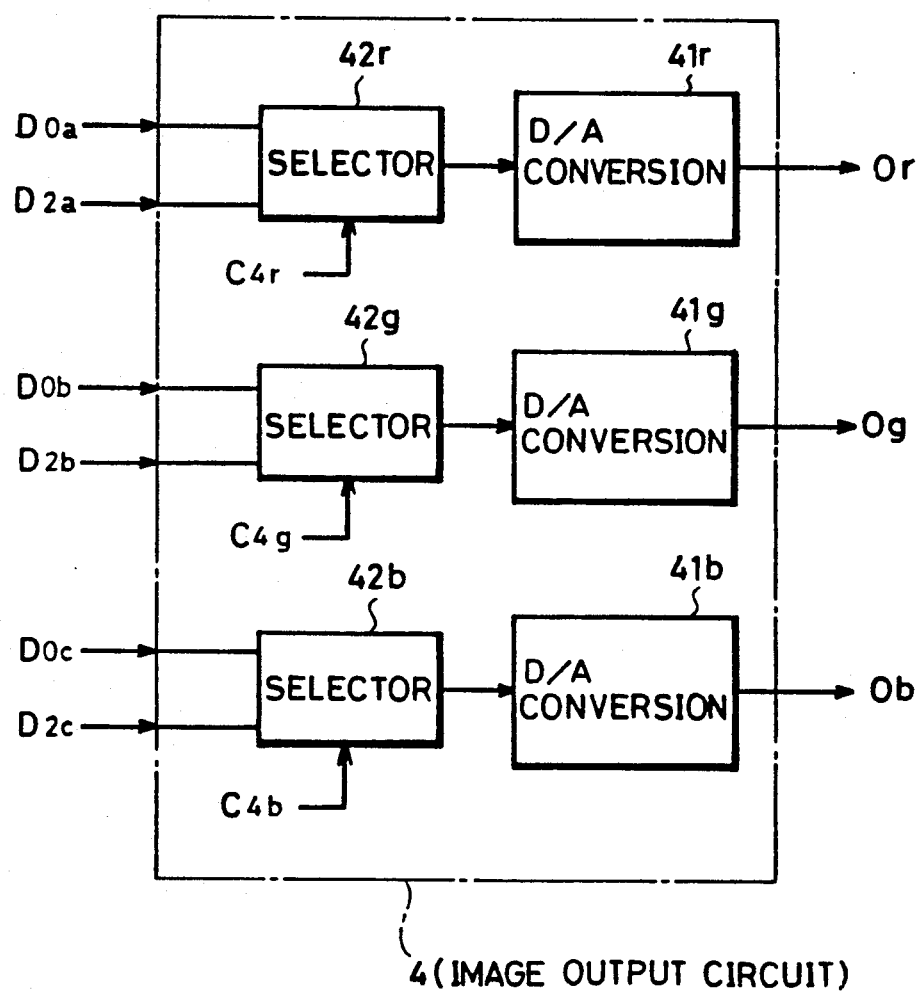
FIG. 21 is a block diagram showing an example of a structure of an image output circuit included in the digital image processing apparatus of FIG. 17.

FIG. 21 is a block diagram showing an example of the structure of the image output circuit 4. Referring to the figure, input selectors 42r, 42g and 42b select image data obtained from one of the image data buses D0a and D2a, D0b and D2b, and D0c and D0c. D/A converting circuits 41r, 41g and 41b convert output data from the input selectors 42r, 42g and 42b to analog video signals, respectively. Signals Or, Og, Ob are analogue video signals outputted from the respective D/A converting circuits 41r, 41g and 41b. When the RGB components of the color image data are in correspondence with the channels a, b and c of the image data bus, these analogue video signals constitute the RGB components of color video signals. The reference characters C4r, C4g and C4b represent selection control signals for designating the data to be selected in the input selectors 42r, 42g and 42b.

In the foregoing, internal structures of the processing circuit 7 and other circuits 1, 2 and 4 constituting the image processing apparatus together with the processing circuit 7 of the present invention have been described.

(b) Schematic Function of the Embodiment 3

Prior to the detailed description of the operation of this embodiment, the schematic function thereof will be described in the following.

First, the function when each of the basic processing circuits 6a, 6b and 6c operates independently will be described with reference to FIG. 15. When the Y input selector 65 selects the output data from the first constant register 66, the multiplying circuit 61 outputs a result of multiplication between the first image data (X input in the figure) and the output data (Y input in the figure) from the first constant register 66. When the Y input selector selects the second image data, the multiplying circuit 61 outputs a result of multiplication between the first and second image data. Each of the results of the multiplication is used as the first input to be processed (A input in the figure) in the ALU.

When the ALU input selector 67 selects the output data from the second constant register 68, the ALU 62 outputs a result of operation between the output data (A input in the figure) from the multiplying circuit 62 and the output data (B input in the figure) of the second constant register 68. When the ALU input selector 67 selects the second image data, the ALU 62 output a result of operation between the output data from the multiplying circuit 61 and the second image data. Therefore, when the basic processing circuit 6 operates by itself, multiplication, addition or subtraction can be carried out between image data and between image data and constants. The result of operation becomes the output of the basic processing circuit 6 as well as the input of the ALU input selector 67 of the basic processing circuit 6 in the succeeding stage.

Next, the function when multistages of basic processing circuits 6a, 6b and 6c are cascade connected will be described with reference to FIG. 16. When the ALU input selectors 67b and 67c of the basic processing circuits 6b and 6c in the succeeding stages select the output data from the ALU 62a and 62b of the preceding stages, the output data from the multiplying circuits 61a, 61b and 61c in respective basic processing circuits 6a, 6b and 6c can be added in the ALUs 62a, 62b and 62c. Therefore, when the respective multiplying circuit 61a, 61b and 61c function as coefficient multipliers, the linear coupling process which are frequently used in image processing can be easily carried out.

Therefore, according to this embodiment, when each of the basic processing circuits 6a, 6b and 6c is operated by itself, the image data having multiple components such as a color image can be processed in parallel; when the inputs and outputs of the ALUs 62a, 62b and 62c of the respective basic processing circuits 6a, 6b and 6c are coupled with each other, the coordinate transformation process of color for the color image and the linear coupling process for the black-and-white image data can be carried out by the same processing circuit 7, whereby improving the efficiency in using the processing circuit 7.

When components of pixels adjacent to each other in the horizontal direction of the same image are inputted to the multistages of basic processing circuits 6a, 6b and 6c cascade connected with each other, one dimensional FIR filtering can be effected by using the same processing circuit 7. When multistages of the processing circuits 7 are cascade connected, the one dimensional FIR filtering with larger number of taps can be carried out. In both cases, by connecting a delay element generating a delay corresponding to 1 horizontal scanning period between the output of the ALU in the last stage and the input of the first ALU, the one dimensional FIR filter can be extended to a two dimensional FIR filter by using the same processing circuits 7.

Figure 38:
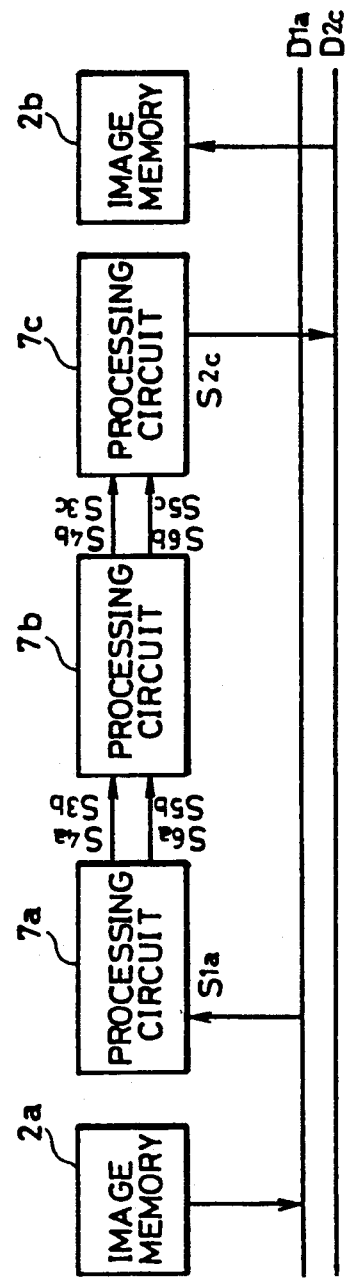
Figure 39:
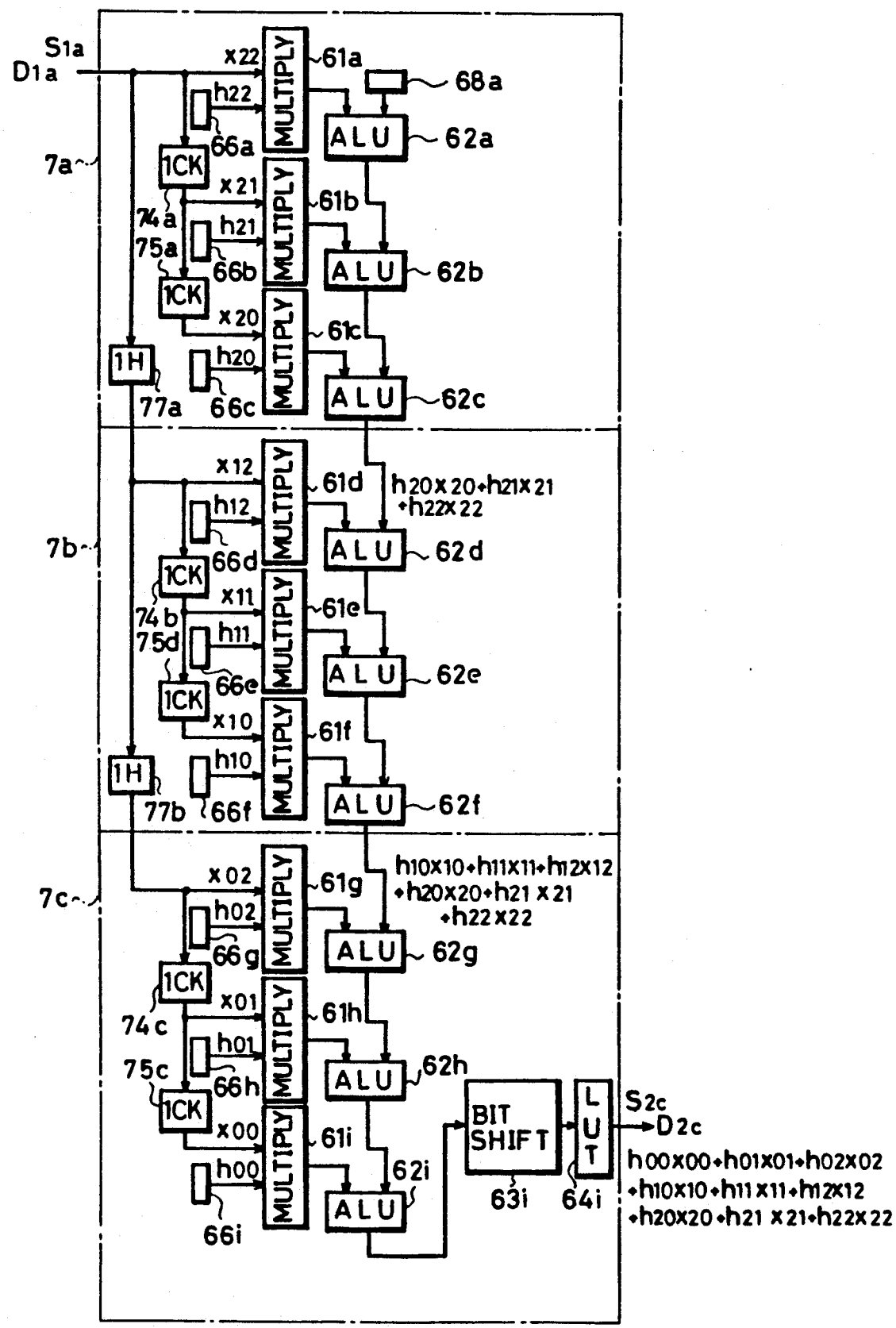

When multistages of the processing circuits 7 are cascade connected, line components adjacent to each other in the vertical direction of the same image are inputted to the respective processing circuits 7, the one dimensional FIR filtering processes for the image data of respective lines are simultaneously carried out by respective processing circuits 7 with the result added in the ALU, then two dimensional FIR filtering can be carried out on real time. For example, the two dimensional FIR filtering process with the kernel size of $3 \times 3$ can be realized by coupling three processing circuits 7 of FIG. 16 as shown in FIGS. 38 and 39 which will be described later.

Figure 36:
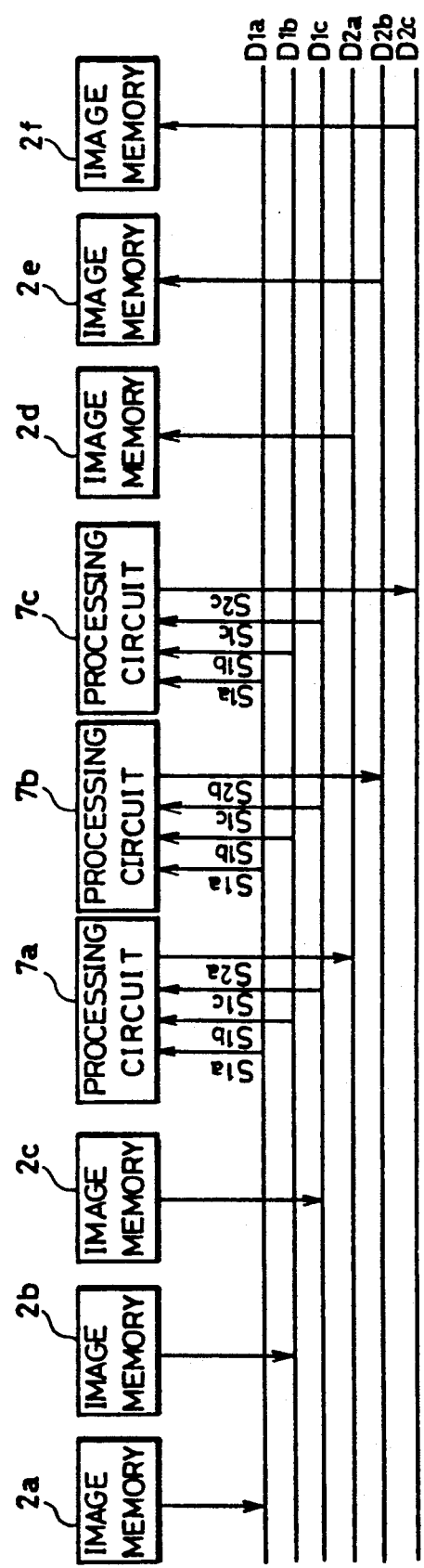
FIGS. 36–40 illustrate operations of the three processing circuits of FIG. 16 utilized in various processes.
Figure 37:
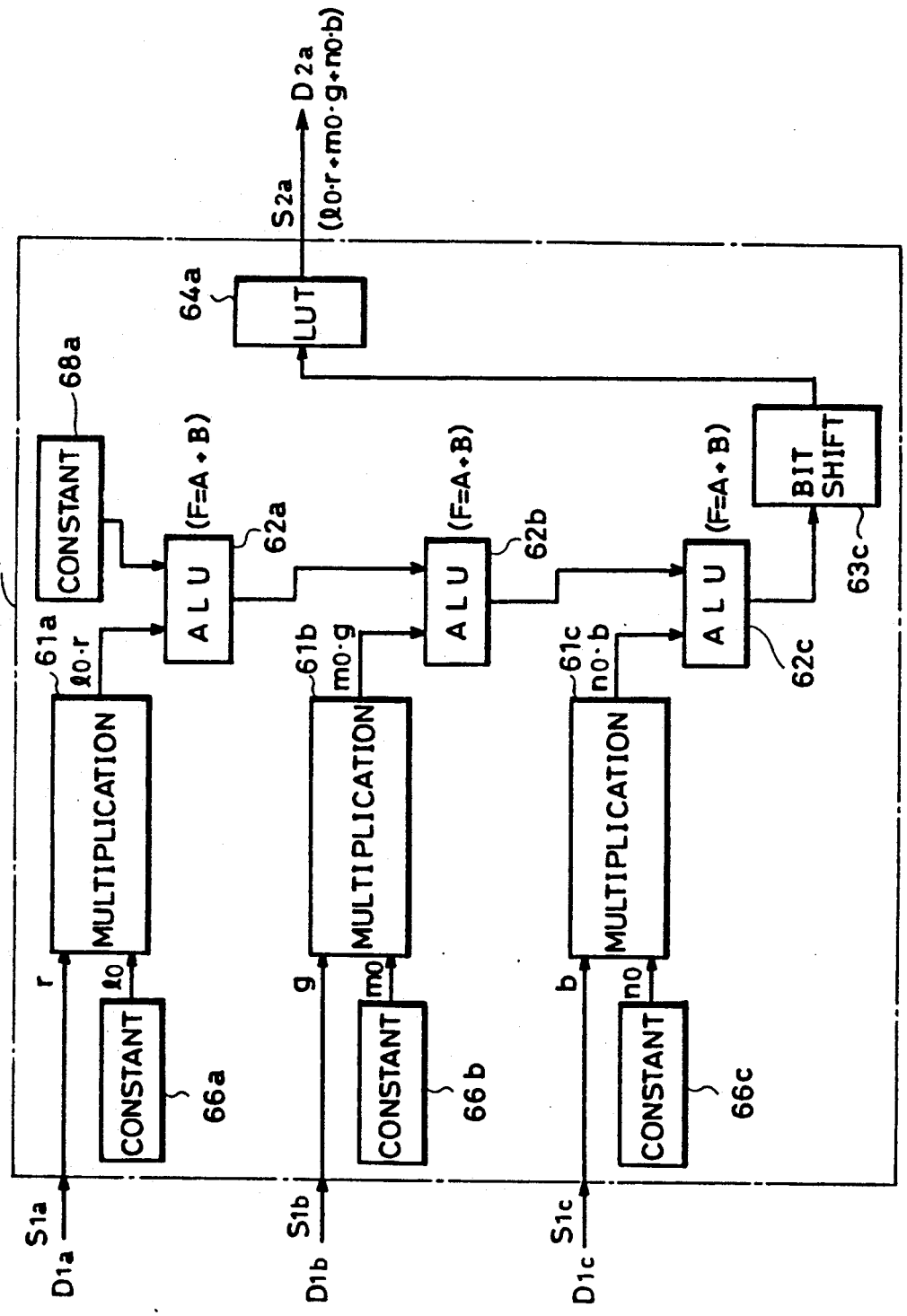
Figure 37:
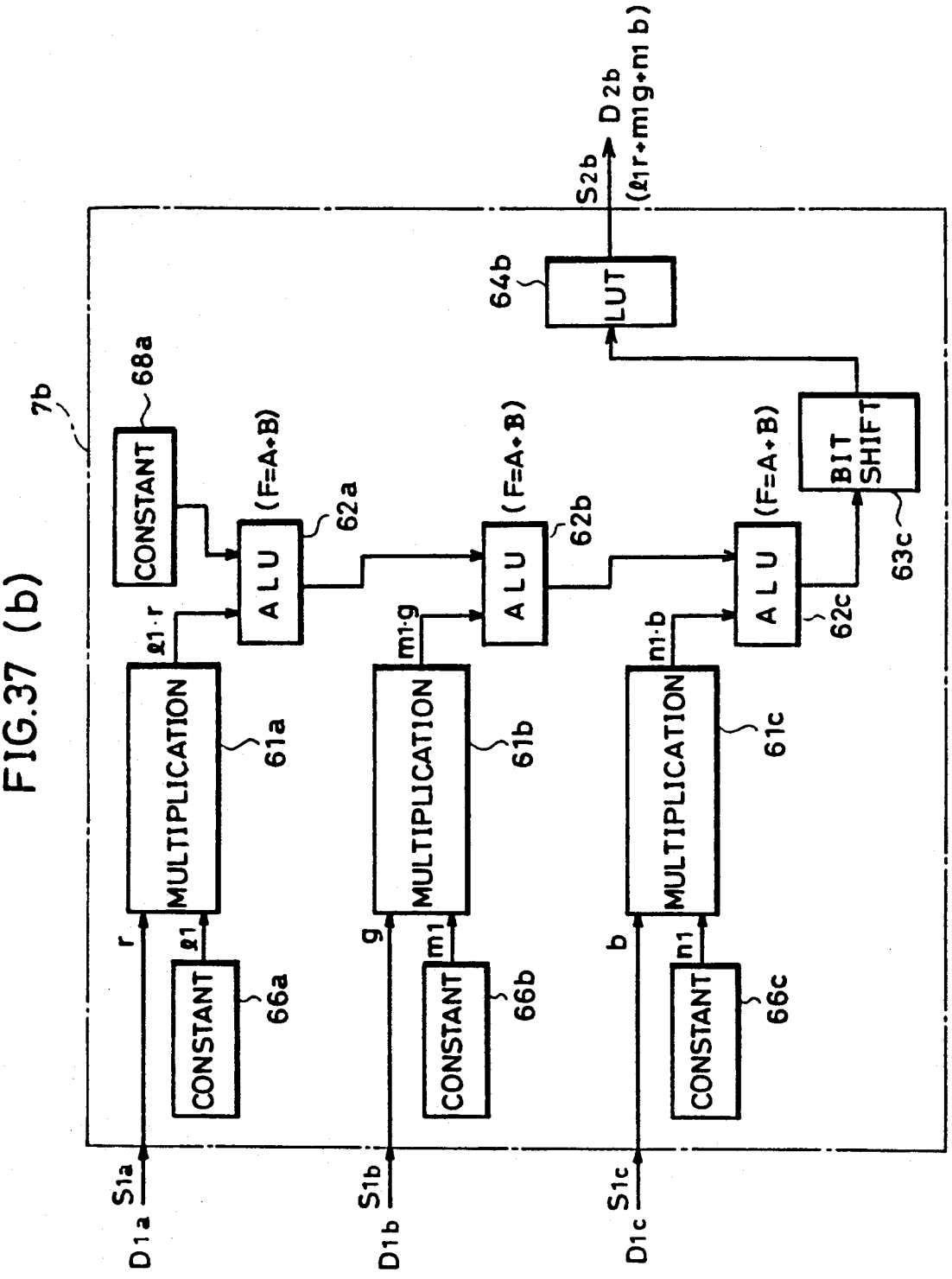
Figure 37:
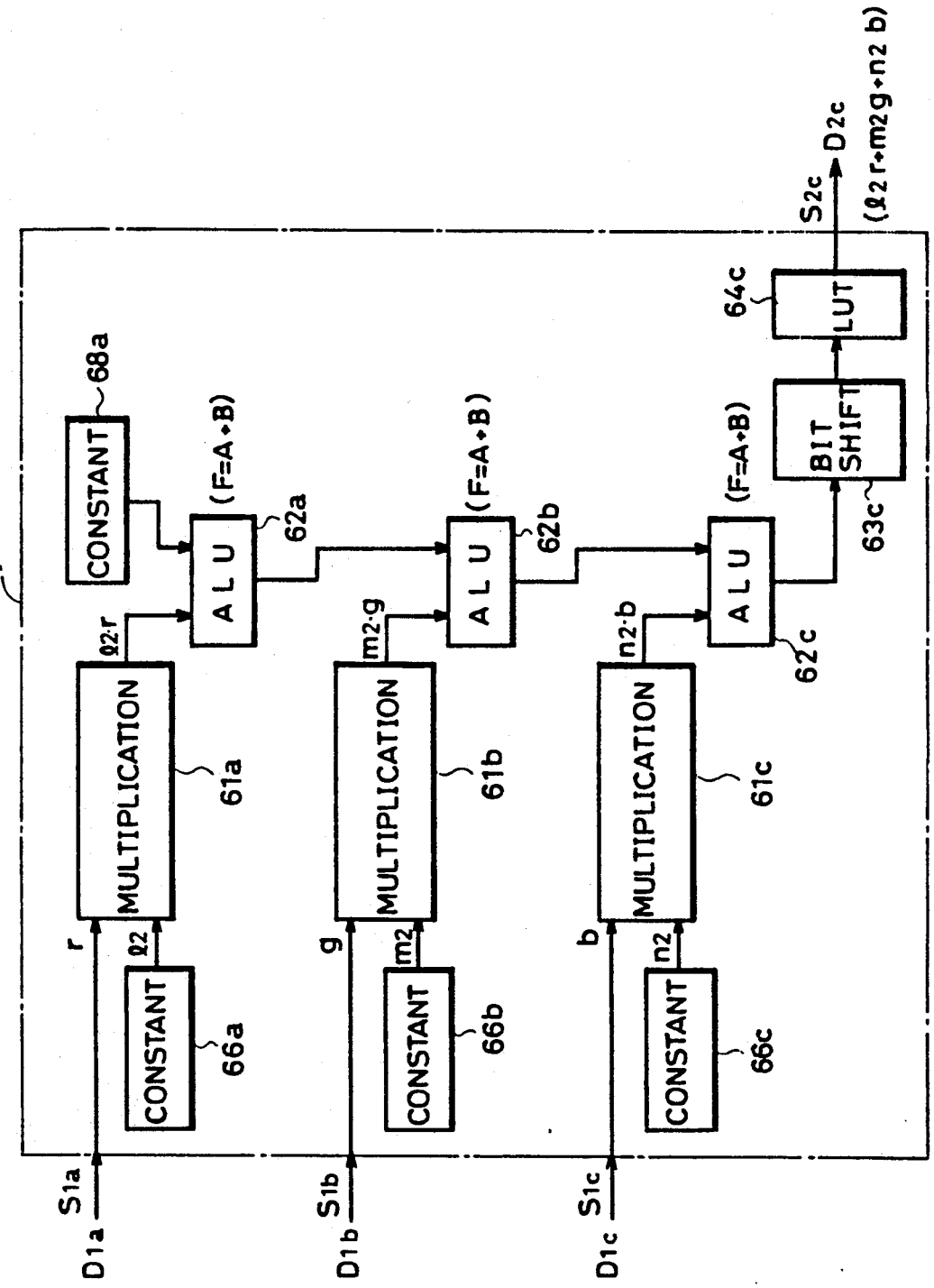

When three of the same processing circuit 7 are coupled as shown in FIGS. 36 and 37, which will be described later, arithmetic operations utilizing conversion vector of each row of the color coordinate transformation matrix can be simultaneously carried out on each of the components of the color image. Namely, in this embodiment, the two dimensional FIR filtering of the kernel size of $3 \times 3$ and the color coordinate transformation processing for the color image can be carried out by the same processing circuit, whereby there is no need to separately provide exclusive processing circuits as in the prior art.

More specific operations of this embodiment will be more apparent from the following description.

(c) Examples of Various Processes

In the following, description will be given of specific operations of the processing circuit 7 applied to various processes.

(I) Example of a Process Effected by 1 Processing Circuit

Description will be given of a case in which one processing circuit 7 operates by itself, referring to the processing of black-and-white images and the processing of color images.

A) Processing of Black-and-White Images

(i) Basic Example

Figure 22:
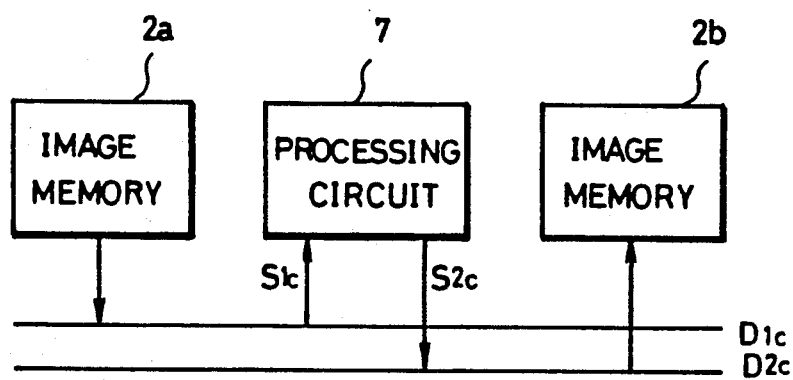
FIGS. 22~27 illustrates operations of the one processing circuit of FIG. 16 utilized for various processes on the black-and-white image data.

FIG. 22 shows a most basic processing state. An image to be processed is stored in the image memory 2a. The result of processing is written in the image memory 2b. The image data bus D1c is used to input image data to the processing circuit 7, while the image data bus D2c is used to apply the result of processing to the image memory 2b. Only the basic processing circuit 6c is used out of the three basic processing circuits 6a–6c of the processing circuit 7. An image to be processed is inputted from the image data bus D1c through an input terminal S1c to an input terminal T1c of the basic processing circuit 6c. In the basic processing circuit 6c, a multiplication between the input data and a constant value may be carried out in the multiplying circuit 61c, addition/subtraction or a logic operation such as OR operation or AND operation between the input data and a constant value may be carried out in the ALU 62c, the input data may be shifted in the bit shift circuit 63c, or a non-linear conversion may be effected on the input data in the LUT 64c. Since four basic operation circuits 61c, 62c, 63c and 64c are arranged in series in the basic processing circuit 6c as shown in FIG. 15, the above described processes may be separately carried out or they may be carried out simultaneously in a composite manner. The arithmetically operated output data is outputted from the output terminal T2c of the basic processing circuit 6c to the image data bus D2c through the output terminal S2c of the processing circuit 7.

(ii) Processing of Black-and-White Images

Figure 23:
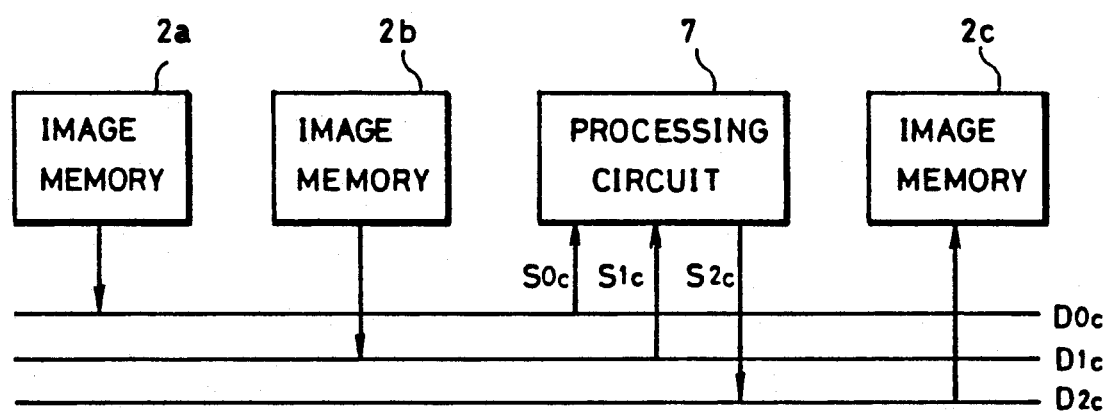

In the above example, the image to be processed is only the data read from one image memory 2a. Meanwhile, FIG. 23 shows a processing state in which the images to be processed are the data read from two image memories 2a and 2b. The result of the process is written in the image memory 2c. The read data from the image memories 2a and 2b are inputted to the input terminals S0c and S1c of the processing circuit 7 through image data buses D0c and D1c. As in the above example, only the basic processing circuit 6c is used out of three basic processing circuit 3a–3c. The images to be processed obtained from the input terminals S0c and S1c are applied to input terminals T0c and T1c of the basic processing circuit 6c. The two input data may be multiplied with each other in the multiplying circuit 61c, they may be subjected to addition/subtraction or a logic operation in the ALU 62c, they may De shifted by the bit shift circuit 63c in association with the output of the multiplication and the output from the ALU, or they may be linearly converted in the LUT 64c, in the basic processing circuit 6c. The arithmetic operation output data is outputted from the output terminal S2c the processing circuit 7 to the image data bus D2c through the output terminal T2c of the basic processing circuit 6c.

(iii) Process for Applying Pseudocolor to Black-and-White Images

Figure 24:
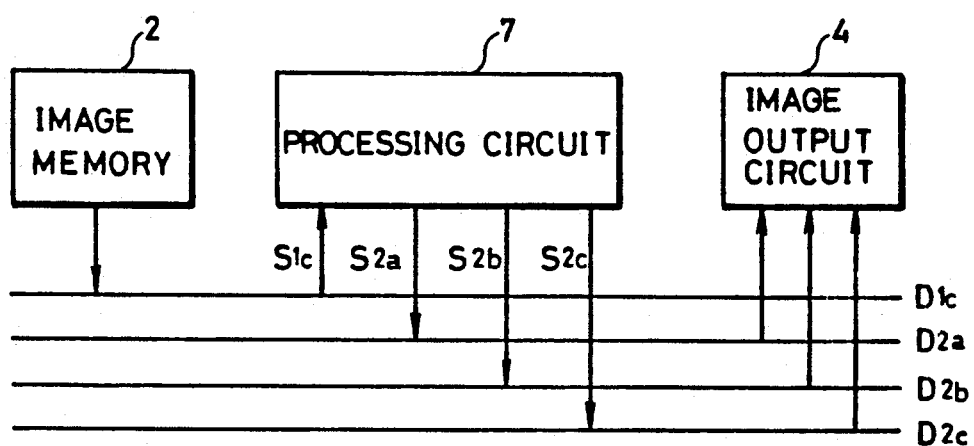
Figure 25:
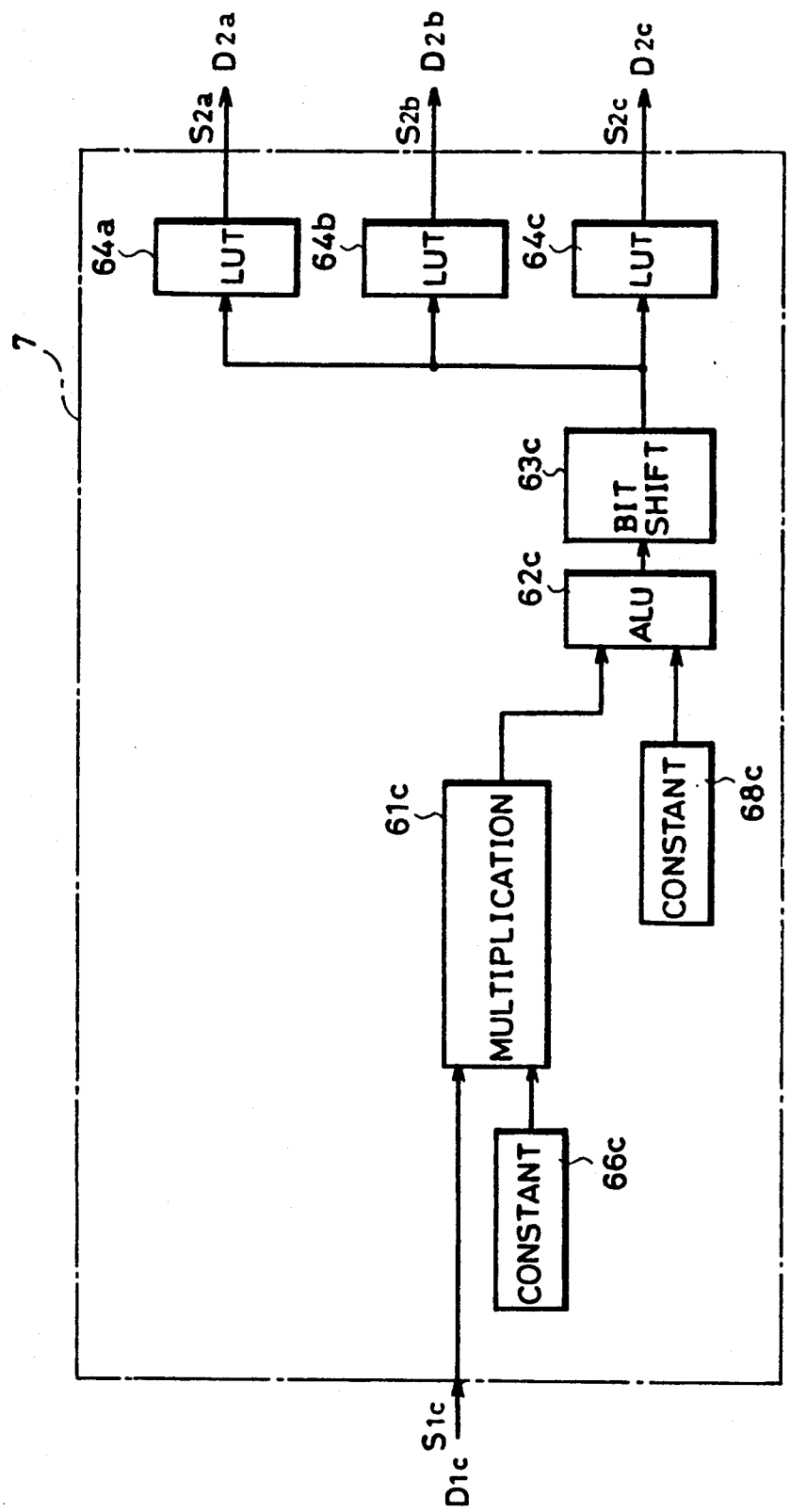

In the above described two examples, only one three basic processing circuits 6a, 6b and 6c is used by itself. In the next example shown in FIGS. 24 and 25, the three basic processing circuits 6a, 6b and 6c are used coupled with each other. In the example of FIG. 24, an image to be processed is stored in the image memory 2, and the data read therefrom is inputted to an input terminal S1c of the processing circuit 7 through the image data bus D1c. The image data inputted to the processing circuit 7 is processed therein to be converted to image data having three components to be outputted from the output terminals S2a, S2b and S2c. The output data from the processing circuit 7 are inputted to the image output circuit 4 through image data buses D2a, D2b and D2c, and they are outputted to the outside of the apparatus as color video signals having three components. The specific flow of the image data in the processing circuit 7 is shown in FIG. 25. Selectors of respective portions which are not related to the image data and the circuits which are not used are omitted in the figure for the purpose of simplicity. As is shown in figure, the image data inputted from the image data bus D1c are arithmetically operated in the multiplying circuit 61c, the ALU 62c and the bit shift circuit 63c of the processing circuit 6c, and thereafter, the output data are commonly inputted to the LUTs 64a, 64b and 64c of respective basic processing circuits. Such coupling between the three basic processing circuit 6a, 6b and 6c can be realized by the LUT input selectors 69a, 69b and 69c arranged directly before the LUTs 64a, 64b and 64c, respectively and by the provision of the output terminal T5 and the input terminal T6. When the same conversion table is set in each of the LUTs 64a, 64b and 64c, the image data to be outputted to the image data buses D2a, D2b and D2c will be the same, and, as a result, the color video signals externally outputted will be black-and-white images. Meanwhile, if different conversion tables are set in three LUTs, the output data from respective channels will be different from each other, so that the input data which were originally black-and-white image data are outputted as color images.

(iv) One Dimensional FIR Filter

Figure 26:
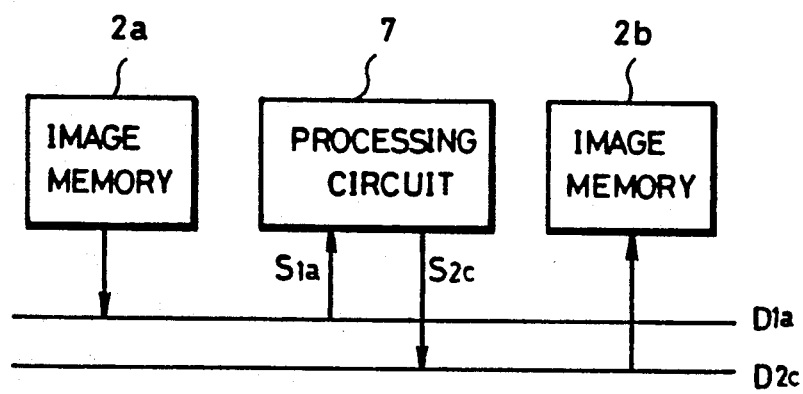
Figure 27:
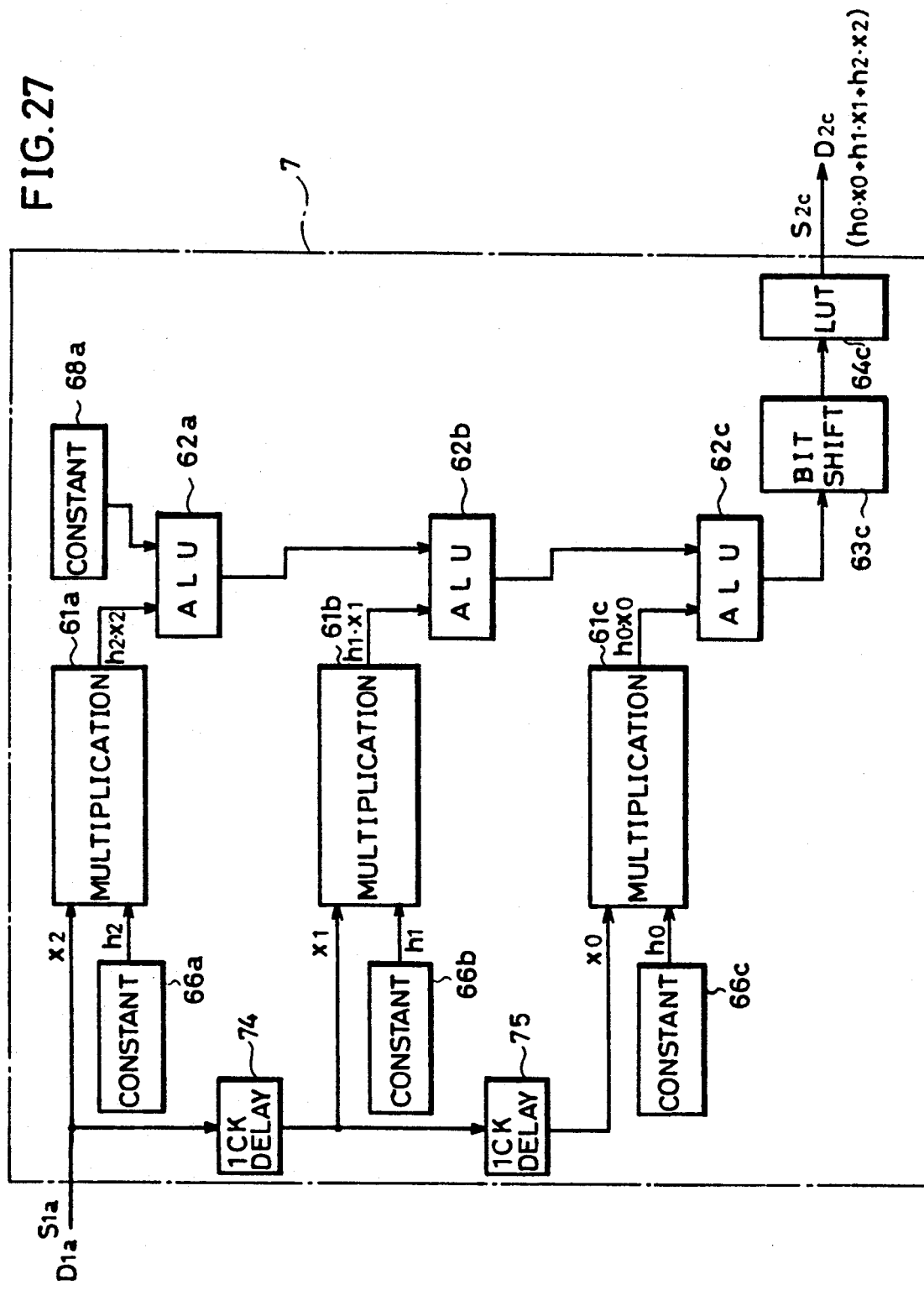

Another example of a process in which three basic processing circuits 6a, 6b and 6c are used coupled with each other is shown in FIGS. 26 and 27. In this example, one dimensional FIR filter of three taps is realized on black-and-white image data. In the example shown in FIG. 26, an image to be processed is stored in the image memory 2a and the data read therefrom is inputted to the input terminal S1a of the processing circuit 7 through the image data bus D1a. The data is subjected to the one dimensional FIR filtering process of three taps in the processing circuit 7 to be outputted form the output terminal S2c. The output data from the processing circuit 7 is written in the image memory 2b through the image data bus D2c.

The specific flow of the image data in the processing circuit 7 is shown in FIG. 27. As in the case of FIG. 26, circuits unnecessary for the description are omitted for the purpose of the simplicity. As is shown in the figure, the input data inputted from the image data bus D1a is inputted to the multiplying circuit 61a of the basic processing circuit 6a and, simultaneously, it is delayed by 1 pixel and by 2 pixels respectively in the 1 CK delay elements 74 and 75 to be inputted to the multiplying circuits 61b an 61c of the basic processing circuits 6b and 6c, respectively. Namely, the image data of adjacent three pixels are inputted in parallel to the three multiplying circuits 61a, 61b and 61c. Assuming that image data $x_0$, $x_1$ and $x_2$ are successively inputted from the image data bus D1a, coefficients $h_2$, $h_1$ and $h_0$ of the filter are respectively set in the three Y input constant registers 66a, 66b and 66c, and the function (F=A+B) is designated for the three ALUs 62a, 62b and 62c, the output from the ALU 62c of the basic processing circuit 6c will be the total sum of respective multiplying outputs $h_2 \cdot x_2$, $h_1 \cdot x_1$ and $h_0 \cdot x_0$ of three multiplying circuits 61a, 61b and 61c, since the three ALUs 62a, 62b and 62c are coupled as shown in the figure, and as a result, an image data $(h_0 \cdot x_0 + h_1 \cdot x_1 + h_2 \cdot x_2)$ is obtained. This is nothing but a filtering output obtained from the FIR filtering process of 3 taps of the input image data. The filtering output may be further processed by the bit shift circuit 63c or by the LUT 64c of the basic processing circuit 6c.

In the foregoing, four examples of processes on the black-and-white image data employing the processing circuit 7 of the present embodiment have been described. In the following, four examples of processes on color image data will be described.

B) Color Image Processing (i) Basic Example

Figure 28:
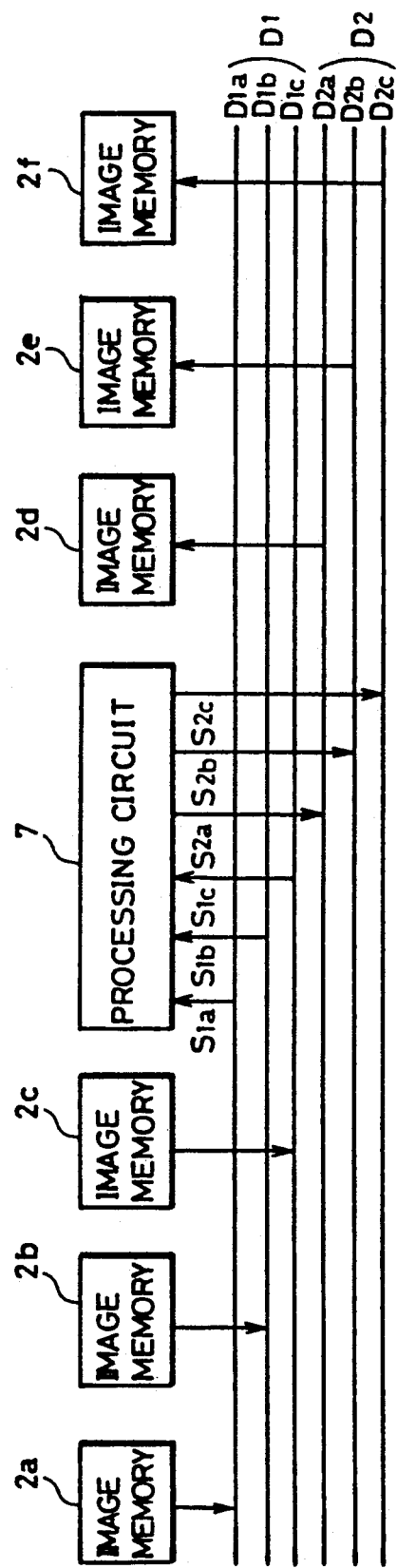
FIGS. 28–33 illustrate operations of one processing circuit of FIG. 16 utilized for various processes on color image data.

FIG. 28 shows a most basic processing state of color image processing. RGB components of the image to be processed are respectively stored in the image memories 2a, 2b and 2c and the read data are respectively inputted to the input terminals S1a, S1b and S1c of the processing circuit 7 through image data buses D1a, D1b and D1c. In the processing circuit 7, three basic processing circuits 6a, 6b and 6c are not coupled with each other but adapted to operate in parallel, and the image data inputted from the input terminals S1a, S1b and S1c are respectively applied to the basic processing circuits 6a, 6b and 6c in parallel. The output data from the basic processing circuits 6a, 6b and 6c are outputted from the output terminals S2a, S2b and S2c to be written in the image memories 2d, 2e and 2f through the image data buses D2a, D2b and D2c, respectively. In this manner, in the processing circuit 7 of this embodiment, a plurality of basic processing circuits 6a, 6b and 6c can be utilized in parallel, so that the process for color image data having multiple components can be carried out at the same processing speed as the black-and-white image data. On this occasion, the process function of the basic processing circuits 6a, 6b and 6c may be the same with each other, or different process function may be effected in respective circuits.

(ii) Processing between Color Images

Figure 29:
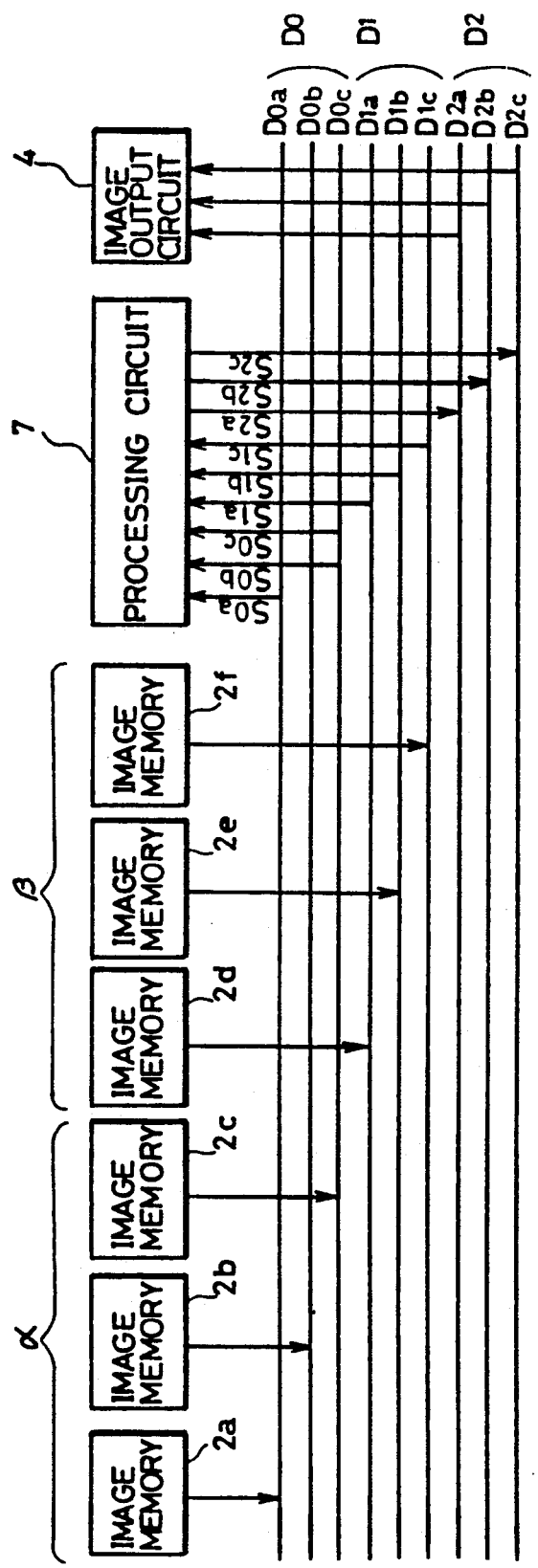

FIG. 29 shows an example of a process between two planes of color image data. Two planes of color image data comprise an image α constituted by image memories 2a, 2b and 2c and an image β constituted by image memories 2e and 2f. The color image α read from the image memories 2a, 2b and 2c is outputted to the image data buses D0a, D0b and D0c, while the color image β read from the image memories 2d, 2e and 2f is outputted to the image data buses D1a, D1b and D1c. Two planes of color images α and β are inputted to the processing circuit 7 through the input terminals S0a, S0b and S0c and the input terminals S1a, S1b and S1c. Similar to the above described example, the three basic processing circuits 6a, 6b and 6c operate in parallel in the processing circuit 7. Let us consider a case in which a weighted mean processing is carried out on two planes of color images α and β with the proportion of 1:7, as a specific example. The resulting image data is the image data on which the operation $(\alpha/8 + 7\beta/8)$ is carried out.

The flow of the image data in this case is shown in FIG. 30, the same constant value 7 is set in the three Y input constant registers 66a, 66b and 66c, and each of the components of the color image β inputted through the input terminals S1a, S1b and S1c from the image data buses D1a, D1b and D1c is multiplied by 7. The function (F=A+B) is designated in the three ALUs 62a, 62b and 62c. Therefore, each of the components of the color image α inputted from the data buses D0a, D0b and D0c through the input terminals S0a, S0b and S0c and of the color image 7β multiplied by 7 in the multiplying circuits 61a 61b and 61c are added to each other. The result of the arithmetic operation $(\alpha + 7\beta)$ is provided as the ALU output data. The bit shift circuits 63a, 63b and 63c in the succeeding stage are adapted to shift the data by 3 bits in the right direction, so that the ALU output data is divided by 8, as a result. Therefore, the output data from the bit shift circuits 63a, 63b and 63c will be $(\alpha/8 + 7\beta/8)$, which is the intended result of operation. A conversion table adapted to generate no change between the input and output data is set in the LUTs 64a, 64b and 64c, and the desired result of the weighted mean processing of three components is outputted to the image data bus D2a, D2b and D2c in parallel from the output terminals S2a, S2b and S2c of the processing circuit 7. In this example, the results of the process are inputted to the image output circuit 4 through the image data buses D2a, D2b and D2c to be externally outputted as color video signals.

(iii) Noise Filter

Figure 31:
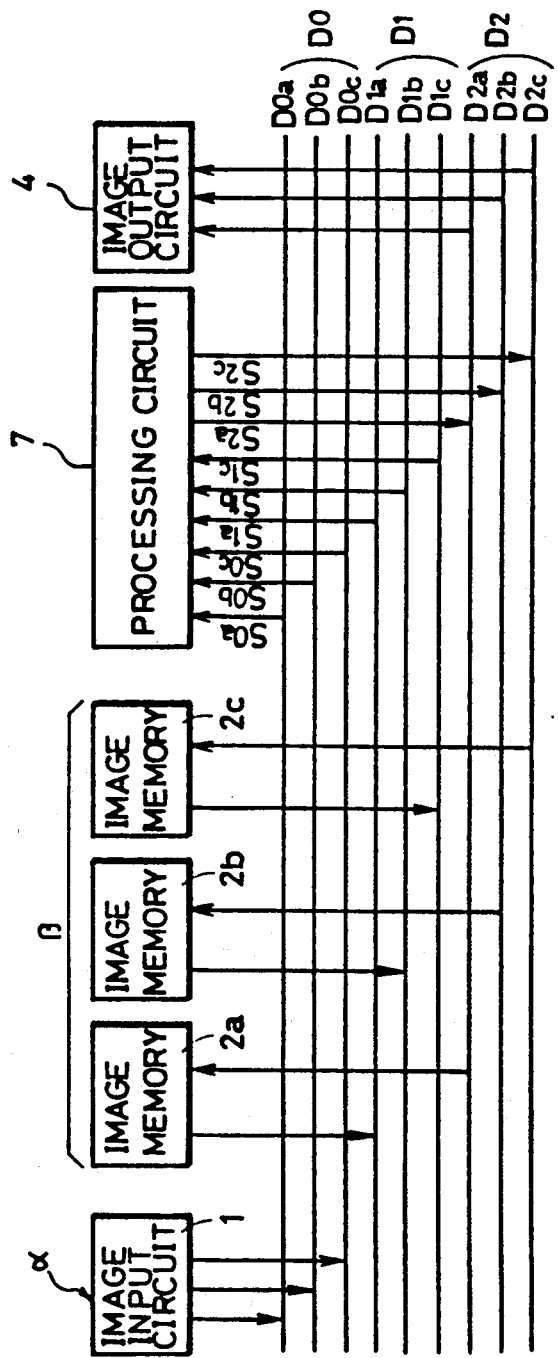

The example shown in FIG. 31 is a modification of the above example, and the operation of the processing circuit 7 itself is the weighted mean processing which is the same as that in the above example. The example of FIG. 31 is different from the above example in the following points, namely, the color image α is obtained form the input circuit 1; the color image β is provided from the image memories 2a, 2b and 2c; and the results of processing are written in the image memories 2a, 2b and 2c from image data buses D2a, D2b and D2c. Therefore, this process will be a recursive filtering process along the time axis on the image data successively inputted from the image input circuit 1. In this case, the fluctuation along the time axis is made even for each pixel, so that the noise generated in the input data on the time basis can be made smooth.

(iv) Coordinate Transformation of Color

Figure 32:
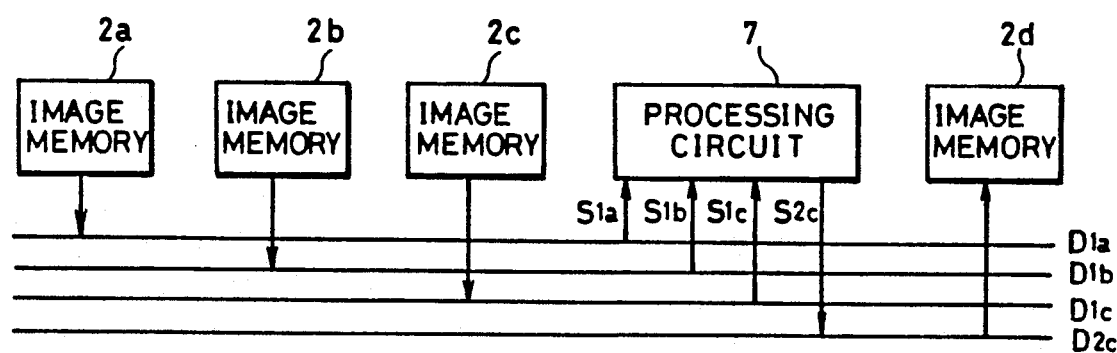

In the above described three examples of color image processing, the three basic processing circuits 6a, 6b and 6c operate in parallel in the processing circuit 7. In the fourth example of the color image processing described in the following, the three basic processing circuits 6a, 6b and 6c are utilized coupled with each other. In this example, a process for projecting color information of three components to a specified vector of the color space, that is, the coordinate transformation of color, is discussed. First, the general processing state including image memory and the like is shown in FIG. 32. Three components of the color image data are respectively stored in the image memories 2a, 2b and 2c. The read data from the image memories 2a, 2b and 2c are inputted to the processing circuit 7 from the input terminals S1a, S1b and S1c through the image data buses D1a, D1b and D1c. The three components of the image data are respectively inputted to the three basic processing circuits 6a, 6b and 6c in the processing circuit 7, with the basic processing circuits 6a, 6b and 6c coupled with each other, whereby the result of operation is outputted from the basic processing circuit 6c and is finally outputted to the image data bus D2c from the output terminals 2c. The result of the process is written in the image memory 2d through the image data bus D2c.

Figure 33:
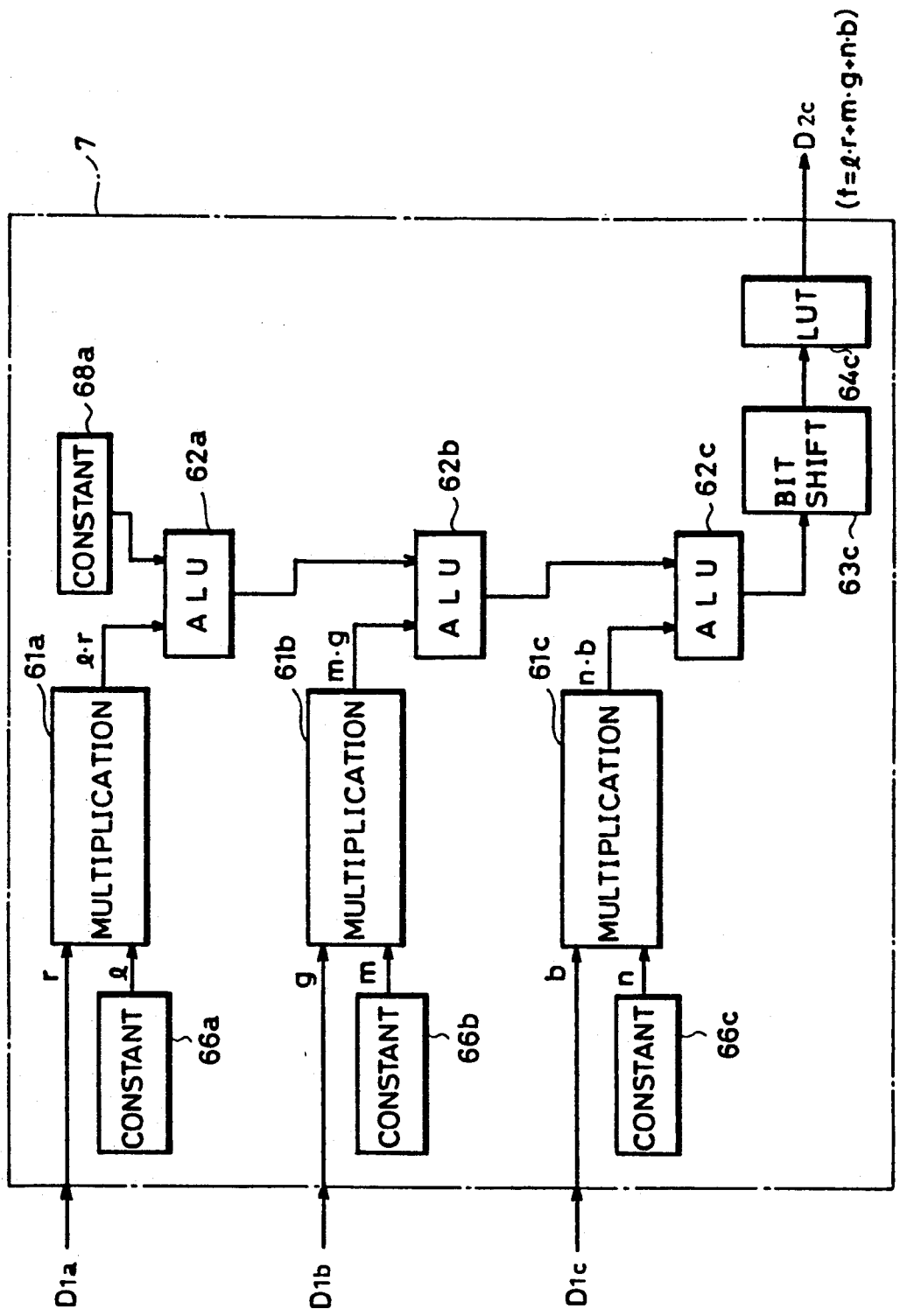

The specific flow of the image data in the processing circuit 7 is shown in FIG. 33. The color image data having three components (r, g, b) inputted from the image data buses D1a, D1b and D1c are respectively inputted to the multiplying circuit 61a, 61b and 61c of the basic processing circuits 6a, 6b and 6c. In respective multiplying circuits 61a, 61b and 61c, the input data from the image data buses D1a, D1b and D1c are multiplied by the components of a conversion vector (l, m, n) set in the constant registers 66a, 66b and 66c for Y input. As shown in the figure, the inputs and outputs of the ALUs 62a, 62b and 62c for respective channels are coupled with each other, and (F=A+B) is set as the function, whereby the multiplication output from the three multiplying circuits 61a, 61b and 61c are summed in the ALU 62c. When no conversion is carried out in the bit shift circuit 63c and in the LUT 64, the final output f will be the inner product (l·r+m·g+n·b) of the inputted color image data (r, g, b) and the conversion vector (l, m, n).

In the foregoing, examples of operations when the processing circuit 7 of this embodiment functions by itself have been described.

(II) Examples of Processes by One Processing Circuit and External Circuits

Two Dimensional FIR Filtering of 3×3

In the following, an example shown in which the processing circuit 7 and external auxiliary circuits operate effectively to extend the functions of the processing circuit 7. An 1 H delay element 8 serving as a FIFO (First In First First Out) register for the image data corresponding to 1 horizontal scanning period is used as the external circuit to extend the above described one dimensional FIR filter with three taps (C FIGS. 26 and 27) to two dimensional FIR filter of the kernel size of 3×3. The kernel of the filter is assumed to be $$\begin{pmatrix} x_{00}, & x_{01}, & x_{02} \\ x_{10}, & x_{11}, & x_{12} \\ x_{20}, & x_{21}, & x_{22} \end{pmatrix}$$

Figure 34:
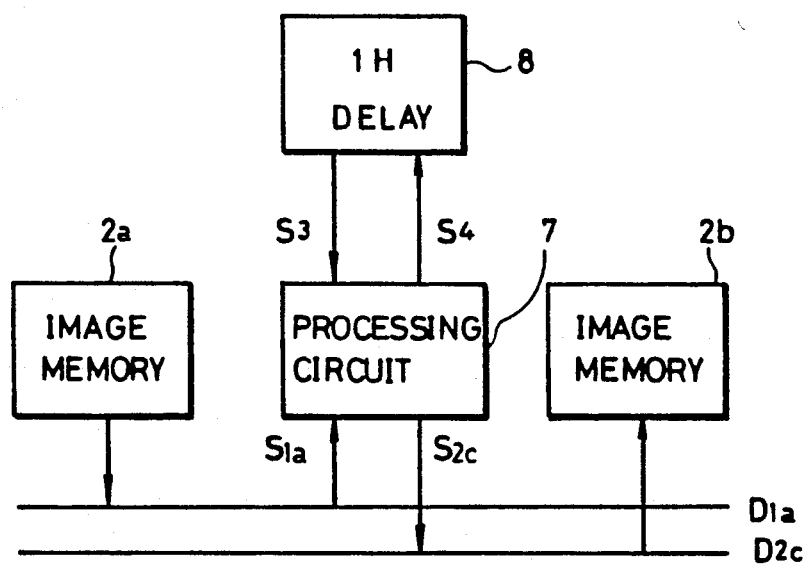
FIGS. 34, 35(a) (b) (c) illustrate operations of the processing circuit of FIG. 16 coupled with an external 1 H delay element.

FIG. 34 shows a relation of connections between the processing circuit 7 and the 1 H delay element 8 and between the two image memories 2a and 2b. The image data to be processed is read from the image memory 2a to the image data bus D1a to be inputted to the processing circuit 7 through the input terminal S1a. The result of the process is outputted to the image data bus D2c from the output terminal S2c to be written in the image memory 2b. The processing circuit 7 and the 1 H delay element 8 are connected to each other by the output terminal S4 and the input terminal S3. In the two dimensional FIR filtering processes, the result of the process for 1 line is provided every time the image data of continuous three lines are read. When the image data are read line by line from the upper line to the lower line, the image data having the period of three lines are provided as the result of processing after the reading of 1 frame. The result of the process of 1 plane can be provided by carrying out processing of three frames with the start of reading shifted frame by frame. During processing, the state of processing is switched by the period of three lines, as shown in FIGS. 35 (a), (b), (c).

Figure 35:
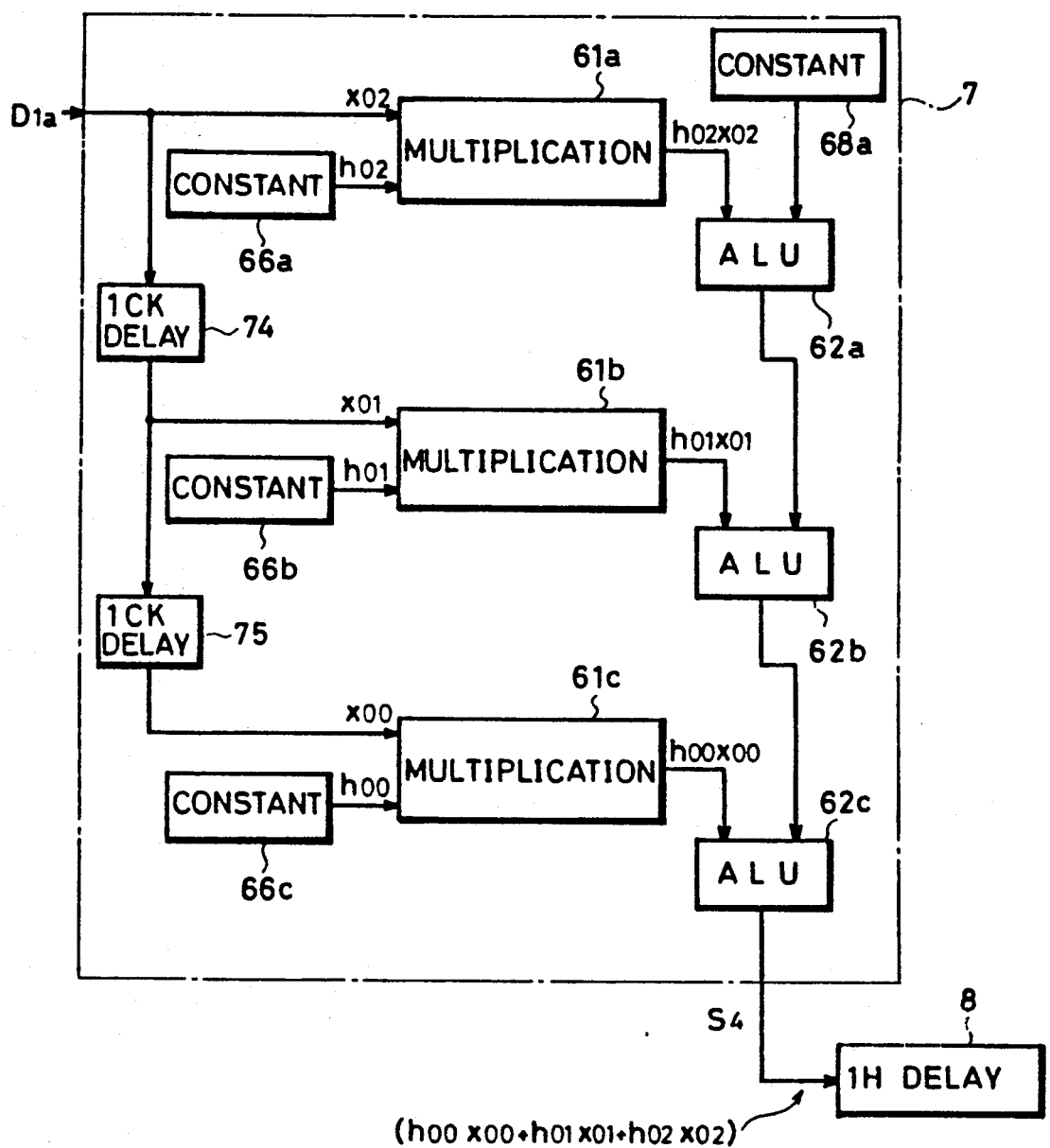
Figure 35:
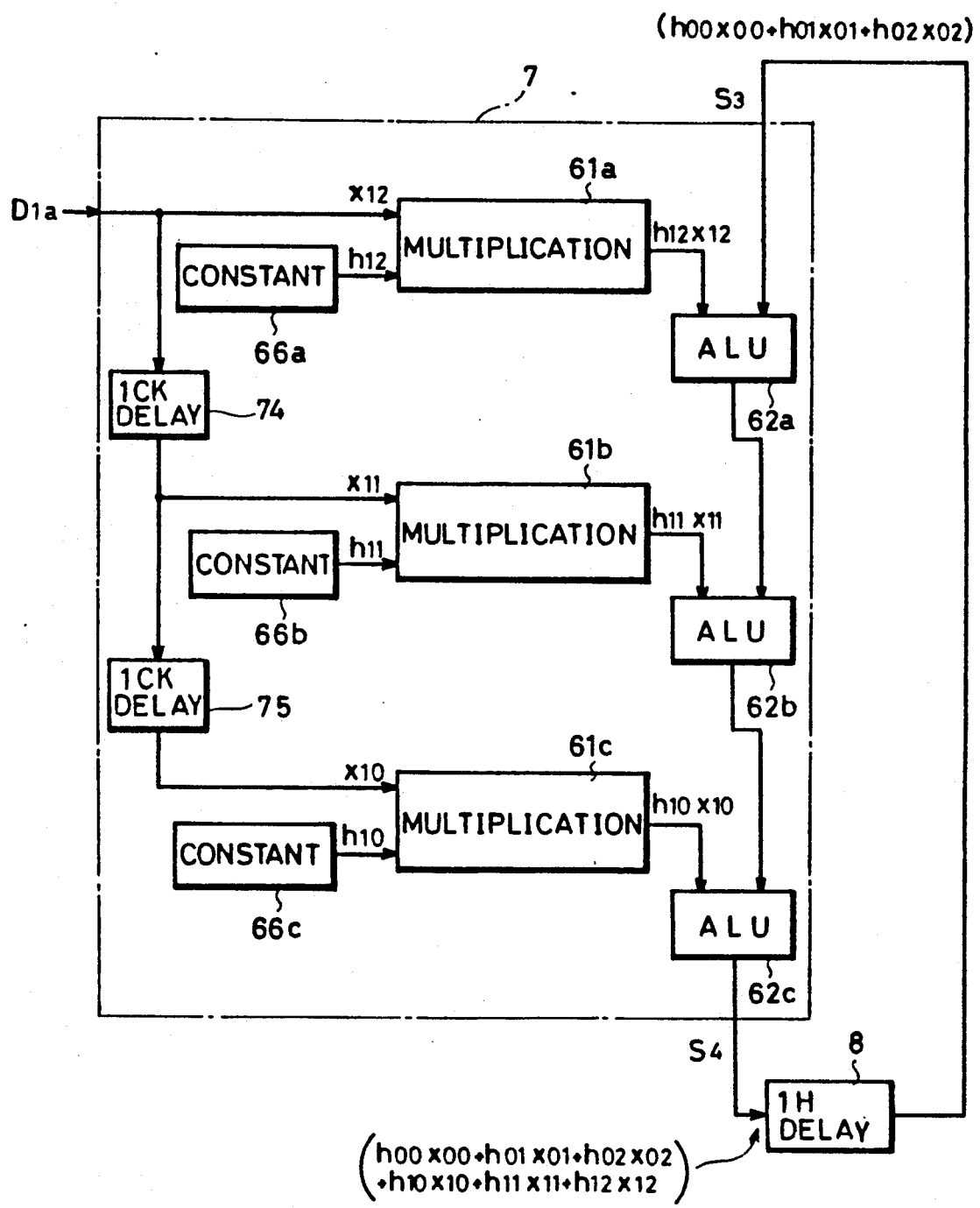
Figure 35:
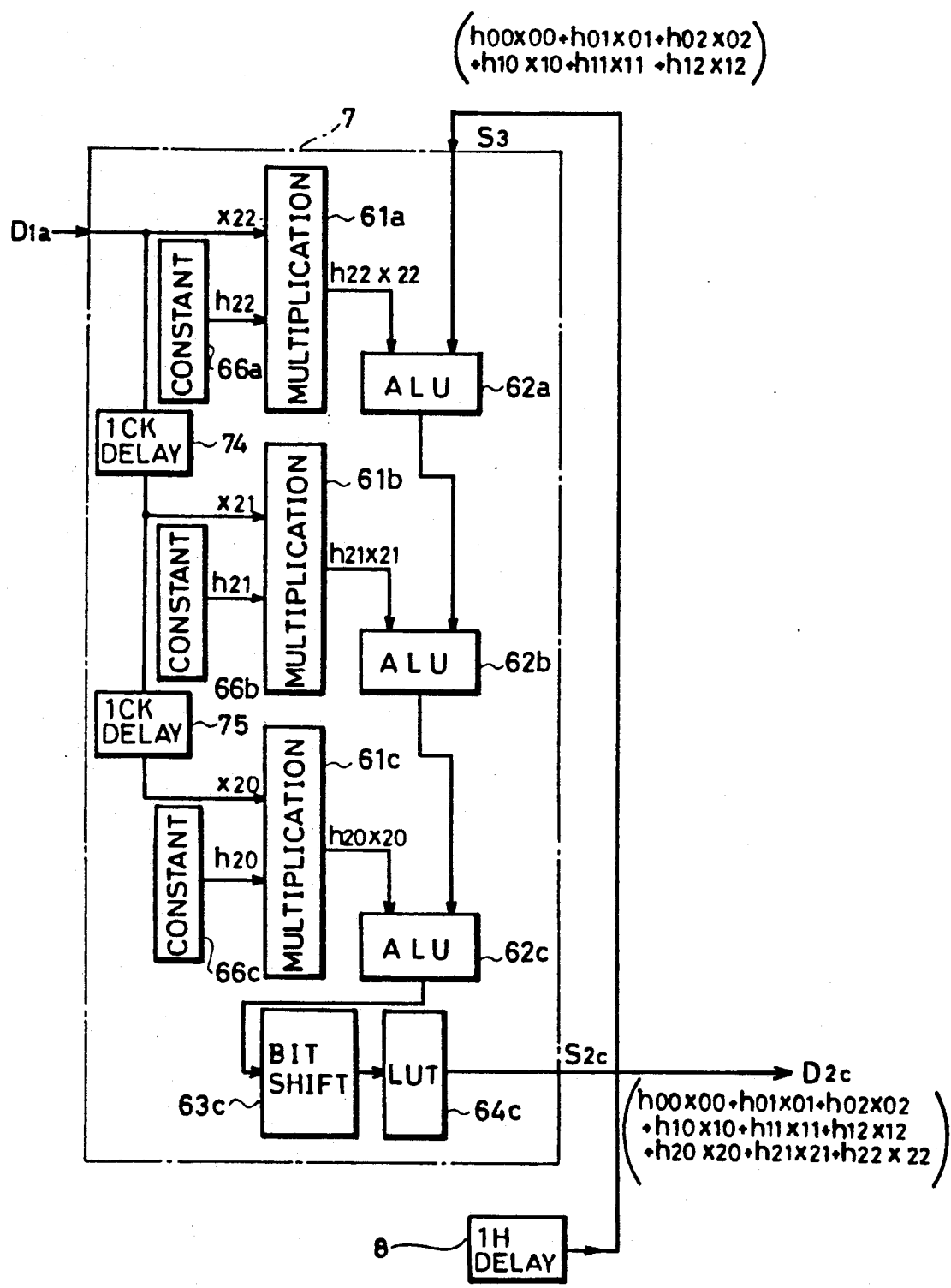

FIG. 35 (a) shows the flow of image data in the processing circuit 7 in the first line. The state of the processing circuit 7 is the same as that in the 3 tap FIR filter described with reference to FIG. 27. However, the filter output data obtained from the ALU 62c is written in the 1 H delay element 8 from the output terminal S4. In this figure, the data $x_{02}$, $x_{01}$, $x_{00}$ of three pixels adjacent in the horizontal direction in a line of the image data are multiplied by the coefficients $h_{02}$, $h_{01}$, $h_{00}$ of the first row of the kernel in the three multiplying circuits 61a, 61b, 61c, thereby the result $(h_{00}x_{00}+h_{01}x_{01}+h_{02}x_{02})$ is provided from the ALU 62c. The image data changes to $(x_{03}, x_{02}, x_{01})$, $(x_{04}, x_{03}, x_{02})$ ... successively in accordance with the transfer clock. When the image data input for 1 line to the processing circuit 7 is completed, the result of the process for 1 line is written in the 1 H delay element 8.

FIG. 35 (b) shows the flow of the image data in the second line. It is different from that of the first line in that the result of the process of the first line is added in the ALU 62a. The result of the process of the first line is read from the 1 H delay element 8 to be inputted through the input terminal S3. In the multiplying circuits 61a, 61b, 61c, the image data $x_{12}$, $x_{11}$, $x_{10}$ one line below the image data read in the first line are multiplied by the coefficients $h_{12}$, $h_{11}$, $h_{10}$ of the second row of the kernel, and the result $(h_{00}x_{00}+h_{01}x_{01}+h_{02}x_{02}+h_{10}x_{10}+h_{11}x_{11}+h_{12}x_{12})$ is provided from the ALU 62c. The output of the process is written in then 1 H delay element 8 as in the case of the output of the first line. When the processing of the image data of the second line is completed, the result of the process of the first line has already been read out from the 1 H delay element 8 and the data in the 1 H delay element 8 are replaced by the result of the process of the second line.

FIG. 35 (c) shows the flow of the image data in the third line. The result of the process of the preceding line is read from the 1 H delay element 8 to be inputted to the ALU 62a as in the case of the second line, and the output data from the ALU 62c is not written in the 1 H delay element 8 but outputted to the image data bus D2c through the bit shift circuit 63c, the LUT64c and the output terminal S2c. In the multiplying circuits 61a, 61b, and 61c the image data $x_{22}$, $x_{21}$, $x_{20}$ one line below the image data read in the second line are multiplied by the coefficients $h_{22}$, $h_{21}$, $h_{20}$ of the third row of the kernel, thereby the result $(h_{00}x_{00}+h_{01}x_{01}+h_{02}x_{02}+h_{10}x_{10}+h_{11}x_{11}+h_{12}x_{12}+h_{20}x_{20}+h_{21}x_{21}+h_{22}x_{22})$ is provided from the ALU 62c as the final output. If the bit shift circuit 63c and the LUT 64c are adapted to generate no changed between the input and output, then the result of the two dimensional FIR filtering process of the kernel size of 3×3 is outputted to the image data bus D2c from the output terminal S2c.

As described above, the result of the process for 1 line is provided in the processing time period of 3 lines. In the succeeding fourth line, the processing circuit 7 returns to the processing state of the first line shown in FIG. 35 (a) and the process proceeds. In the first frame, an arithmetic processing by the first row of the kernel is carried out on the image data of the first line, the arithmetic processing by the second row of the kernel is carried out on the second line, and the arithmetic processing by the third row of the kernel is carried out on the third line, as described above. In the second frame, the reading of the image data starts from the second line, so that the correspondence with the kernel is shifted by 1 row from the first frame. In the third frame, the image data is read starting from the third line, so that the correspondence between the kernel and the image data is shifted by two rows from the first frame. Thus, the processing is completed in three frames. In the above description, the first row of the kernel is used as the coefficient for the first line, and the second row is used for the second line, and the third row is used for the third line, and the order is repeated. Namely, the set values of the constant registers 61a, 61b and 61c for Y input must be changed for every line. The change of the set value is generally done by a control circuit such as a host CPU. If the constant should be changed at every line, the constant must be rewritten in the intervals between the lines where the image data are not actually treated. In order to do so, which line is processed in the processing circuit 7 and whether the constant registers 66a, 66b, and 66c for Y input can be written or not by the host CPU must be continuously watched by the host CPU. Therefore, in the present embodiment, not a register capable of setting one constant value but a register file capable of setting a plurality of constant values is used for each of the constant registers 66a, 66b, and 66c for Y input, and the information (not shown) showing the line being processed is used as the read address, whereby the coefficients can be switched line by line without the need of changing the constant at every line.

It goes without saying that the size of the kernel in the vertical direction can be enlarged by increasing the number of processing corresponding to the second line and by enlarging the range of processing larger than three lines in this process. In that case, the number of frames required for completing the process is naturally increased.

(III) Examples of Processes by 3 Processing Circuits

In the following, examples are shown in which a plurality of processing circuits 7 are simultaneously used. In one example, three processing circuits 7 are used in parallel, and in two other examples, three processing circuits 7 are used cascade connected with each other.

(i) Coordinate Transformation of Color of 3×3

FIG. 36 shows the connections between each of the circuits when the coordinate transformation of color of 3×3 is carried out on the color image data having three components in the processing time of 1 frame. The coordinate transformation of color has been already described with reference to FIGS. 32 and 33. However, in the above example, only the projection for 1 conversion vector was possible since only one processing circuit 7 is used. Therefore, it required the processing time of three frames for the conversion to a new three dimensional color coordinate space. Referring to FIG. 36, the components R, G, B of the image to be processed are read to the image data buses D1a, D1b, and D1c from image memories 2a, 2b and 2c and inputted to the processing circuit 7a, 7b and 7c through the input terminals S1a, S1b, and S1c. The following arithmetic operation is effected on the input data in each of the three processing circuits 7a, 7b and 7c.

$$\begin{pmatrix} x \\ y \\ z \end{pmatrix} = \begin{pmatrix} l_0 m_0 n_0 \\ l_1 m_1 n_1 \\ l_2 m_2 n_2 \end{pmatrix} \begin{pmatrix} r \\ g \\ b \end{pmatrix}$$

In the processing circuit 7a, the operation by the first row of the conversion matrix is carried out, the first component x of the output vector is outputted from the output terminal S2a to the image data bus D2a to be written in the image memory 2d. In the processing circuit 7b, the arithmetic operation by the second row of the conversion matrix is carried out, the second component y of the output vector is outputted from the output terminal S2b to the image data bus D2b to be written in the image memory 2e. In the processing circuit 7c, the arithmetic operation by the third row of the conversion matrix is carried out and the third component z of the output vector is outputted from the output terminal S2c to the image data bus D2c to be written in the image memory 2f.

The flow of the image data in each of the processing circuits 7a, 7b and 7c is shown in FIGS. 37 (a), (b) and (c). Each of the figures basically show the same operation as that of FIG. 33. However, in order to prevent contention of the output data from the processing circuits 7a, 7b and 7c on the image data bus D2, the processing circuit 7a is adapted such that the result of the operation is outputted through the LUT 64a and the output terminal S2a to the image data bus D2a, the processing circuit 7b is adapted such that the result of the operation is outputted through the LUT 64b and the output terminal S2b to the image data bus D2b, and the processing circuit 7c is adapted such that the result of the operation is outputted through the LUT 64c and the output terminal S2c to the image data bus D2c. The above described adaptation becomes possible by the provision of the LUT input selectors 69a, 69b and 69c before the LUTs 64a, 64b and 64c, respectively, enabling the input of the output of the bit shift circuit 63c to the LUTs 64a, 64b and 64c.

(ii) Two Dimensional FIR Filter of 3×3

FIG. 38 show an example in which three processing circuits 7a, 7b and 7c are used cascade connected with each other. The image data to be processed is read from the image memory 2a to the image data bus D1a and inputted through the input terminal S1a of the first processing circuit 7a. The operation output is outputted from the output terminal S2c of the third processing circuit 7c to the image data bus Dc to be written in the image memory 2b. Respective processing circuits 7a, 7b and 7c are adapted such that the data provided during the processing are coupled between the output terminal S4a and input terminal S3b and between the output terminal S4b and the input terminal S3c and that the delayed images to be processed are coupled between the output terminal S6a and the input terminal S5b and between the output terminal S6b and the input terminal S5c. A two dimensional FIR filtering of the kernel size of 3×3 requiring the processing time of 1 frame will be described as an example of the processing state shown in FIG. 38.

FIG. 39 shows the flow of the image data in the processing circuits 7a, 7b and 7c in the case of the two dimensional of FIR filtering of the kernel size of 3×3. In order to distinguish 9 basic processing circuits in total included in the processing circuits 7a, 7b and 7c, the basic processing circuits included in the processing circuit 7a are represented by 6a, 6b and 6c, those in the processing circuits 7b are represented by 6d, 6e and 6f and that those included in the processing circuit 7c are represented by 6g, 6h and 6i. They are represented by the same reference numerals in FIG. 40. The flow of the image data in the three processing circuits 7a, 7b and 7c is basically the same as that in the one dimensional FIR filter of three taps shown in FIG. 27. However, since the three processing circuits 7a, 7b and 7c are coupled with each other as shown in FIG. 38, the function different from that of FIG. 27 is carried out.

First, by means of the coupling of the output terminal S6a of the first processing circuit 7a and the input terminal S5b of the second processing circuit 7b, the image data which is the image data inputted in the multiplying circuit 61a of the first processing circuit 7a delayed for 1 line by the 1 H delay element 77a is inputted to the multiplying circuit 61d of the second processing circuit 7b. In the similar manner, the image data which is the image data delayed for 1 line by the 1 H delay element 77b is inputted to the multiplying circuit 61g of the third processing circuit 7c through the output terminal S6b of the second processing circuit 7b and the input terminal S5c of the third processing circuit 7c. When the one dimensional FIR filtering of 3 taps is carried out on the image data ($x_{22}$, $x_{21}$, $x_{20}$ in the figure) of a certain line with the coefficient ($h_{22}$, $h_{21}$, $h_{20}$) in the first processing circuit 7a, the one dimensional FIR filter is carried out on the image data ($x_{12}$, $x_{11}$, $x_{10}$ in the figure) of one line above with the coefficient ($h_{12}$, $h_{11}$,$'^{h}10$) in the second processing circuit 7b at the same time, and the one dimensional FIR filtering is carried out on the image data ($x_{02}$, $x_{01}'x_{00}$ in the figure) further 1 line above with the coefficient ($h_{02}$, $h_{01}$, $h_{00}$) in the third processing circuit 7c at the same time.

By means of the coupling of the output terminal S4a of the first processing circuit 7a and the input terminal S3b of the second processing circuit 7b, the output of the ALU 62c is inputted to the ALU 62a and by means of the coupling of the output terminal S4b of the second processing circuit 7b and the input terminal S3c of the third processing circuit 7c, the output of the ALU 62f is inputted to the ALU 62g. Namely, all ALUs 62a–62i are coupled, whereby the result of the operation of one dimensional FIR filtering with 3 taps on three lines of image data which are respectively operated in three processing circuits 7a, 7b and 7c are sent to be outputted from the ALU 62i. The result of the operation is outputted to the image data bus D2c from the output terminal S2c through the bit shift circuit 63i and the LUT64i.

(iii) One Dimensional of FIR Filtering with 9 taps

Figure 40:
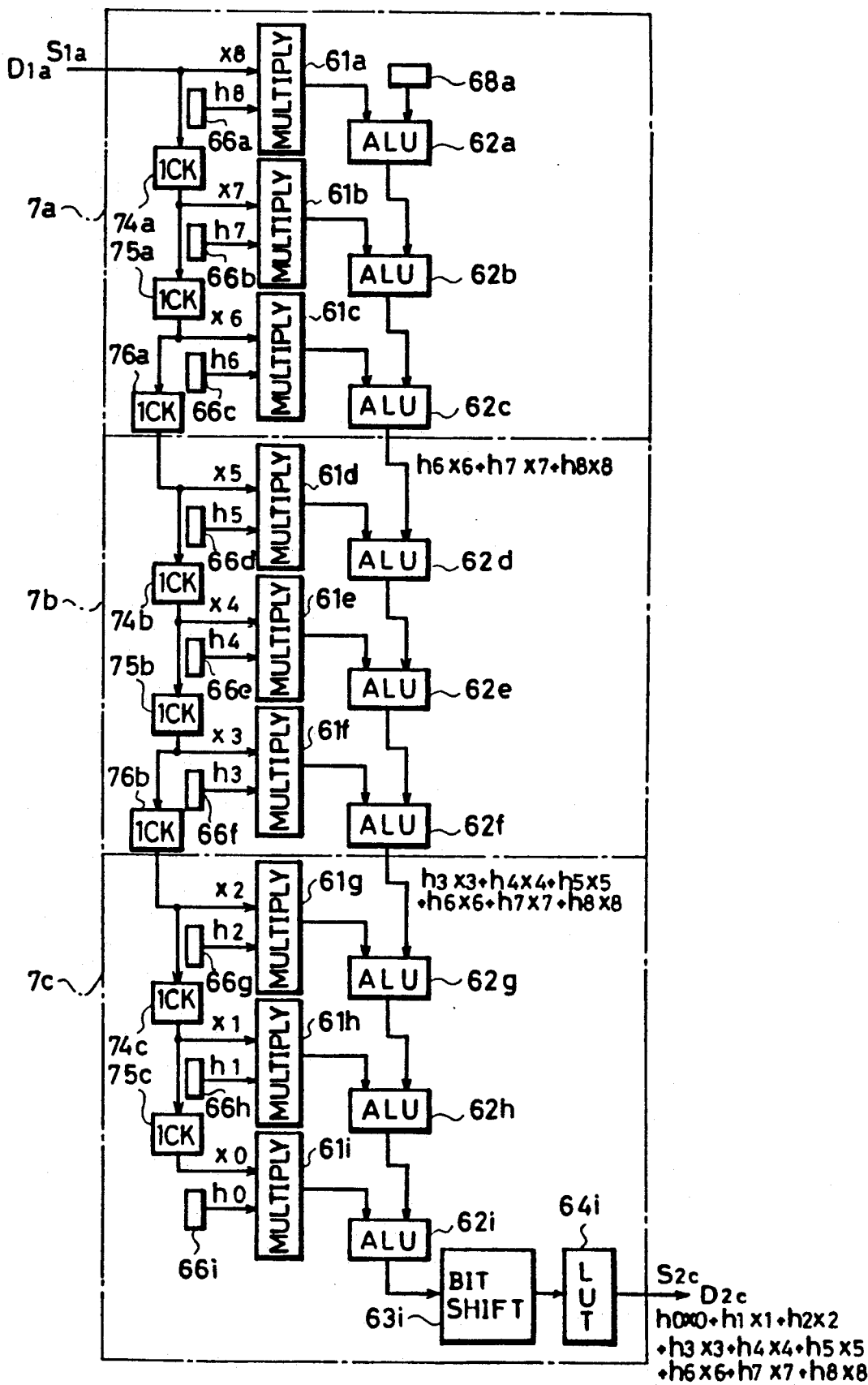

In the following, the one dimensional FIR filtering with 9 taps will be described as another example of the processing state shown in FIG. 38. FIG. 40 shows the flow of the image data in the processing circuits 7a, 7b, and 7c in realizing the one dimensional FIR filter of 9 taps. As in the above example, the processing circuits 7a, 7b and 7c are in the same processing states as those for realizing one dimensional FIR filtering with 3 taps shown in FIG. 27. The couplings between the three processing circuits 7a, 7b and 7c are the same as the above example. However, different data are outputted from the output terminals S6a and S6b. In the above example, image data delayed by 1 line are successively transmitted to the processing circuits of the succeeding stages. In this example, since 1 CK delay element 76a and 76b generating a delay of 1 pixel are used, image data ($x_8$ ~ $x_0$ in the figure) in succession in the horizontal direction are applied to 9 multiplying circuits 61a ~ 61i. Coefficients $h_8$ ~ $h_0$ are respectively set in the constant registers 66a–66i for Y input, and 9 ALUs 62a ~ 62i are coupled as in the above example, so that the one dimensional FIR filtering with the number of taps extended to 9 can be executed in 1 frame in this example. It goes without saying that the number of taps can be extended by increasing the number of the processing circuits 7 to be coupled.

(IV) Examples of Processes Employing Three Processing Circuits and External Circuits Two Dimensional FIR Filter of 9×9

Figure 41:
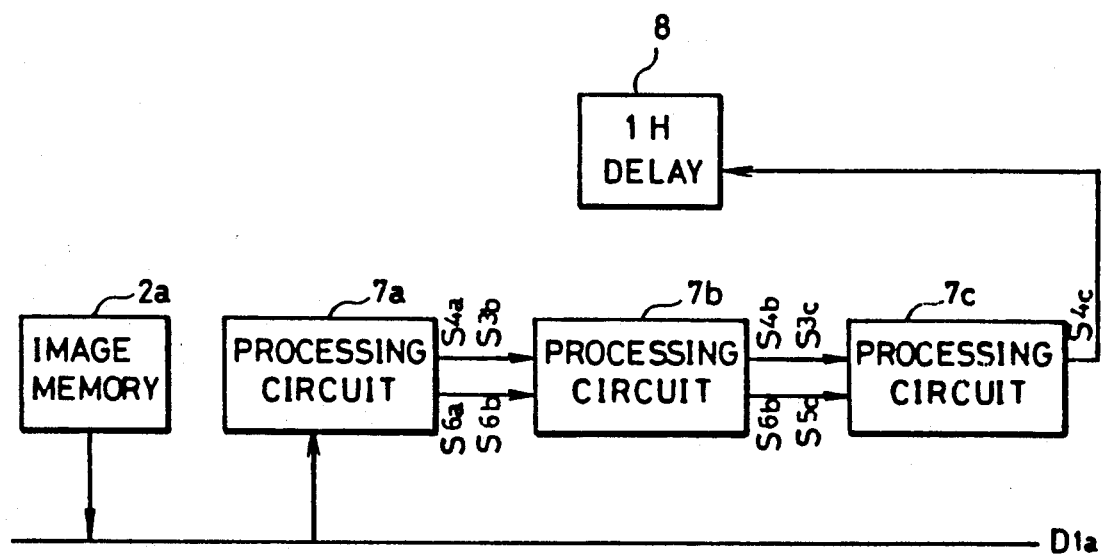
FIGS. 41(a) (b), and (c) illustrate operations of three processing circuits of FIG. 16 coupled with an external 1 H delay element.
Figure 41:
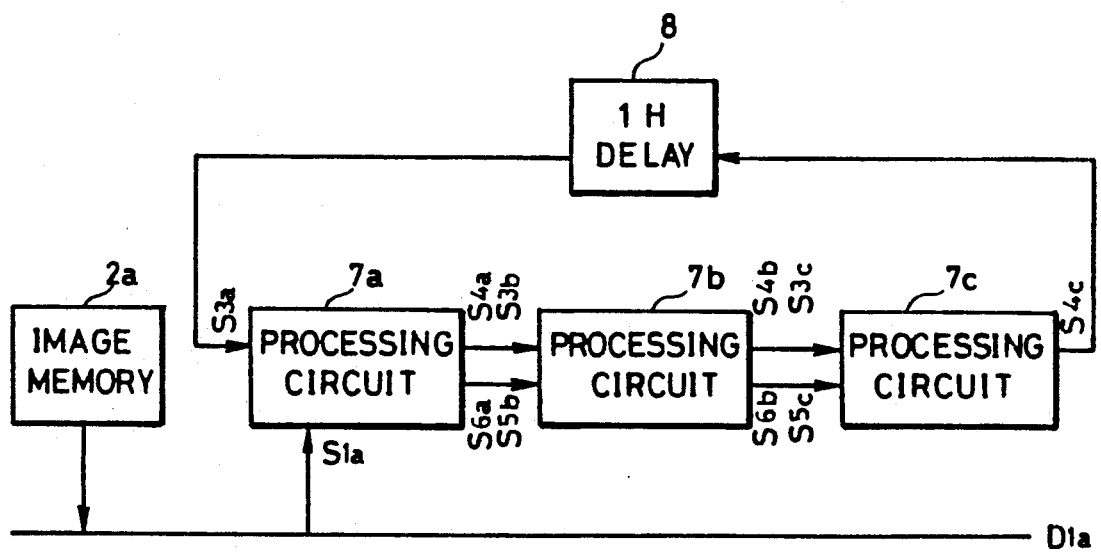
Figure 41:
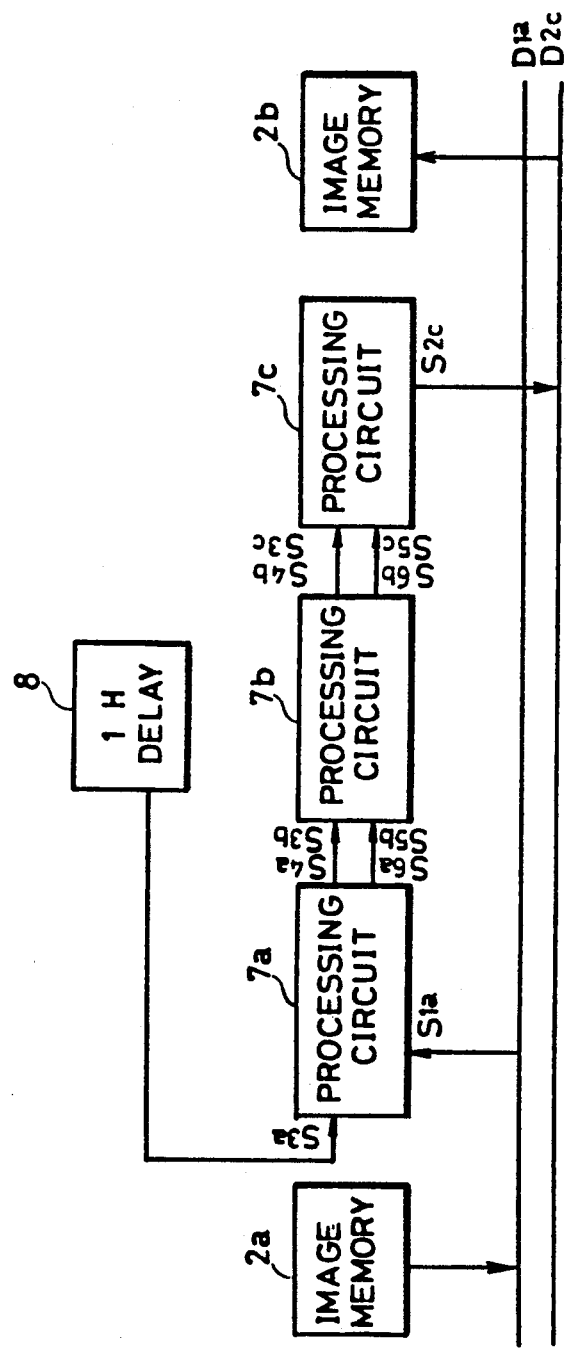
Figure 43:
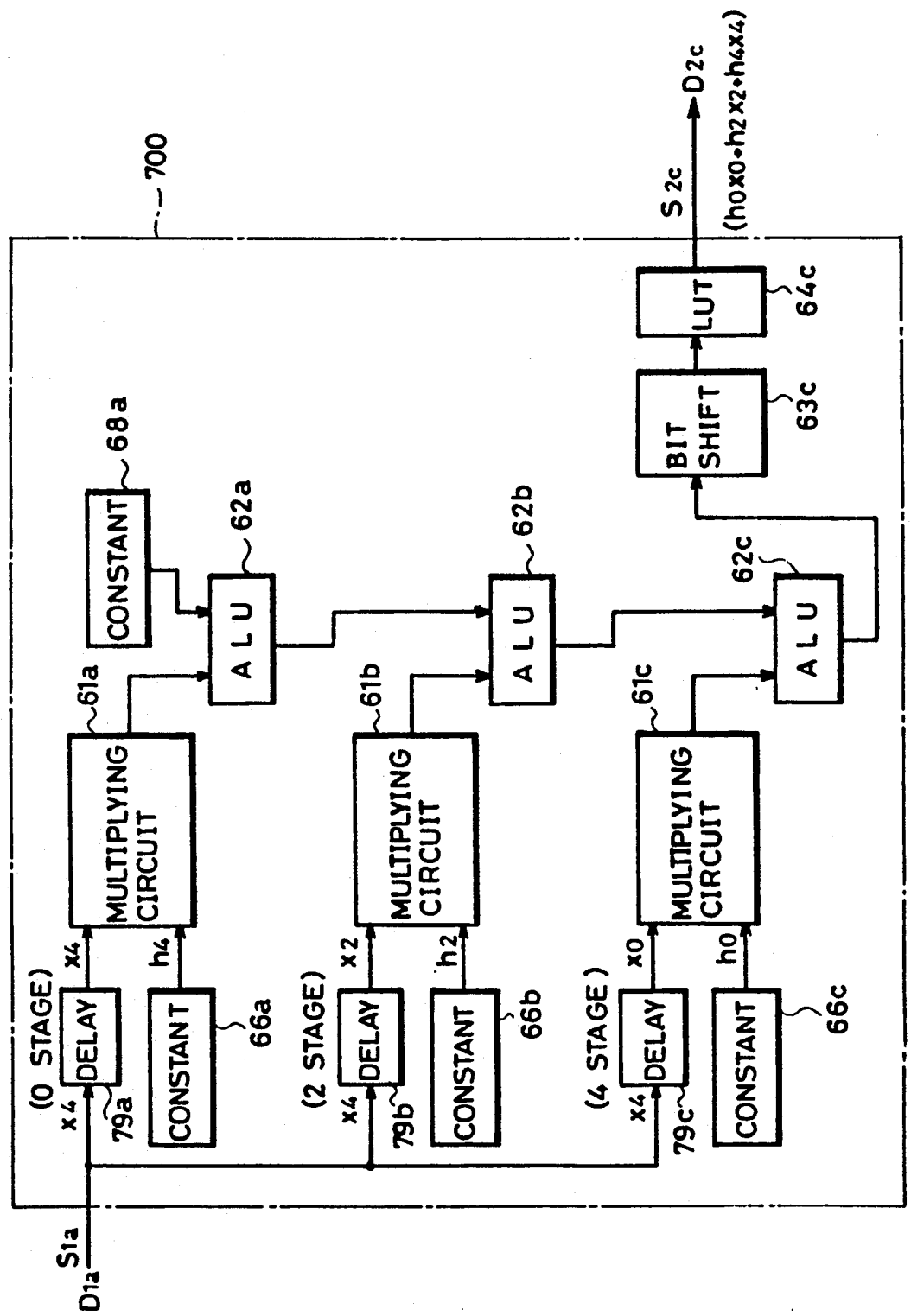
FIGS. 43 and 44 illustrate operations of the processing circuit of FIG. 42 utilized for various processes.

An example of a process is shown in FIGS. 43 (a)~(c) in which an external 1 H delay element 8 is added to processing circuits 7a, 7b and 7c coupled with each other. The image to be processed is stored in the image memory 2a and the result of the processing is written in the image memory 2b. In the foregoing, it is shown with reference to FIGS. 34 and 45 that the two dimensional FIR filtering process of the kernel size of 3×3 can be effected by coupling an external 1 H delay element 8 to the processing circuit 7 in the state of executing one dimensional FIR filtering process with 3 taps, although the time required for the processing is tripled. It is also shown that three processing circuits 7a, 7b and 7c in the state of executing one dimensional FIR filtering with 3 taps can be coupled with each other to extend to one dimensional FIR filtering with 9 taps with reference to FIG. 4. Meanwhile, the processing circuits to be coupled are always the same type, the input and the output terminals of the processing circuits viewed from the outside are always the same whether one processing circuit is utilized by itself or three or an arbitrary number of processing circuits are utilized coupled with each other. Therefore, the externally applied 1 H delay element 8 such as shown in FIGS. 34 and 35 can be utilized even when three processing circuits are coupled as shown in FIG. 40 to extend the one dimensional FIR filter with 9 taps to two dimensional one. The example shown in FIG. 41 is in accordance with the above description, and it shows the connection between each of the circuits in realizing the two dimensional FIR filtering of the kernel size of 9×9, for example. In this process also, the result of the processing for 1 line is provided as the result of the processes for a plurality of lines as in the example shown in FIGS. 34 and 35. Since the kernel size is 9×9, the result of processing for 1 line is provided from the processing of 9 lines.

FIG. 41(a) shows the state of processing of the first line of the process having the period of 9 lines, FIG. 41(b) shows the state of processing from the second to 8 lines, and FIG. 41(c) shows the state of processing of the ninth line. In the figure, three processing circuits 7a, 7b and 7c are at the states shown in FIG. 40, executing the one dimensional FIR filtering with 9 taps.

In the processing of the first line shown in FIG. 41(a), the image data of the first line is inputted to the first processing circuit 7a, and the image data of 9 pixels adjacent to each other in the horizontal direction can be obtained from the input data by means of 8 delay elements 74a, 75a, 76a, 74b, 75b, 76b, 74c and 75c (see FIG. 40) in the processing circuits 7a, 7b and 7c to be inputted to 9 multiplying circuits 61a~61i, respectively. Meanwhile, the coefficients $h_{08} \sim h_{00}$ of the first row of the kernel of 9×9 are applied from 9 constant registers 66a-66i for Y input to 9 multiplying circuits 61a~61i to be multiplied with the image data of the above mentioned 9 pixels. A filter output is obtained from the nineth ALU 62i, which is outputted from the output terminal S4c of the third processing circuit 7c to be written in the 1 H delay element 8. In the processing from the second line shown in FIG. 41(b), the result of the processing of the preceding line is read from the 1 H delay element 8 to be inputted to the first ALU 62a. Consequently, the filter output outputted from the ninth ALU 62i comprises result of the line presently being processed as well as the result of the processing of the lines which have been processed previously all added at each pixel position. Coefficients of the rows corresponding to the lines being processed are read from the constant registers 66a~66i for Y input. The processing state shown in FIG. 41(b) continues to the eighth line, and the results of the processing of 8 rows of the kernel are provided in the 1 H delay element 8. In the processing of the 9 lines shown in FIG. 41(c), the results of the processing of 8 lines are read from the 1 H delay element 8, which are inputted to the first ALU 62a, and a final result of filtering obtained through the operations of all 9 rows of the kernel is provide from the ninth ALU 62i. This result is outputted to the image data bus D2c through the output terminal S2c through the bit shift circuit 63i and the LUT 64i. In the tenth line, the processing state becomes the same as that of the first line shown in FIG. 41(a), and thereafter the process proceeds by the period of 9 lines. When 1 screen is read from the image memory 2a, the result of pressing of 1/9 of 1 screen is stored in the image memory 2b by the period of 9 lines. In the second and the following frees, the start of reading from the image memory 2a is shifted by 1 line. Thus, the result of the processing of the whole 1 screen is provided in the image memory 2b at the end of reading of the image in 9 frames.

Embodiment 4

A structure of the processing circuit 700 in accordance with another embodiment of the present invention is shown in FIG. 46. As shown in the figure, the delay elements 74, 75 and 76 in the embodiment of FIG. 16 are eliminated, and variable length delay elements 79a, 79b and 79c capable of generating delays of arbitrary length upon reception of the output from the a-channel input selector 71, b-channel input selector 72 and c-channel input selector 73 are provided before the input terminals T1a, T1b and T1c of the basic processing circuits 6a, 6b and 6c. The output data from the a-channel input selector 71 is commonly inputted to the b-channel input selector 72, c-channel input selector 73 and the delay output selector 78. Except for the above points, the structure is the same as the processing circuit of FIG. 16. Prior to the description of new processes carried out by the newly provided variable lengths delay elements 79a, 79b and 79c, description will be given of a fact that all of the processes which were realized by the processing circuit of FIG. 16 can be realized by the processing circuit of FIG. 42.

(a) Common Process Functions

When only one variable length delay element 79c out of the variable length delay elements 79a~79c is used with the number of delay stages set at zero, the processing state will be the same as that shown in FIGS. 22~25. When the number of delay stages in the variable length delay elements 79a, 79b and 79c are respectively set at 0, 1 and 2, the image data equivalent to that shown in FIG. 27 is inputted to three multiplying circuits 61a, 61b and 61c, whereby the one dimensional FIR filtering with three taps can be realized in the similar manner as that shown in FIGS. 26 and 27. If the number of delay stages is set at zero in each of the three variable length delay element 79a, 79b and 79c, the same processing state as that shown in FIGS. 28~33 is provided. The processes shown in FIGS. 34 and 35 are the developments of the process shown in FIG. 7. Therefore, in order to provide the same processing state, the number of delay stages in the variable lengths delay elements 79a, 79b and 79c should be set at 0, 1 and 2 respectively. In order to provide the same processing state as that of FIGS. 36 and 37, the number of delay stages should be set at zero in 9 valuable lengths delay elements. In the process of FIG. 39, each of the processing circuits should be in the same state as that shown in FIG. 27. Therefore, in order to provide the same processing state, the number of delay stages should be set at zero in the variable length delay elements 79a, 79d and 79g, the number should be 1 in the delay elements 79b, 79e and 79h, and the number should be 2 in the delay elements 79c, 79f and 79i, respectively. In the processes of FIGS. 40 and 41, the delay of input data to the multiplying circuits 61a~61i are accumulated by the coupling of the processing circuits 7a, 7b and 7c. Therefore, in order to provide the same processing state, the number of delay stages in the 9 variable length delay elements 79a~79i should be zero in the element 79a, 1 in the element 79b, 2 in the element 79c, 3 in the element 79d 4 in the element 79e, 5 in the element 79f, 6 in the element 79g, 7 in the element 79h and 8 in the element 79i. As described above, the processing circuit shown in FIG. 42 can carry out all processes realized by the processing circuit shown in FIG. 16.

(b) Process Function Characteristic of This Embodiment

In the following, examples of processes enabled by the processing circuit of FIG. 42 will be described.

(i) One Dimensional FIR Filtering with Pseudo 5 Taps

FIG. 43 shows one dimensional FIR filtering with 5 taps. The number of delay stages in the variable length delay elements 79a, 79b and 79c is set at 0, 2, and 4, respectively. As a result, it is noted that although the image data inputted to the multiplying circuits 61a, 61b and 61c is for three pixels adjacent in the horizontal direction in the example of FIG. 27, it is for three pixels arranged spaced apart by 1 pixel in the horizontal direction in this example. Consequently, the effect of increasing the filter taps from 3 to 5 is seemingly obtained, so that the frequency characteristics of the filter can be easily adjusted. The number of delay stages to be set is not limited to 0, 2 and 4, and arbitrary number may be employed, so that the freedom in setting the coefficient of the filter is remarkably increased.

The setting shown in FIG. 23 can be applied to the two dimensional FIR filtering shown in FIGS. 34, 35 and 39. In that case, the image data are not read successively line by line but the data are read in the period of 2 lines, that is, the interlace scanning of 2:1, whereby the two dimensional FIR filtering of the kernel size of 5×5 can be realized.

(ii) Differential Processing

Figure 42:
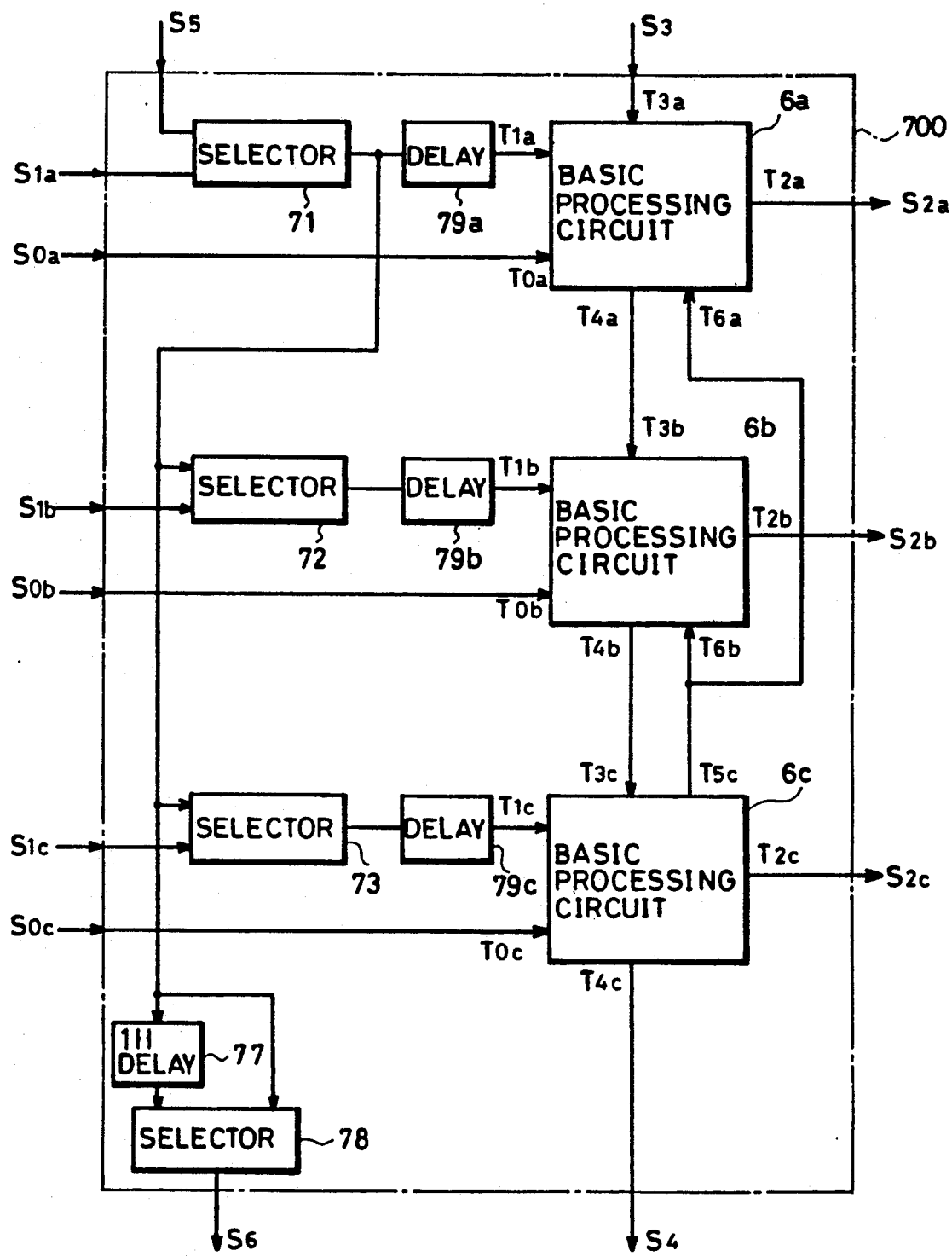
FIG. 42 is a block diagram showing a structure of a processing circuit in accordance with a further embodiment of the present invention.
Figure 44:
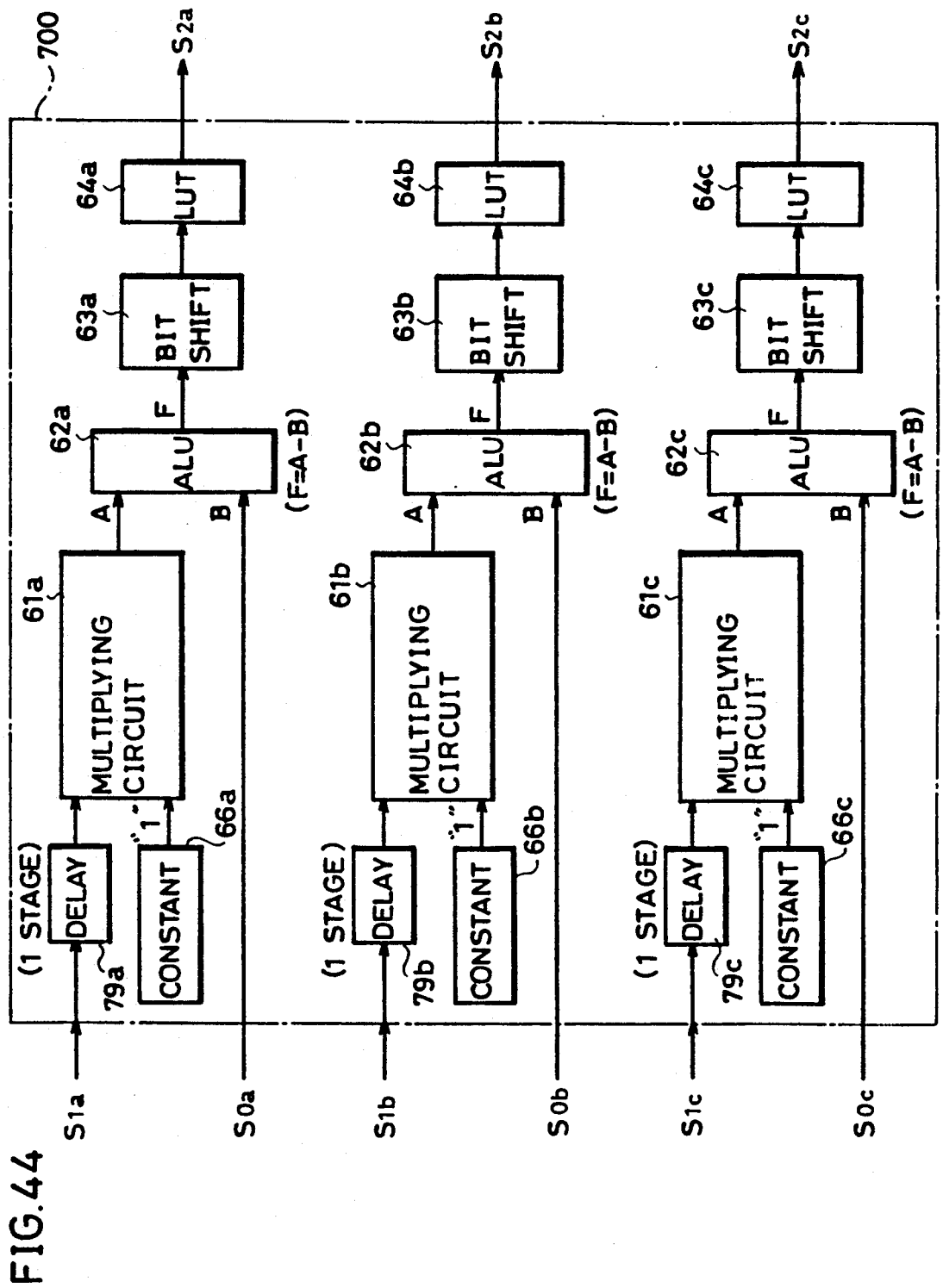

FIG. 44 is another example of the application of the processing circuits shown in FIG. 42. Three basic processing circuits 6a, 6b and 6c operate in parallel and processing is carried out between each of the components of two color image data. The number of delay stages in each of the variable length delay elements 79a, 79b and 79c is set at 1, the constant "1" is inputted to the Y input of each of the multiplying circuits 61a, 61b and 61c, and the function F=A−B is set in each of the three ALUs 62a, 62b and 62c. Consequently, in the ALUs 62a, 62b, and 62c, the subtraction is executed between the color image data delayed by 1 pixel inputted from the input terminals S1a, S1b and S1c and the color image data inputted from the input terminals S0a, S0b and S0c. If both image data are provided from the same image memory or from the same image input circuit, the above processing becomes the subtraction between adjacent pixels in the same image data, so that the differential processing on the color image data is realized. By changing the number of delay stages it the variable length delay elements 79a, 79b and 79c to 2, 3 . . . differential characteristics can be changed. In the processing circuit 7 of FIG. 16, the differential processing of the color image data utilizes the state of one dimensional FIR filter with three taps. Therefore, when one processing circuit is used, the time required for the process will be three times as long as that in the present example, and when the process must be executed in the same processing time period, three processing circuits are required.

In the foregoing, the processing circuits in accordance with the present invention have been described with various examples of processes utilizing the same. As for the examples of processing, description was given of (I) a case in which one processing circuit including three basic processing circuits is used, (II) a case in which one processing circuit is used coupled with an external 1 H delay element, (III) a case in which three processing circuits are used, and (IV) three processing circuits are used coupled with an external 1 H delay element. As for a case in which one processing circuit is used, the use of one circuit out of three basic processing circuits included therein, the use of the three circuits in parallel, and the use of the three circuits coupled with each other have been described. As for the case in which three processing circuits are used, the use of the three circuits in parallel, and the use of the three circuits coupled with each other have been described.

The processing circuit and the basic processing circuits in accordance with the present invention may be used by itself, a plurality of circuit may be used in parallel, and a plurality of circuits may be used coupled with each other. The use of the circuit is not limited to those described in the foregoing. For example, the number of basic processing circuits included in the processing circuit is not limited to three and the coupling between the processing circuit is not limited to three.

Figure 15:
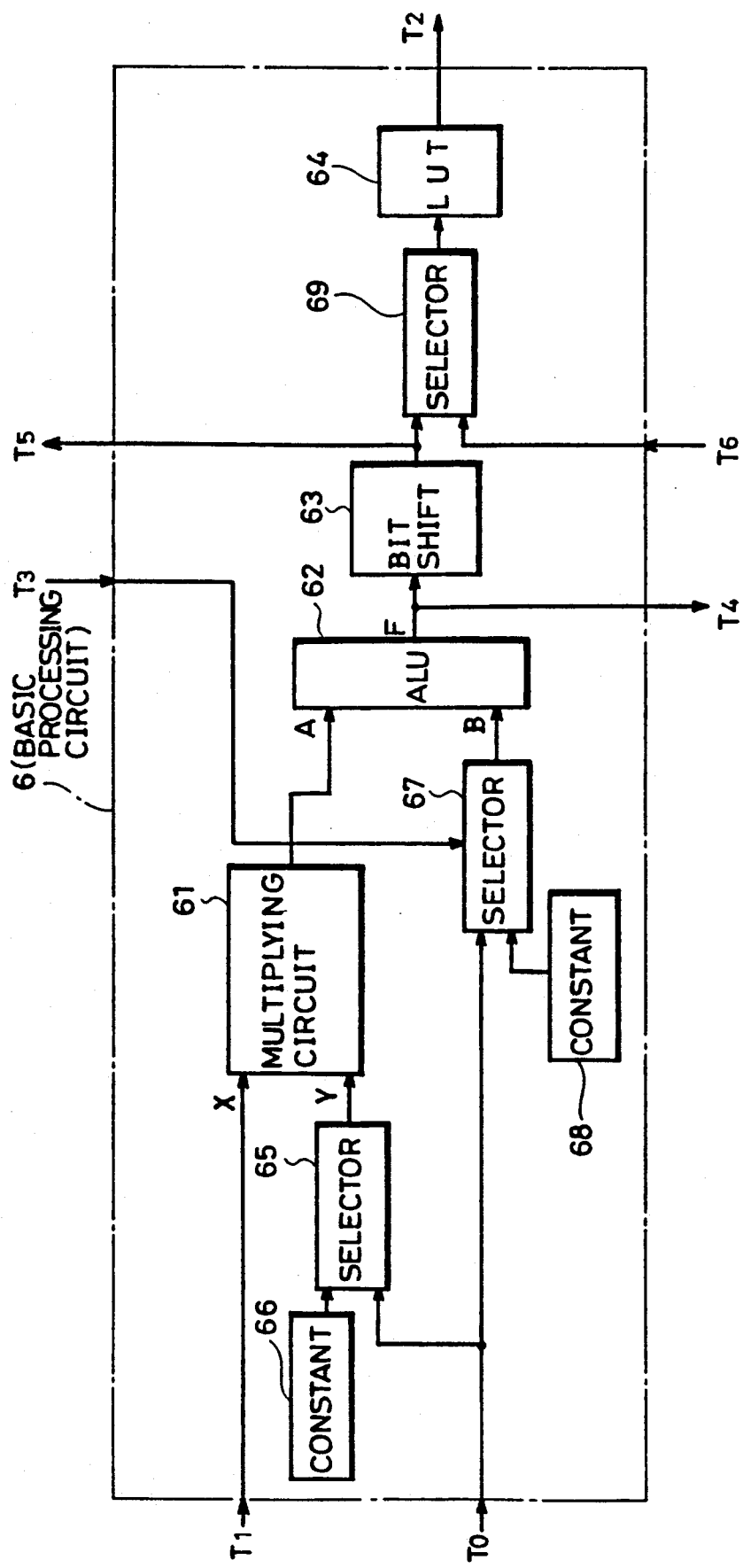
FIG. 15 is a block diagram showing example of a structure of a basic processing circuit.

It goes without saying that the basic processing circuit 6 shown in FIG. 15 and the processing circuit 7 and 700 shown in FIGS. 16 and 42 may be implemented in ICs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital image processing apparatus having a processing unit, wherein said processing unit comprises:

a multiplying circuit having a first and second input terminals, for multiplying two inputs and outputting result of multiplication;

an ALU having a third and a fourth input terminals for effecting addition/subtraction or a logical operation, said third input terminal being connected to the output terminal of said multiplying circuit;

a bit shift circuit connected to the output terminal of said ALU, for executing a bit shift operation on an image data outputted from said ALU;

a data converting table having a memory, and for outputting an image data stored at an address in said memory, the output from said bit shift circuit being used as said address;

a first selector having a fifth and a sixth input terminals, for selecting data from said fifth input terminal and data from said sixth input terminal and outputting the selected data to said second input terminal of said multiplying circuit;

a second selector having a seventh input terminal and said eighth input terminal and outputting the selected data to said fourth input terminal of said ALU;

a first constant register for applying a first data to said sixth input terminal of said first selector; and a second constant register for applying a second data to said eighth input terminal of said second selector:

wherein said first input terminal of said multiplying circuit receives a first image data to be processed by said processing unit and said fifth input terminal of said first selector and said seventh input terminal of said second selector receive a second image data to be processed by said processing circuit, and the output of said data converting table produces an image data processed by said processing circuit;

contents in said first and second constant registers, selecting function of said first and second selectors, arithmetic function of said ALU, shift direction and a number of stages to be shifted in said bit shift circuit, and contents in said data converting table can be set prior to a processing operation of the processing circuit;

"1" is set to said first constant register so that said first selector selects said sixth input terminal when the operation of said multiplying circuit is unnecessary;

"0" is set to said second constant register so that said second selector selects said eighth input terminal when the operation of said ALU is unnecessary;

a number of stages to be shifted is set to "0" when the operation of said bit shift circuit is unnecessary and contents of said data converting table are set in a manner that output data coincides with input data of the table when the operation of data conversion is unnecessary.

2. A digital image processing apparatus according to claim 1, further comprising a secondary processing unit substantially identical to said primary processing unit and serially connected thereto,
each of said primary and secondary processing unit having a third selector for selecting the first image data to be processed and a third image data to be processed to output the selected image data and outputting the selected image data to said first input terminal of said multiplying circuit, and said third selector being connected such that a third selector in said secondary processing unit receives the output of said primary processing unit as the third image data.

3. A digital image processing apparatus comprising:
an image input circuit for inputting image data; an image memory for storing image data; a processing circuit for processing image data; an image output circuit for outputting image data; control means for controlling said image input circuit, said image memory, said processing circuit and said image output circuit; and an image data bus having at least three data buses for transferring image data, each of said data bus being connected to said image input circuit, said image memory, said processing circuit and said image output circuit; wherein
said processing circuit comprises
a multiplying circuit having a first and second input terminals, for multiplying two inputs and outputting a result of multiplication, said first input terminal being received an image data inputted from said image data bus,
an ALU having a third and fourth input terminals for effecting addition/subtraction or a logical operation, said third input terminal being connected to the output terminal of said multiplying circuit,
a bit shift circuit connected to the output terminal of said ALU, for executing bit shift operation on an image data outputted from said ALU,
a data converting table having a memory, and for outputting an image data stored at an address in said memory to said image data bus, the output from said bit shift circuit being used as said address; and
means for making at least one of the multiplying circuit and the ALU inoperative.

4. A digital image processing apparatus having a processing unit, said processing unit comprising:
a multiplying circuit having a first and second input terminals, for multiplying two inputs and outputting a result of multiplication:
an ALU having a third and fourth input terminals for effecting addition/subtraction or a logical operation, said third input terminal being connected to the output terminal of said multiplying circuit,
a bit shift circuit connected to the output terminal of said ALU, for executing bit shift operation on an image data outputted from said ALU;
a data converting table having a memory, and for outputting data stored at an address in said memory, the output from said bit shift circuit being used as said address, and a read data from the memory being an output data; and
means for making at least one of the multiplying circuit and the ALU inoperative.

5. A digital image processing apparatus having a processing circuit constituted by multistages of basic processing units which are capable of receiving first and second image data and are cascade connected with each other, wherein each of said basic processing units comprises at least
a multiplying circuit having a first and second input terminals, for multiplying two inputs and outputting result of multiplication, the first input terminal being inputted the first image data;
an ALU having a third and a fourth input terminals for effecting addition/subtraction or a logical operation, said third input terminal being connected to the output terminal of said multiplying circuit;
first and second constant registers;
a multiplying circuit input selector for selecting either a second image data or a set value in said first constant register, and outputting the selected data to said second input terminal of said multiplying circuit;
an ALU input selector for selecting the second image data, a set value in said second constant register or an output data from an ALU included in a basic processing unit of a preceding stage, and outputting the selected data to said fourth input terminal of said ALU;
results of operation of said ALU at each processing circuit are outputted not only as an output data of each basic processing unit but also as an input data to an ALU input selector in a basic processing unit of the succeeding stage.

6. A digital image processing apparatus according to claim 5, wherein each of said basic processing circuits further comprises:
a third input selector for selecting an output data of said ALU included in the basic processing circuit or an output data of said ALU included in one of said multistages of the basic processing circuit; and
a data converting table having a memory, and for outputting data stored at an address in said memory, the output from said third input selector being used as said address.

7. A digital image processing apparatus according to claim 5, wherein
the first image data inputted to each of said basic processing circuits is an output data from an image input selector provided in correspondence with each of the basic processing circuits; multistages of the image input selectors are cascaded connected with each other, and an image data obtained by delaying an output of the image input selector of a preceding stage by 1 pixel of an image consisting of a plurality of pixels or an image data independently inputted to each of the image input selectors can be selected in each of the image input selectors except the image input selector of the first stage.

8. A digital image processing apparatus according to claim 7, comprising multistages of said processing circuits cascade connected with each other, each processing circuit further comprising a 1 line delay element which delays an output data from the image input selector of the first stage by 1 line of scanning of the image data; wherein an output data from 1 line delay element of the processing circuit of a preceding stage is used as an input to the image input selector of the first stage of the processing circuit of the succeeding stage, an output data from the ALU in the last stage of the processing circuit of a preceding stage is used as an input to the ALU input selector of the first stage of the processing circuit of the succeeding stage.

9. A digital image processing apparatus according to claim 7, comprising multistages of said processing circuits cascade connected with each other, each processing circuit further comprising an 1 pixel delay element delaying an output data of the image input selector of the last stage by 1 pixel of an image consisting of a plurality of pixels, wherein an output data of the 1 pixel delay element of the processing circuit of the preceding stage is used as an input to the image input selector of the first stage of the processing circuit of the succeeding stage, and output data of the ALU in the last stage of the processing circuit of the preceding stage is used as an input to the ALU input selector of the first stage of the processing circuit of the succeeding stage.

10. A digital image processing apparatus according to claim 9 constituted by multistage of said processing circuit cascade connected with each other, further comprising a 1 line delay element delaying an output data from the ALU of the last stage included in the processing circuit of the last stage by 1 line of scanning of image data, wherein an output data from said 1 line delay element is used as an input to the ALU input selector of the first stage included in the processing circuit of the first stage, and the first constant register of each basic processing circuit included in each processing circuit is a register file in which a plurality of constants are previously set and a constant to be outputted can be switched corresponding to a line being processed.

11. A digital image processing apparatus according to claim 7 comprising multistages of the processing circuits cascade connected with each other, wherein an out put of the image input selector of the first stage of the processing circuit of the preceding stage is used as an input to the image input selector of the first stage of the processing circuit in the succeeding stage, and an output data of the ALU in the last stage of the processing circuit of the preceding stage is used as an input of the ALU input selector of the first stage of the processing circuit of the succeeding stage.

12. A digital image processing apparatus according to claim 7 comprising multistages of said processing circuits cascade connected with each other, each processing circuit further comprising a 1 line delay element delaying an output data of an image input selector of the first stage by 1 line of scanning of the image data, a 1 pixel delay element delaying an output data of the image input selector of the last stage by 1 pixel of an image consisting of a plurality of pixels, and a delay output selector capable of selecting either an output data from the 1 line delay element or an output from the 1 pixel delay element, wherein an output data from the delay output selector of the processing circuit of the preceding stage is used as an input to the image input selector of the first stage of the processing circuit of the succeeding stage, and an output data of the ALU of the last stage of the processing circuit of the preceding stage is used as an input to the ALU input selector of the first stage of the processing circuit of the succeeding stage.

13. A digital image processing apparatus according to claim 7, further comprising a 1 line delay element delaying an output data of the ALU of the last stage included in said processing circuit by 1 line of scanning of image data, wherein an output data from said 1 line delay element is used as an input to the ALU input selector of the first stage included in the processing circuit, and the constant register of the first stage of each basic processing circuit included in the processing circuit is a register file in which a plurality of constants are previously set and the constant to be outputted can be switched in accordance with the line being processed.

14. A digital image processing apparatus according to claim 5, wherein the first image data inputted to each of said basic processing circuits is an output obtained by delaying an output of the image input selector provided in correspondence with each of the basic processing circuits by a variable length delay element, and an output data of the image input selector of the first stage or the image data independently inputted to each of the image input selectors can be selected in the image input selectors except the image input selector of the first stage.

15. A digital image processing apparatus having a plurality of processing units connected to each other, each of said processing units comprising:
   a multiplying circuit having a first and second input terminals, for multiplying two inputs and outputting a result of multiplication:
   an ALU having a third and fourth input terminals for effecting addition/subtraction or a logical operation, said third input terminal being connected to the output terminal of said multiplying circuit,
   a bit shift circuit connected to the output terminal of said ALU, for executing bit shift operation on an image data outputted from said ALU;
   a data converting table having a memory, and for outputting data stored at an address in said memory, the output from said bit shift circuit being used as said address, and a read data from the memory being an output data; and
   means for making at least one of the multiplying circuit and the ALU inoperative.

* * * * *